US012769991B2

(12) United States Patent
Ren

(10) Patent No.: US 12,769,991 B2
(45) Date of Patent: Oct. 20, 2026

(54) BRAIN-LIKE NEURAL NETWORK WITH MEMORY AND INFORMATION ABSTRACTION FUNCTIONS

(71) Applicant: NEUROCEAN TECHNOLOGIES INC., Shenzhen (CN)

(72) Inventor: Hualong Ren, Shenzhen (CN)

(73) Assignee: NEUROCEAN TECHNOLOGIES INC., Shenzhen (CN)

( * ) Notice: Subject to any disclaimer, the term of this patent is extended or adjusted under 35 U.S.C. 154(b) by 1004 days.

(21) Appl. No.: 17/991,161

(22) Filed: Nov. 21, 2022

(65) Prior Publication Data

US 2023/0087722 A1 Mar. 23, 2023

Related U.S. Application Data

(63) Continuation-in-part of application No. PCT/CN2021/093355, filed on May 12, 2021.

(30) Foreign Application Priority Data

May 19, 2020 (CN) ......................... 202010425110.8

(51) Int. Cl.
*G06N 3/063* (2023.01)
*G06N 3/049* (2023.01)
*G06N 3/092* (2023.01)

(52) U.S. Cl.
CPC ............. *G06N 3/063* (2013.01); *G06N 3/049* (2013.01); *G06N 3/092* (2023.01)

(58) Field of Classification Search
None
See application file for complete search history.

(56) References Cited

U.S. PATENT DOCUMENTS

2016/0260012 A1* 9/2016 Hunzinger ............. G06N 3/049
2019/0366538 A1 12/2019 Laurent et al.
2022/0161421 A1 5/2022 Ren

FOREIGN PATENT DOCUMENTS

CN 103116279 A 5/2013
CN 104809498 A 7/2015
(Continued)

OTHER PUBLICATIONS

Goodfellow, Ian, Bengio, Yoshua, and Aaron Courville. Deep learning. vol. 1. Cambridge, MA, USA: MIT press, 2017. 777 pages. (Year: 2017).*

(Continued)

*Primary Examiner* — Vincent Gonzales
(74) *Attorney, Agent, or Firm* — CANTOR COLBURN LLP

(57) ABSTRACT

A kind of neural network is provided which has memory and information abstract functions. This kind of brain neural network borrows the working principle of biological brain hippocampus and its surrounding brain regions, including the memory module can form the episodic memory. It allows the intelligent agent to efficiently identify objects and conduct space navigation, reasoning and independent decision making. It can quickly remember the characteristics of each object and carry out abstraction and meta-learning, has strong generalization ability, and can achieve the lifelong learning. It uses the synaptic plasticity process to adjust the weight, avoids partial differential operation, and has lower computational overhead than the traditional deep learning method, providing a basis for the design and application of neuromorphic chip.

52 Claims, 13 Drawing Sheets

(56) References Cited

FOREIGN PATENT DOCUMENTS

| | | | |
|---|---|---|---|
| CN | 107563505 | A | 1/2018 |
| CN | 110427536 | A | 11/2019 |

OTHER PUBLICATIONS

Kasabov, Nikola. "Brain-like Information Processing for Spatio-Temporal Pattern Recognition." Springer Handbook of Bio-/Neuroinformatics (2014): 813-834. (Year: 2014).*

International Search Report; International Application No. PCT/CN2021/093355; Date of Mailing of International Search Report Jul. 27, 2021; 4 pages; (with English Translation).

* cited by examiner

BRAIN-LIKE NEURAL NETWORK WITH MEMORY AND INFORMATION ABSTRACTION FUNCTIONS

CROSS-REFERENCE TO RELATED APPLICATIONS

This application is a continuation-in-part application of PCT International Application No. PCT/CN2021/093355 filed on May 12, 2021, which claims the priority to and benefits of Chinese Patent Application No. 202010425110.8 filed on May 19, 2020. The entire contents of the above applications are incorporated herein by reference for all purposes.

FIELD

The embodiment of this application relates to the field of brain-like neural network and artificial intelligence technology, in particular to a brain-like neural network with memory and information abstraction functions.

BACKGROUND

Autonomous robots (intelligent agents) need to be able to integrate their motion trajectories and multi-modal perceptual information into episodic memory including temporal and spatial sequences, so as to efficiently recognize objects (people, items, environment, space) and perform spatial navigation, reasoning and autonomous decision-making. It also needs to be able to form transient memories. It also needs to be able to distinguish multiple similar but slightly different objects to avoid confusion. Sometimes, it is necessary to be able to recognize the same object as different results in different contexts. It also needs to be able to extract common information components from multiple similar objects, and to abstract information from different feature dimensions (i.e., find clustering centres, also known as meta-learning), so as to enhance the generalization ability, draw inferences from examples, and reduce the amount of labelled data required for training. It also needs to be able to forget unimportant information components and reduce redundancy. It also needs to be able to achieve lifelong learning interacting with the environment and needs to be able to avoid catastrophic forgetting. The existing deep learning cannot fully solve the above problems.

The neural circuitry and plasticity mechanism of biological nervous system (especially hippocampus and its surrounding brain regions) provide a reference blueprint for solving the above problems.

SUMMARY

One of the purposes of this application is to provide a brain-like neural network with memory and information abstraction functions, which aims to solve the problems of poor generalization ability of the intelligent agents trained by the existing deep learning methods, inability to draw inferences from examples, inability of lifelong learning, and the need for a large amount of labelled data in the training process. The present invention is used to improve the effectiveness and accuracy of the intelligent agent's ability of object recognition, spatial navigation, reasoning and autonomous decision-making.

In order to solve the above problems, the present invention adopts the following technical solutions:

The present invention proposes a brain-like neural network with memory and information abstraction functions, comprising: a perceptual module; an instance encoding module; an environment encoding module; spatial encoding module; a time encoding module; a motion and orientation encoding module; an information synthesis and exchange module; and a memory module,

- wherein each module comprises a plurality of neurons,
- wherein the neurons comprise a plurality of perceptual encoding neurons, instance encoding neurons, environment encoding neurons, spatial encoding neurons, time encoding neurons, motion and orientation encoding neurons, information input neurons, information output neurons, and memory neurons,
- wherein the perceptual module comprises a plurality of said perceptual encoding neurons encoding visual representation information of observed objects,
- wherein the instance encoding module comprises a plurality of said instance encoding neurons encoding instance representation information,
- wherein the environment encoding module comprises a plurality of the environment encoding neurons encoding environment representation information,
- wherein the spatial encoding module comprises a plurality of the spatial encoding neurons encoding spatial representation information,
- wherein the time encoding module comprises a plurality of the time encoding neurons encoding temporal information,
- wherein the motion and orientation encoding module comprises a plurality of the motion and orientation encoding neurons encoding instantaneous speed information or relative displacement information of intelligent agents,
- wherein the information synthesis and exchange module comprise an information input channel and an information output channel, the information input channel comprises a plurality of the information input neurons, and the information output channel comprises a plurality of the information output neurons,
- wherein the memory module comprises a plurality of the memory neurons encoding memory information,
- wherein in the expression, if unidirectional connections are formed between neuron A and neuron B, it means unidirectional connections of A->B, if bidirectional connections are formed between neuron A and neuron B, it means A<->B (or A->B and A<-B) bidirectional connections,
- wherein if there is an A->B unidirectional connection between neuron A and neuron B, then neuron A is called the direct upstream neuron of neuron B, and neuron B is called the direct downstream neuron of neuron A, if a bidirectional connection of A<->B between neuron A and neuron B, then neuron A and neuron B are direct upstream neurons and direct downstream neurons, If there is no connection between neuron A and neuron B, but they are connected by one or more other neurons, such as A->C-> . . . ->D->B, then neuron A is called the indirect upstream neuron of neuron B, neuron B is called the indirect downstream neuron of neuron A, and neuron D is called the direct upstream neuron of neuron B,

- wherein the excitatory connection is: when the upstream neurons of the excitatory connection are activated, non-negative input is provided to the downstream neurons through the excitatory connection, wherein the inhibitory connection is: when the upstream neurons of the inhibitory connection are activated, non-positive input is provided to the downstream neurons through the inhibitory connection, wherein a plurality of the perceptual encoding neurons respectively form unidirectional or bidirectional excitatory or inhibitory connections with one or more other perceptual encoding neurons, and said one or more perceptual encoding neurons form unidirectional or bidirectional excitatory or inhibitory connections with one or more of the instance encoding neurons/the environment encoding neuron/the spatial encoding neurons/the information input neuron, wherein a plurality of the instance encoding neurons respectively form unidirectional excitatory connections with one or more of the information input neurons, can also respectively form the unidirectional or bidirectional excitatory connections with a plurality of the memory neurons, can also respectively form unidirectional or bidirectional activation connections with one or more other instance encoding neurons, and can also respectively form the unidirectional or bidirectional excitatory connections with one or more of the perceptual encoding neurons, wherein a plurality of the environment encoding neurons respectively form unidirectional excitatory connections with one or more of the information input neurons, can also respectively form the unidirectional or bidirectional excitatory connections with a plurality of the memory neurons, can also respectively form the unidirectional or bidirectional excitatory connections with one or more other environment encoding neurons, and can also respectively form the unidirectional or bidirectional excitatory connections with one or more of the perceptual encoding neurons, wherein a plurality of the spatial encoding neurons respectively form unidirectional excitatory connections with one or more of the information input neurons, can also respectively form the unidirectional or bidirectional excitatory connections with a plurality of the memory neurons, can also respectively form the unidirectional or bidirectional excitatory connections with one or more other spatial encoding neurons, and can also respectively form the unidirectional or bidirectional excitatory connections with one or more of the perceptual encoding neurons, wherein a plurality of the instance encoding neurons, a plurality of the environment encoding neurons, and a plurality of the spatial encoding neurons form the unidirectional or bidirectional excitatory connections between each other, wherein a plurality of the time encoding neurons respectively form unidirectional excitatory connections with one or more of the information input neurons, wherein a plurality of the motion and orientation encoding neurons respectively form unidirectional excitatory connections with one or more of the information input neurons, and can form the unidirectional or bidirectional excitatory connections with one or more of the spatial encoding neurons, wherein a plurality of the information input neurons can also form the unidirectional or bidirectional excitatory connections with one or more other information input neurons, a plurality of the information output neurons can also respectively form the unidirectional or bidirectional excitatory connections with one or more other information output neurons, wherein a plurality of the information input neurons can also respectively form the unidirectional or bidirectional excitatory connections with a plurality of the information output neurons, wherein each information input neuron forms unidirectional excitatory connections with one or more of the memory neurons, wherein a plurality of the memory neurons respectively form unidirectional excitatory connections with one or more of the information output neurons, a plurality of the memory neurons respectively form the unidirectional or bidirectional excitatory connections with one or more other memory neurons, wherein one or more of the information output neurons can respectively form unidirectional excitatory connections with one or more of the instance encoding neurons/the environment encoding neurons/the spatial encoding neurons/the perceptual encoding neurons/the time encoding neurons/the motion and orientation encoding neurons, respectively, wherein the brain-like neural network caches and encodes information through activation of the neurons, and encodes, stores, and transmits information through the (synaptic) connections (with weights) between the neurons, wherein picture or video stream are input such that one or more pixel values of multiple pixels of each frame picture are respectively weighted into a plurality of the perceptual encoding neurons so as to activate the plurality of the perceptual encoding neurons, wherein current instantaneous speed of the intelligent agents is obtained and input to the motion and orientation encoding module, and the relative displacement information is obtained by integrating the instantaneous speed against time by a plurality of the motion and orientation encoding neurons, wherein for one or more of the neurons, membrane potential is calculated to determine whether to activate the neurons, and if the neurons are determined to be activated, each downstream neuron is made to accumulate the membrane potential so as to determine whether to activate the neurons, such that the activation of the neurons will propagate in the brain-like neural network, wherein weights of connections between upstream neurons and the downstream neurons is a constant value or dynamically adjusted through a synaptic plasticity process, wherein the information synthesis and exchange module control the information entering and exiting the memory module, adjusts the size and proportion of each information component, is executive mechanism of attention mechanism, and the information synthesis and exchange module's working process comprises an active attention process and an automatic attention process, wherein the information input neurons and the information output neurons respectively have an attention control signal input terminal, wherein the active attention process is:

adjusting activation intensity or activation rate or spiking activation phase of each information input neuron or each information output neuron through adjusting intensity of the attention control signal (the amplitude of the intensity of the attention control signal can be positive, negative, or 0) applied at the attention control signal input terminal of the information input neurons/the information output neurons, so as to control information entering/existing the memory module, and adjust size and proportion of each information component, wherein the automatic attention process is:

through the unidirectional or bidirectional excitatory connections between the information input neurons, when a plurality of the information input neurons are activated, making it easier for other information input neurons connected with said information input neurons to be activated, such that relevant information components are also easy to enter the memory module, through the unidirectional or bidirectional excitatory connections between the information input neurons and the information output neurons, when the information input neurons/the information output neurons are activated, making it easier for the connected information output neurons/the information input neurons to be activated, such that output/input information components related to input/output information are easier to output/input the memory module, wherein working process of the brain-like neural network comprises: memory triggering process, information transcription process, memory forgetting process, memory self-consolidation process, and information component adjustment process, wherein working process of the memory module comprises: an instantaneous memory encoding process, a time series memory encoding process, an information aggregation process, a directional information aggregation process, and an information component adjustment process, wherein the synaptic plasticity process comprises a unipolar upstream activation dependent synaptic plasticity process, a unipolar downstream activation dependent synaptic plasticity process, a unipolar upstream and downstream activation dependent synaptic plasticity process, and a unipolar upstream spiking dependent synaptic plasticity process, a unipolar downstream spiking dependent synaptic plasticity process, a unipolar spiking time dependent synaptic plasticity process, an asymmetric bipolar spiking time dependent synaptic plasticity process, a symmetric bipolar spiking time dependent synaptic plasticity process, and wherein one or more of the neurons are mapped to corresponding labels as output.

In an embodiment of the present invention, several neurons of the neural network adopt spiking neurons or non-spiking neurons.

Compared with the prior art, this application has the following advantages:

This application provides a brain-like neural network with memory and information abstraction functions. It adopts modular organization structure and white box design, which is easy to analyse and debug. The time encoding module, motion and orientation encoding module and memory module enable the autonomous robot to synthesize its motion trajectory and multi-modal perceptual information through the time series memory encoding process to form an episodic memory including time series and spatial series, so as to efficiently recognize objects, perform spatial navigation, reasoning and autonomous decision-making. Its instantaneous memory encoding process can quickly remember novel objects. The feature enabling sub-module can “index” the concrete memory sub-module, and the information component adjustment process can distinguish multiple similar but subtly different objects to avoid confusion. It can also associate multiple memory information of a long time to form more robust connections to prevent forgetting. The instance encoding module, the environment encoding module, the spatial encoding module, together with the memory module, form the context with each other, and recognize the object as the result of the context environment. The information synthesis and exchange module can adjust the information components in and out of the memory module, and has a selective active and automatic attention mechanism. The information aggregation process can extract the common information components from multiple similar objects, and abstract information from different feature dimensions (namely, find the clustering centre, also known as the meta-learning process), enhance the generalization ability, and draw inferences from examples. The information transcription process can combine the existing memory to extract the relevant information components from the memory to be processed, and integrate them into the existing memory. The unimportant information components can gradually decay to oblivion through the memory forgetting process, optimize memory and reduce redundancy. Concrete memory module and abstract memory modules can be used to form short-term memory (including instantaneous memory), allow more frequent and rapid information storage, update, and processing. Said short-term memory can be written through the information transcription process to the instance encoding module, the environment encoding module, the spatial encoding module, the memory module and the perceptual module to form relatively stable long-term memory, enabling robots to learn continuously in their interactions with the environment, constantly forming new memories and avoiding catastrophic forgetting. The proposed brain-like neural network uses the synaptic plasticity process to adjust the connection weights, the training operation is focused on the synapses and the parallelization, which can avoid a large number of partial differential operations. It provides a foundation for the design and application of neuromorphic chip, and is expected to break through the bottlenecks of von Neumann architecture and has broad application prospects.

DESCRIPTION OF THE DRAWINGS

In order to explain the embodiments of the present invention or the technical solutions in the prior art more clearly, the following part will briefly introduce the drawings that need to be used in the description of the embodiments or the prior art. Obviously, the drawings in the following description are only It is an embodiment of the present invention. For those of ordinary skill in the art, other drawings can be obtained based on the provided drawings without creative work.

DETAILED DESCRIPTION

In order to make the purposes, technical scheme and advantages of this application more clearly, the following detailed description of this application is given in combination with the attached drawings and embodiments. It should be understood that the specific embodiments described herein are used only to explain and not to qualify this application.

In order to explain the technical scheme of this application, the following details are given in combination with the specific drawings and embodiments.

Figure 1:
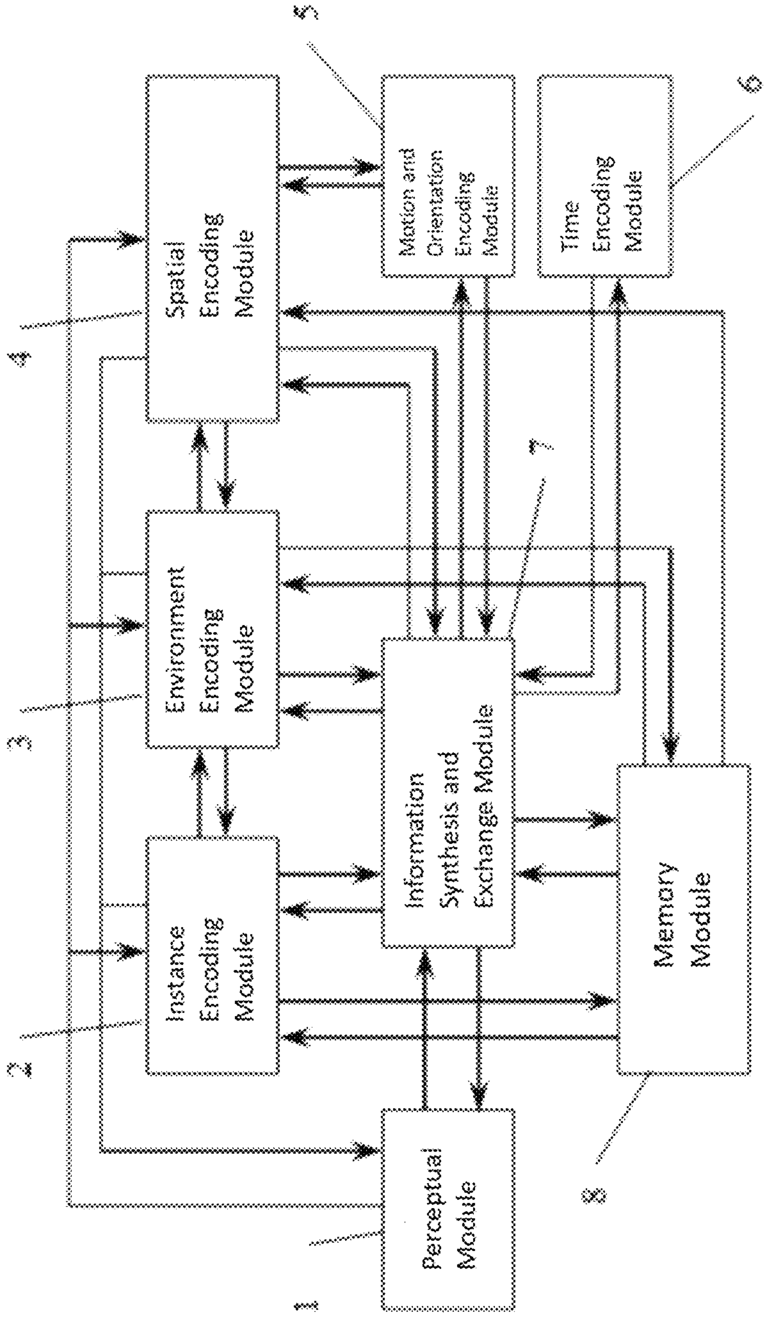
FIG. 1 is an overall block diagram of a brain-like neural network with memory and information abstraction functions provided by the present invention.

As shown in FIG. 1, the present invention proposes a brain-like neural network with memory and information abstraction functions, comprising: a perceptual module 1; an instance encoding module 2; an environment encoding module 3; spatial encoding module 4; a time encoding module 6; a motion and orientation encoding module 5; an information synthesis and exchange module 7; and a memory module 8. Specifically:

Each module comprises a plurality of neurons. Spiking neurons are used for a plurality of the neurons.

The neurons comprise a plurality of perceptual encoding neurons 110, instance encoding neurons 20, environment encoding neurons 30, spatial encoding neurons 40, time encoding neurons 610, motion and orientation encoding neurons 50, information input neurons 710, information output neurons 720, and memory neurons 80.

The perceptual module 1 comprises a plurality (such as 10 million) of said perceptual encoding neurons 110 encoding visual representation information of observed objects.

The instance encoding module 2 comprises a plurality (such as 100,000) of said instance encoding neurons 20 encoding instance representation information.

The environment encoding module 3 comprises a plurality (such as 100,000) of the environment encoding neurons 30 encoding environment representation information.

The spatial encoding module 4 comprises a plurality (such as 100,000) of the spatial encoding neurons 40 encoding spatial representation information.

The time encoding module 6 comprises a plurality (such as 200) of the time encoding neurons 610 encoding temporal information.

The motion and orientation encoding module 5 comprises a plurality (such as 19) of the motion and orientation encoding neurons 50 encoding instantaneous speed information or relative displacement information of intelligent agents.

The information synthesis and exchange module 7 comprises an information input channel 71 and an information output channel 72, the information input channel 71 comprises a plurality (such as 100,000) of the information input neurons 710, and the information output channel 72 comprises a plurality (such as 100,000) of the information output neurons 720.

The memory module 8 comprises a plurality (such as 100,000) of the memory neurons 80 encoding memory information.

In the expression, if unidirectional connections are formed between neuron A and neuron B, it means unidirectional connections of A->B. If bidirectional connections are formed between neuron A and neuron B, it means A<->B (or A->B and A<-B) bidirectional connections.

If there is an A->B unidirectional connection between neuron A and neuron B, then neuron A is called the direct upstream neuron of neuron B, and neuron B is called the direct downstream neuron of neuron A. If a bidirectional connection of A<->B between neuron A and neuron B, then neuron A and neuron B are direct upstream neurons and direct downstream neurons.

If there is no connection between neuron A and neuron B, but they are connected by one or more other neurons, such as A->C-> . . . ->D->B, then neuron A is called the indirect upstream neuron of neuron B, neuron B is called the indirect downstream neuron of neuron A, and neuron D is called the direct upstream neuron of neuron B.

The excitatory connection is: when the upstream neurons of the excitatory connection are activated, non-negative input is provided to the downstream neurons through the excitatory connection.

The inhibitory connection is: when the upstream neurons of the inhibitory connection are activated, non-positive input is provided to the downstream neurons through the inhibitory connection.

Figure 2:
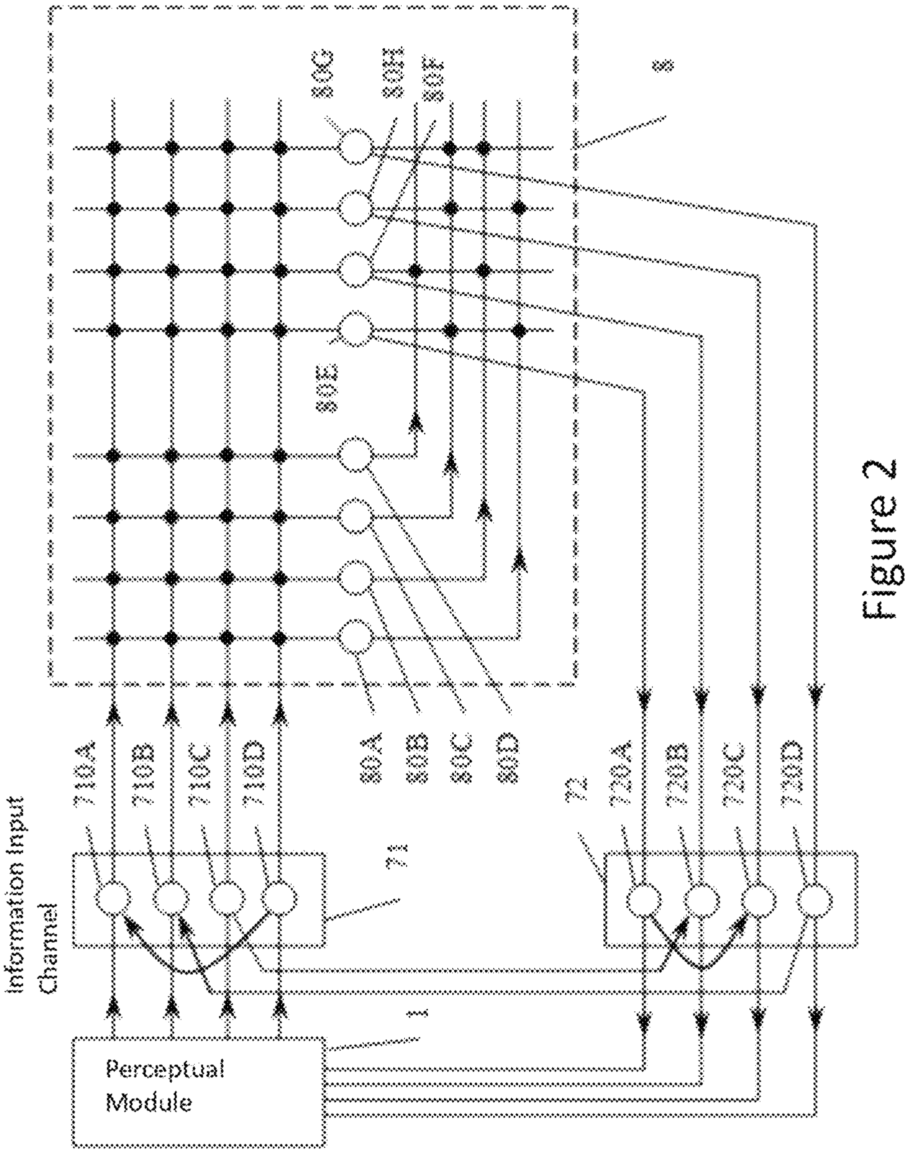
FIG. 2 is a schematic diagram of partial module topology of a brain-like neural network with memory and information abstraction functions in an embodiment of the present invention.
Figure 5:
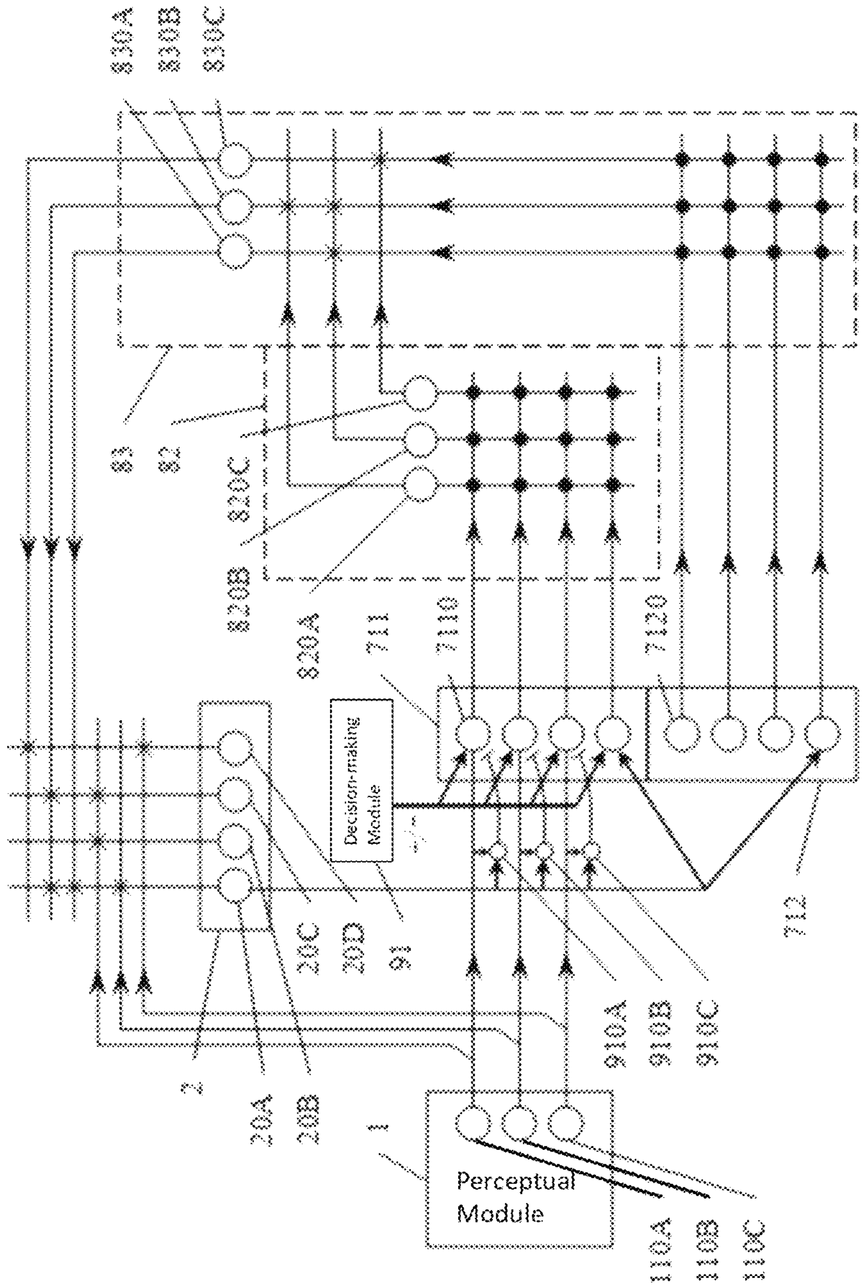
FIG. 5 is a schematic diagram of the topology of some modules and differential information decoupling neurons of a brain-like neural network with memory and information abstraction functions in an embodiment of the present invention.
Figure 9:
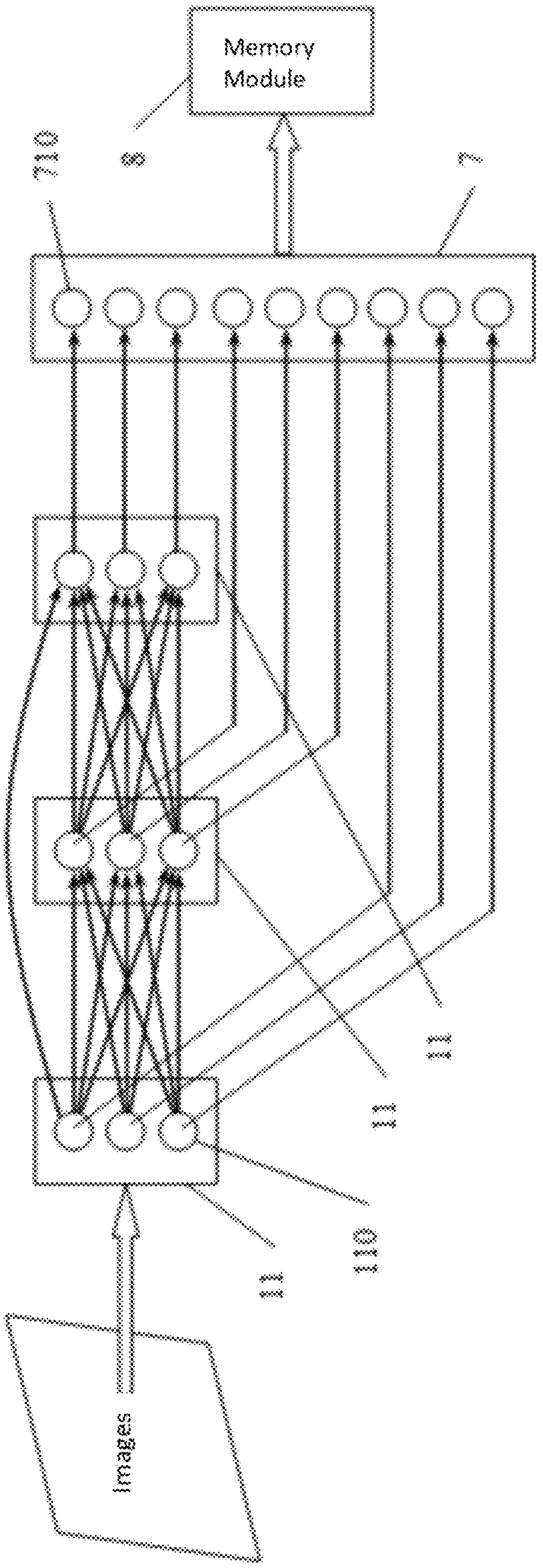
FIG. 9 is a schematic diagram of a multi-level perceptual encoding layer topology of a brain-like neural network with memory and information abstraction functions in an embodiment of the present invention.

As shown in FIGS. 2, 5, and 9, a plurality (such as 90 million) of the perceptual encoding neurons 110 respectively form unidirectional or bidirectional excitatory or inhibitory connections with one or more (such as 7,000) other perceptual encoding neurons 110, and said one or more (such as 100,000) perceptual encoding neurons 110 form unidirectional or bidirectional excitatory or inhibitory connections with one or more (such as 100) of the instance encoding neurons 20/the environment encoding neuron 30/the spatial encoding neurons 40/(1 to 10) the information input neurons 710.

A plurality (such as 100,000) of the instance encoding neurons 20 respectively form unidirectional excitatory connections with one or more (such as 1 to 10) of the information input neurons 710, can also respectively form the unidirectional or bidirectional excitatory connections with a plurality (such as 100 to 1,000) of the memory neurons 80, can also respectively form unidirectional or bidirectional activation connections with one or more (such as 100) other instance encoding neurons 20, and can also respectively form the unidirectional or bidirectional excitatory connections with one or more (such as 100) of the perceptual encoding neurons 110, A plurality (such as 100,000) of the environment encoding neurons 30 respectively form unidirectional excitatory connections with one or more (such as 1 to 10) of the information input neurons 710, can also respectively form the unidirectional or bidirectional excitatory connections with a plurality (such as 100 to 1,000) of the memory neurons 80, can also respectively form the unidirectional or bidirectional excitatory connections with one or more (such as 100) other environment encoding neurons 30, and can also respectively form the unidirectional or bidirectional excitatory connections with one or more (such as 100) of the perceptual encoding neurons 110.

A plurality (such as 100,000) of the spatial encoding neurons 40 respectively form unidirectional excitatory connections with one or more (such as 1 to 10) of the information input neurons 710, can also respectively form the unidirectional or bidirectional excitatory connections with a plurality (such as 100 to 1,000) of the memory neurons 80, can also respectively form the unidirectional or bidirectional excitatory connections with one or more (such as 100) other spatial encoding neurons 40, and can also respectively form the unidirectional or bidirectional excitatory connections with one or more (such as 100) of the perceptual encoding neurons 110.

FIG. 5 shows the topological relationship between multiple instance encoding neurons 20 and neurons of other modules. The topological relationships between the environment encoding neurons 30, the spatial encoding neurons 40 and the neurons of other multiple modules are similar to the former, which have been omitted from FIG. 5.

Figure 13:
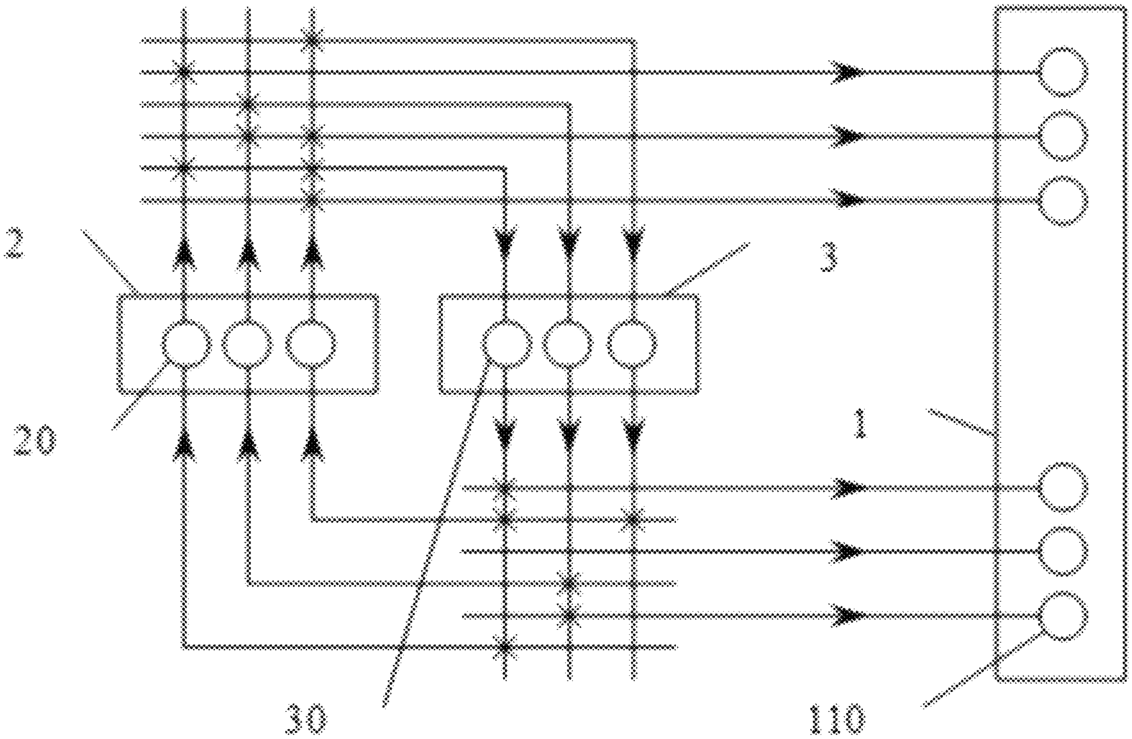
FIG. 13 is a schematic diagram of an example encoding module of a brain-like neural network with memory and information abstraction functions, and a topological schematic diagram of an environment encoding module and a perception module in an embodiment of the present invention.

FIG. 13 shows the unidirectional excitatory connections between multiple instance encoding neurons 20 and multiple environment encoding neurons 30 and multiple perceptual encoding neurons 110. The unidirectional excitatory type connections between the spatial encoding neurons 40 and the perceptual encoding neurons 110 are similar to the former and have been omitted from FIG. 13.

Figure 12:
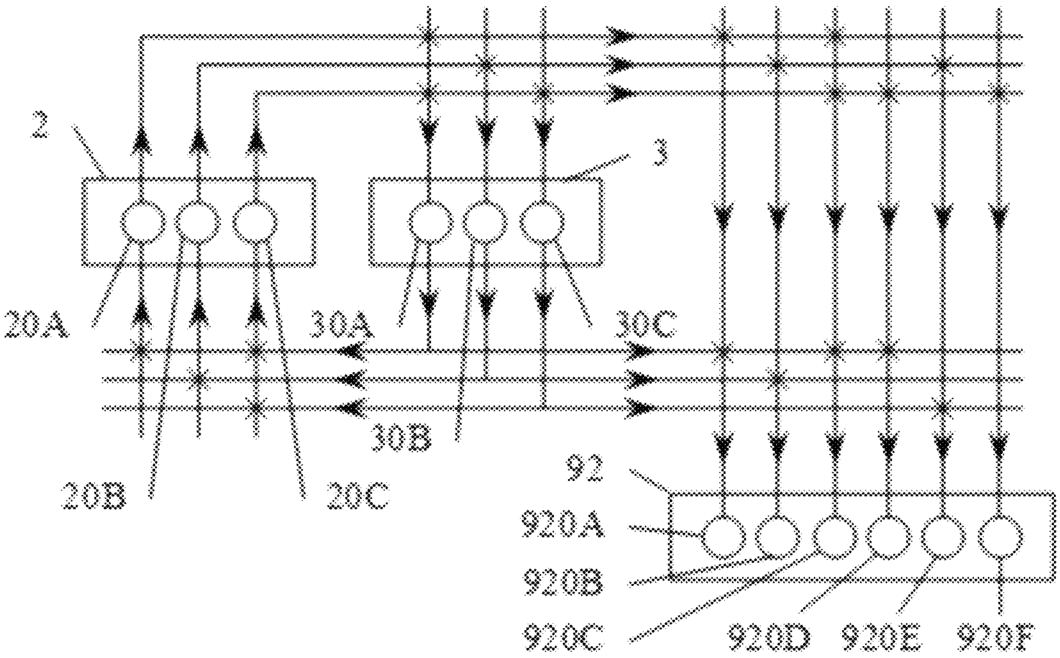
FIG. 12 is a schematic diagram of an example encoding module, an environment encoding module, and a readout layer topology of a brain-like neural network with memory and information abstraction functions in an embodiment of the present invention.

A plurality (such as 100,000) of the instance encoding neurons 20, a plurality (such as 10,000) of the environment encoding neurons 30, and a plurality (such as 10,000) of the spatial encoding neurons 40 form the unidirectional or bidirectional excitatory connections between each other. The topological relationship between multiple instance encoding neurons 20 and multiple environment encoding neurons 30 is shown in FIGS. 12 and 13, and the topological relationship of the spatial encoding neurons 40 is similar to the former, which has been omitted from FIGS. 12 and 13.

In this embodiment, a plurality (such as 200) of the time encoding neurons 610 respectively form unidirectional excitatory connections with one or more (such as 1 to 2) of the information input neurons 710.

Figure 17:
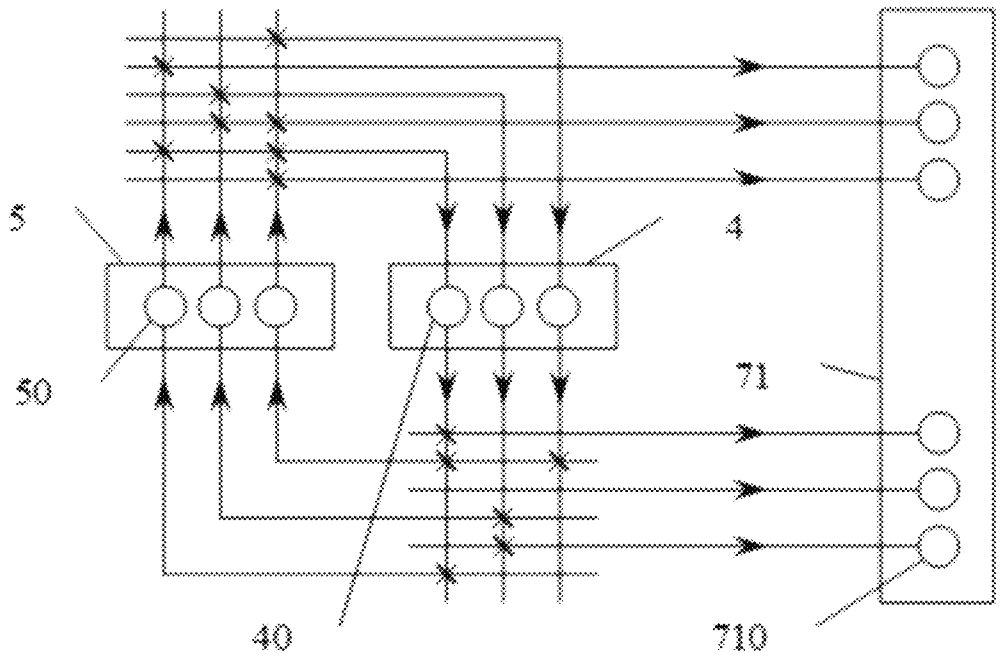
FIG. 17 is a schematic diagram of the motion and orientation encoding module and the spatial encoding module and the information input channel topology of a brain-like neural network with memory and information abstraction functions in an embodiment of the present invention.

As shown in FIG. 17, a plurality (such as 19) of the motion and orientation encoding neurons 50 respectively form unidirectional excitatory connections with one or more (such as 1 to 2) of the information input neurons 710, and can form the unidirectional or bidirectional excitatory connections with one or more (such as 10,000) of the spatial encoding neurons.

Figure 7:
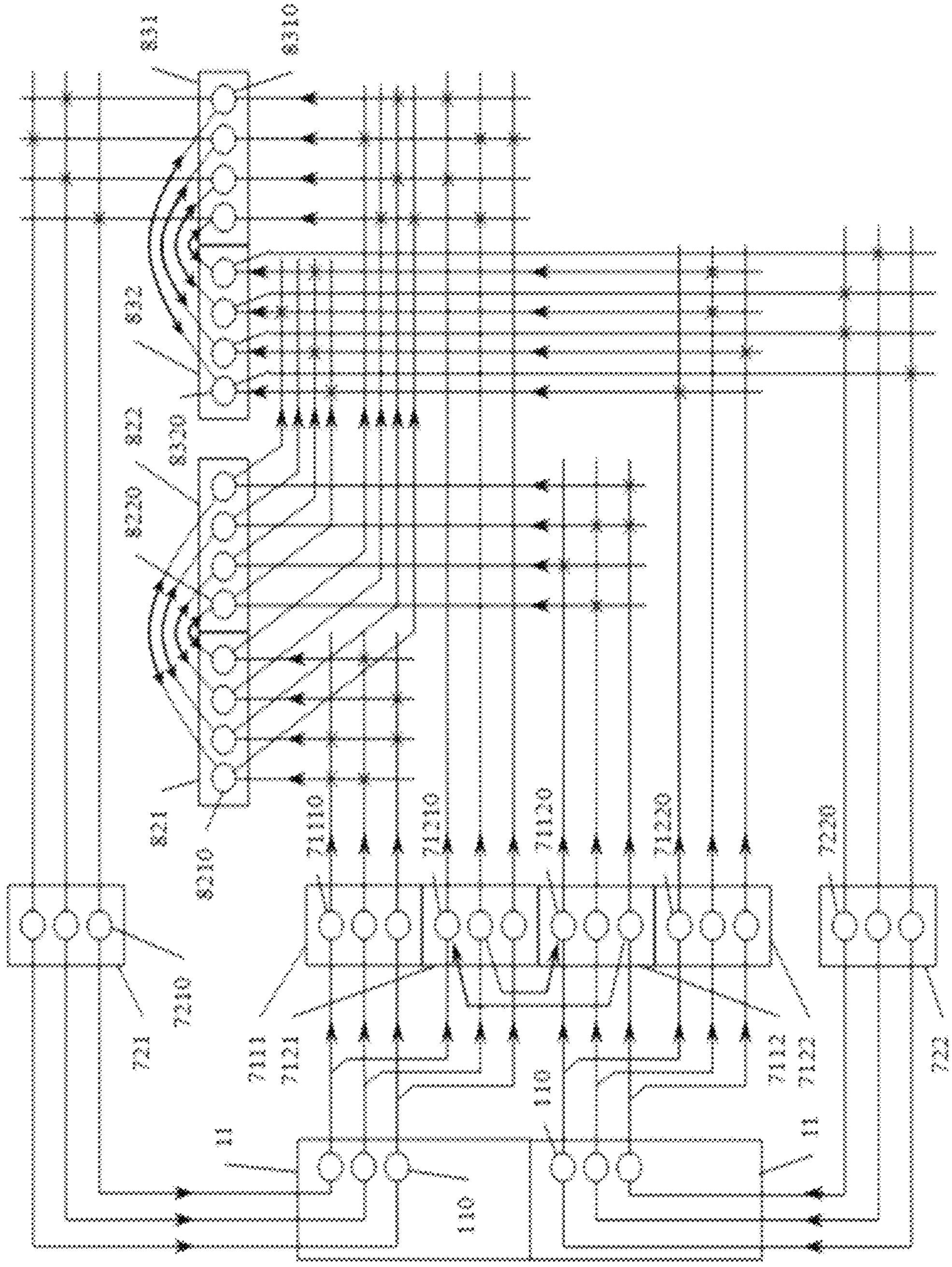
FIG. 7 is a schematic diagram of a detailed topology of some modules of a brain-like neural network with memory and information abstraction functions in an embodiment of the present invention.

FIGS. 2, 5, and 7 show the unidirectional excitatory connections between multiple perceptual encoding neurons 110 and multiple information input neurons 710. The unidirectional excitatory connections between the time encoding neuron 610, the motion and orientation encoding neurons 50 and the information input neurons 710 are similar to the former and have been omitted from FIGS. 2, 5, and 7.

As shown in FIG. 2, a plurality (such as 10,000) of the information input neurons 710 can also form the unidirectional or bidirectional excitatory connections with one or more (such as 1,000) other information input neurons 710, a plurality (such as 10,000) of the information output neurons 720 can also respectively form the unidirectional or bidirectional excitatory connections with one or more (such as 1,000) other information output neurons 720, a plurality (such as 10,000) of the information input neurons 710 can also respectively form the unidirectional or bidirectional excitatory connections with a plurality of the information output neurons 720.

As shown in FIG. 2, each information input neuron 710 forms unidirectional excitatory connections with one or more (such as 1,000 to 10,000) of the memory neurons 80.

As shown in FIG. 2, a plurality of the memory neurons 80 respectively form unidirectional excitatory connections with one or more (such as 1 to 10) of the information output neurons 720, a plurality (such as 80,000) of the memory neurons 80 respectively form the unidirectional or bidirectional excitatory connections with one or more (such as 100 to 1,000) other memory neurons 80.

As shown in FIG. 2, one or more (such as 1,000 to 10,000) of the information output neurons 720 can respectively form unidirectional excitatory connections with one or more (such as 1,000 to 10,000) of the instance encoding neurons 20/the environment encoding neurons 30/the spatial encoding neurons 40/(for example 1,000 to 10,000) the perceptual encoding neurons 110/(for example 1 to 2) the time encoding neurons 610/(for example 1 to 2) the motion and orientation encoding neurons 50, respectively.

The brain-like neural network caches and encodes information through activation of the neurons, and encodes, stores, and transmits information through the (synaptic) connections (with weights) between the neurons.

Image or video stream are input such that one or more pixel values R, G, B of multiple pixels of each frame image are respectively multiplied by a weight of 1 and fed into a plurality (such as 100) of the perceptual encoding neurons 110 so as to activate the plurality of the perceptual encoding neurons 110 (such as 3% of all said perceptual encoding neurons 110).

Samples (images, video streams) can be acquired in real time using recorded images or video streams, using monocular, binocular, or multi-view cameras that can be rotated, or using camera gimbal, or a camera mounted on a movable platform.

Current instantaneous speed of the intelligent agents is obtained and input to the motion and orientation encoding module 5, and the relative displacement information is obtained by integrating the instantaneous speed against time by a plurality (such as 6) of the motion and orientation encoding neurons 50.

For one or more of the neurons, membrane potential is calculated to determine whether to activate the neurons, and if the neurons are determined to be activated, each downstream neuron is made to accumulate the membrane potential so as to determine whether to activate the neurons, such that the activation of the neurons will propagate in the brain-like neural network, weights of connections between upstream neurons and the downstream neurons is a constant value or dynamically adjusted through a synaptic plasticity process.

The information synthesis and exchange module 7 controls the information entering and exiting the memory module 8, adjusts the size and proportion of each information component, is executive mechanism of attention mechanism, and the information synthesis and exchange module's working process comprises an active attention process and an automatic attention process.

In the present embodiment, a plurality (such as every) of the information input neurons 710 and a plurality (such as every) of the information output neurons 720 respectively have an attention control signal input terminal 911.

Specifically, the active attention process is:

adjusting activation intensity or activation rate or spiking activation phase of each information input neuron or each information output neuron through adjusting intensity of the attention control signal (the amplitude of the intensity of the attention control signal can be positive, negative, or 0) applied at the attention control signal input terminal 911 of the information input neurons/the information output neurons, so as to control information entering/existing the memory module 8, and adjust size and proportion of each information component.

Specifically, the automatic attention process is:

through the unidirectional or bidirectional excitatory connections between the information input neurons 710, when a plurality of the information input neurons are activated, making it easier for other information input neurons 710 connected with said information input neurons 710 to be activated, such that relevant information components are also easy to enter the memory module 8, through the unidirectional or bidirectional excitatory connections between the information input neurons 710 and the information output neurons 720, when the information input neurons/the information output neurons are activated, making it easier for the connected information output neurons/the information input neurons to be activated, such that output/input information components related to input/output information are easier to output/input the memory module 8.

Working process of the brain-like neural network comprises: memory triggering process, information transcription process, memory forgetting process, memory self-consolidation process, and information component adjustment process.

Working process of the memory module 8 further comprises: an instantaneous memory encoding process, a time series memory encoding process, an information aggregation process, a directional information aggregation process, and an information component adjustment process.

The synaptic plasticity process comprises a unipolar upstream activation dependent synaptic plasticity process, a unipolar downstream activation dependent synaptic plasticity process, a unipolar upstream and downstream activation dependent synaptic plasticity process, and a unipolar upstream spiking dependent synaptic plasticity process, a unipolar downstream spiking dependent synaptic plasticity process, a unipolar spiking time dependent synaptic plasticity process, an asymmetric bipolar spiking time dependent synaptic plasticity process, a symmetric bipolar spiking time dependent synaptic plasticity process.

One or more of the neurons are mapped to corresponding labels as output. For example, 10,000 instance encoding neurons 20 are mapped to 1 label as output.

In the present embodiment, several neurons of the neural network adopt spiking neurons or non-spiking neurons.

For example, one way to implement spiking neurons is to use leaky integrate-and-fire neurons (LIF neuron model). One way to implement non-spiking neurons is to use artificial neurons in deep neural networks (e.g., using the ReLU activation function).

In this embodiment, each neuron of the brain-like neural network adopts spiking neuron and leaky integrate-and-fire neurons (LIF neuron model) in addition to those with a given specific working process.

In a further improved embodiment, the plurality of the neurons of the brain-like neural network are spontaneous firing neurons. The spontaneous firing neurons comprise conditionally spontaneous firing neurons and unconditionally spontaneous firing neurons.

If the conditionally spontaneous firing neurons are not activated by external input in a first pre-set time interval, the conditionally spontaneous firing neurons are self-activated according to probability P.

The unconditionally spontaneous firing neurons automatically gradually accumulate the membrane potential without external input, when the membrane potential reaches the threshold, the unconditionally spontaneous firing neurons activate, and restore the membrane potential to resting potential to restart accumulation process.

In this embodiment, an unconditionally spontaneous firing neuron is implemented in the following way:

step m1: letting membrane potential to be Vm=Vm+Vc, step m2: summing all inputs weighted and superimposed to Vm, step m3: if Vm>=threshold, then letting the unconditionally spontaneous firing neuron activates and letting Vm=Vrest, and repeating steps m1 to m3, where Vm is the membrane potential, Vc is the cumulative constant, Vrest is the resting potential, and threshold is the threshold.

For example, let Vc=5 mV, Vrest=−70 mV, threshold=−25 mV.

In this embodiment, several of the said interneurons employ unconditional spontaneous firing neurons.

In this embodiment, each time encoding neuron 610 uses unconditionally spontaneous firing neurons. Ten thousand instance encoding neurons 20, ten thousand environment encoding neurons 30, ten thousand spatial encoding neurons 40, one million perceptual encoding neurons 110, each memory neuron 80, each information input neuron 710, each information output neuron 720 use conditionally spontaneous firing neurons.

In this embodiment, the conditionally spontaneous firing neurons will self-activate according to probability P if it is not activated by an external input in the first pre-set time interval (for example, configured as 10 minutes).

The conditionally spontaneous firing neurons record one or more of:

1) time interval since last activation,
2) most recent average issuance rate,
3) duration of most recent activation,
4) total activation times,
5) total number of executions of the synaptic plasticity processes in each input connections recently,
6) total number of executions of the synaptic plasticity processes in each output connections recently,
7) total change in weights of each input connections recently, and
8) total change in weights of each output connections recently.

In the present embodiment, calculation rules for the probability P comprises one or more of:

1) P is positively correlated with the time interval since the last activation,
2) P is positively correlated with the most recent average issuance rate,
3) P is positively correlated with the duration of the most recent activation,
4) P is positively correlated with the total activation times,
5) P is positively correlated with the total number of executions of the synaptic plasticity processes in each input connections recently,
6) P is positively correlated with the total number of executions of the synaptic plasticity processes in each output connections recently,
7) P is positively correlated with the total change in weights of each input connections recently,
8) P is positively correlated with the total change in weights of each output connections recently,
9) P is positively correlated with average weights of all input connections,
10) P is positively correlated with total modulus of the weights of all input connections,
11) P is positively correlated with total number of all input connections, and
12) P is positively correlated with the total number of all output connections.

In the present embodiment, let P=min (1, a*Tinterval^2+b*Fr+c*Nin_plasticity+Bias), where a, b, and c are coefficients, and Tinterval is the time interval from the last activation, Fr is the recent average exciting rate, Nin_plasticity is the total number of executions of the synaptic plasticity process of each input connection recently, and Bias is the bias, which can be set to 0.01, which is regarded as the basic spontaneous firing probability.

In the present embodiment, calculation rules for activation intensity or activation rate Fs of the conditionally spontaneous firing neurons during spontaneous firing comprise one or more of:

1) Fs=Fsd, Fsd is default activation frequency,
2) Fs is negatively correlated with the time interval since the last activation,
3) Fs is positively correlated with the most recent average issuance rate,
4) Fs is positively correlated with the duration of the most recent activation,
5) Fs is positively correlated with the total number of activations,
6) Fs is positively correlated with the total number of executions of the synaptic plasticity processes of each input connections recently,
7) Fs is positively correlated with the total number of executions of the synaptic plasticity processes of each output connections recently,
8) Fs is positively correlated with the total weights change of each input connections recently,
9) Fs is positively correlated with the total weights change of each output connections recently,
10) Fs is positively correlated with the average weights of all input connections,
11) Fs is positively correlated with the total modulus of the weights of all input connections,
12) Fs is positively correlated with the total number of all input connections, and
13) Fs is positively correlated with the total number of all output connections, For example, let Fs=Fsd=10 Hz as the default activation frequency.

If the conditionally spontaneous firing neuron is a spiking neuron, P is the probability of a series of spiking currently being activated, if the conditionally spontaneous firing neuron is activated, the activation rate is Fs, and if the conditionally spontaneous firing neuron is not activated, the activation rate is 0.

If the conditionally spontaneous firing neuron is a non-spiking neuron, P is the probability of current activation, if the conditionally spontaneous firing neuron is activated, the activation intensity is Fs, and if the conditionally spontaneous firing neuron is not activated, the activation intensity is 0.

In this embodiment, multiple (e.g., all) memory neurons 80 employ conditionally spontaneous firing neurons. When some memory neurons 80 encode new memory information, they can strengthen the connection weights through spontaneous firing and then combine with the synaptic plasticity process, so that the newly formed memory information can be consolidated in time, and participate in the process of information aggregation and information transcription in time. Similarly, some memory neurons 80 encoding older memory information can also have a greater probability of spontaneous firing, so as to reduce or avoid forgetting older memory information.

In this embodiment, each neuron and each connection (including neuron-neuron connection and synapse-synapse connection) can be represented by vector or matrix. The operation of the brain-like neural network is represented by vector or matrix operation. For example, if the parameters of the same kind in each neuron and each connection (such as the firing rate of the neuron and the weight of the connection) are tiled into a vector or matrix, the signal propagation of the brain-like neural network can be expressed as the dot multiplication operation of the firing rate vector of the neuron and the weight vector of the connection (that is, the weighted sum of the input).

In another embodiment, each neuron and each connection (including neuron-neuron connection and synapse-synapse connection) can also be implemented by objectification. For example, if they are respectively implemented as an object (object in object-oriented programming), the operation of the brain-like neural network is represented as the invocation of objects and the transfer of information between objects.

In another embodiment, the brain-like neural network can also be implemented in the form of firmware (e.g., FPGA) or ASIC (e.g., neuromorphic chip).

As shown in FIG. 9, the perceptual module 1 comprises one or more (such as 10) perceptual encoding layers 11, and each perceptual encoding layer 11 comprises one or more perceptual encoding neurons 110.

As shown in FIG. 9, for example, each perceptual encoding neuron 110 in the first perceptual encoding layer 11 receives the R, G, and B values of the corresponding pixels for each frame of the image in the video stream input.

As shown in FIG. 9, a plurality of the perceptual encoding neurons located in one of the perceptual encoding layers and a plurality of other perceptual encoding neurons located in said one of the perceptual encoding layers respectively form unidirectional or bidirectional excitatory or inhibitory connections. These connections are defined as inter-layer connection. For example, each perceptual encoding neuron 110 in the third perceptual encoding layer 11 forms a unidirectional excitatory connection with 100 other perceptual encoding neurons 110 located in the same perceptual encoding layer 11.

A plurality of the perceptual encoding neurons located in said one of the perceptual encoding layers and a plurality of other perceptual encoding neurons located in a first perceptual encoding layer adjacent to said one of the perceptual encoding layers form unidirectional or bidirectional excitatory or inhibitory connections. These connections are defined as adjacent layer connections. For example, each perceptual encoding neuron in the second perceptual encoding layer 11 forms a unidirectional excitatory connection with 1000 perceptual encoding neurons in the third perceptual encoding layer 11.

A plurality of the perceptual encoding neurons located in said one of the perceptual encoding layers and a plurality of the perceptual encoding neurons located in a second perceptual encoding layer not adjacent to said one of the perceptual encoding layers respectively form unidirectional or bidirectional excitatory or inhibitory connections. These connections are defined as cross-layer connections. For example, each perceptual encoding neuron in the first perceptual encoding layer 11 forms a unidirectional excitatory type connection with 1000 perceptual encoding neurons in the third perceptual encoding layer 11, respectively.

In another embodiment, the perceptual module 1 can also accept audio input or other modal information input. For example, the audio information is decomposed into a number of (e.g., 32) frequency bands of signals, and each frequency band of signals is fed to one or more perceptual encoding neurons 110.

In another embodiment, the brain-like neural network can also employ two or more perceptual modules 1 to process the perceptual information of different modalities separately. For example, two perceptual modules 1 are employed, one accepting video stream input and the other accepting audio stream input.

In another embodiment, the one or more perceptual encoding layers of the perceptual module can also be convolutional layers. For example, let the second perceptual encoding layer 11 be a convolution layer, all connections between it and the perceptual encoding neurons in the third perceptual encoding layer 11 can be replaced by convolution operation, and signal projection relationships with one or more receptive fields can also be generated.

As shown in FIGS. 3, 4, 5, and 8, in a further improved embodiment, the memory module 8 comprises: a feature enabling sub-module 81, a concrete memory sub-module 82, and one or more abstract memory sub-modules 83. The information input channel 71 of the information synthesis and exchange module 7 comprises: a concrete information input channel 711 and an abstract information input channel 712.

Figure 3:
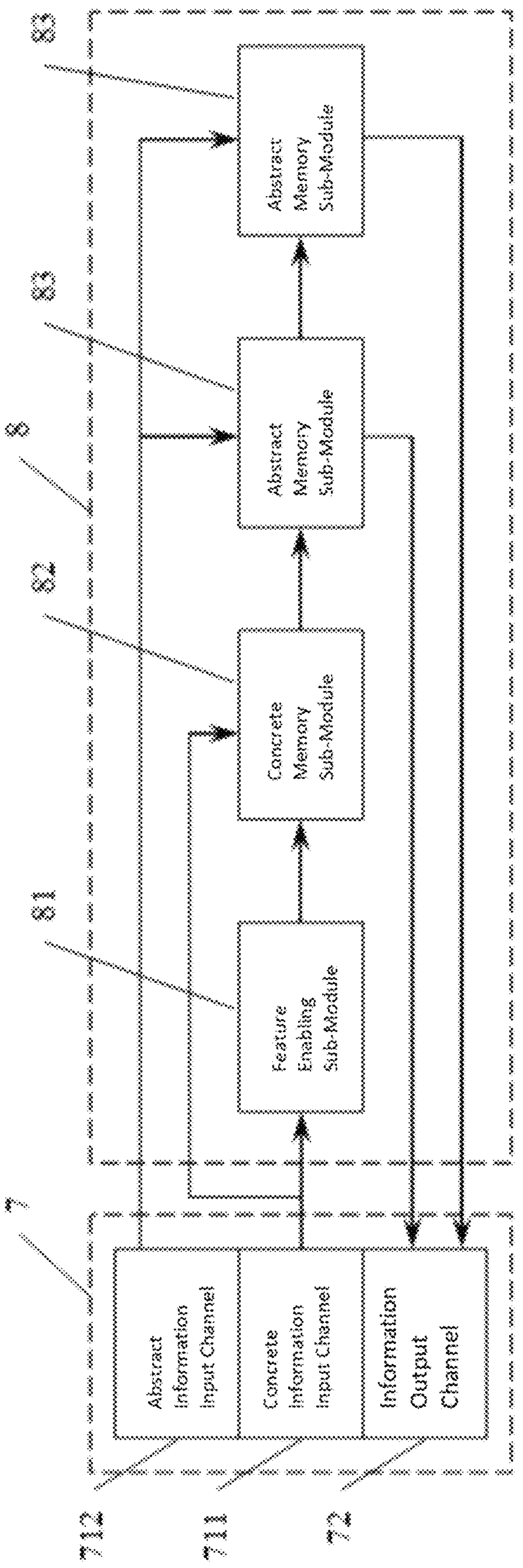
FIG. 3 is a detailed block diagram of the information synthesis and exchange module and the memory module of a brain-like neural network with memory and information abstraction functions in an embodiment of the present invention.

For example, FIG. 3 shows two abstract memory sub-modules 83.

The memory neurons 80 comprise cross memory neurons 810, concrete memory neurons 820, and abstract memory neurons 830.

The information input neurons 710 comprise concrete information input neurons 7110 and abstract information input neurons 7120.

The feature enabling sub-module 81 comprises a plurality of the cross memory neurons 810.

The concrete memory sub-module 82 comprises a plurality of the concrete memory neurons 820.

The abstract memory sub-modules 83 each comprises a plurality of the abstract memory neurons 830/

The concrete information input channel 711 comprises a plurality of the concrete information input neurons 7110.

The abstract information input channel 712 comprises a plurality of the abstract information input neurons 7120.

A plurality of said cross memory neurons 810 respectively form unidirectional excitatory connections with a plurality of other cross memory neurons 810. One or more of said cross memory neurons 810 respectively receive unidirectional excitatory connections from one or more of said concrete information input neurons 7110. One or more of the cross memory neurons 810 respectively form unidirectional excitatory connections with one or more of the concrete memory neurons 820.

Figure 8:
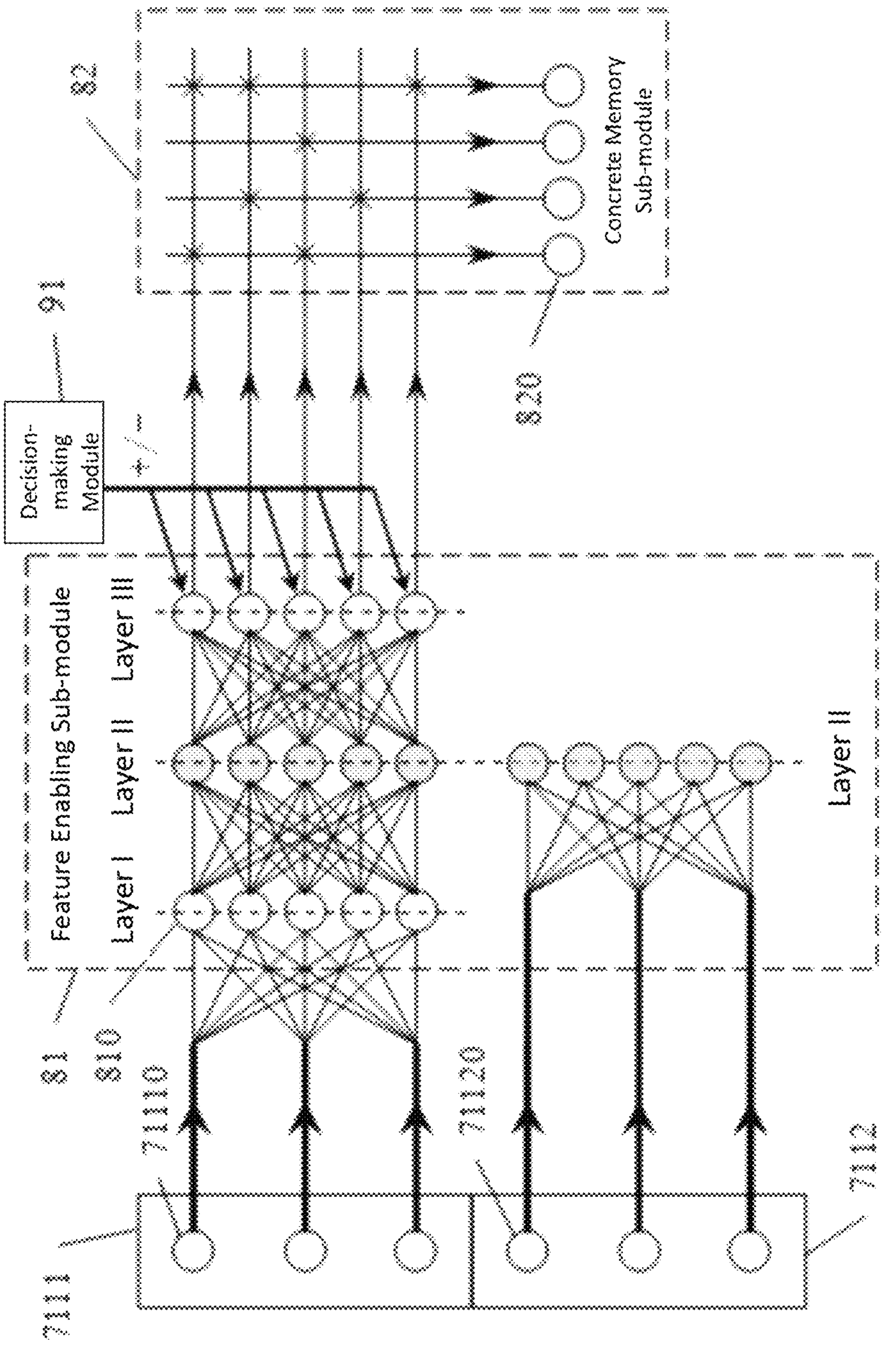
FIG. 8 is a schematic diagram of a detailed topology of feature enabling submodules of a brain-like neural network with memory and information abstraction functions in an embodiment of the present invention.

As shown in FIG. 8, each of one or more of the cross memory neurons 810 can also receive one or more information components control signal input terminals 912.

Figure 6:
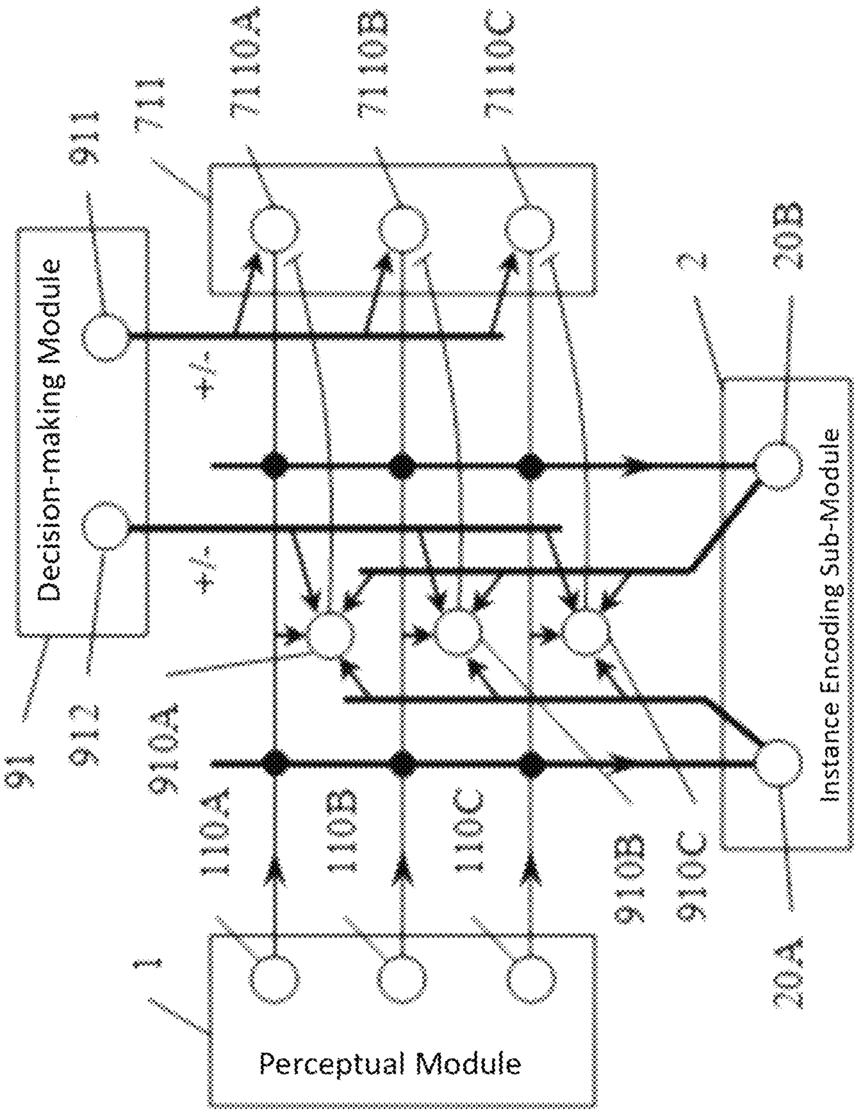
FIG. 6 is a schematic diagram of the detailed topology of the differential information decoupling neuron of a brain-like neural network with memory and information abstraction functions in an embodiment of the present invention.

As shown in FIGS. 5 and 6, in another embodiment, the brain-like neural network can also access an external module (such as the decision module 91), so that the attention control signal input terminal 911 and information components control signal input terminals 912 come from the external module (such as the decision module 91).

A plurality (such as 40,000) of the concrete memory neurons 820 respectively form unidirectional excitatory connections with one or more of other concrete memory neurons 820, a plurality (such as 1,000) of the concrete memory neurons 820 respectively form unidirectional excitatory connections with one or more (such as 1 to 10) of the information output neurons 720, one or more (such as 40,000) of the concrete memory neurons 820 form unidirectional excitatory connections with one or more (such as 100) of the abstract memory neurons 830.

A plurality (such as 40,000) of the abstract memory neurons 830 respectively form the unidirectional or bidirectional excitatory connections with one or more (such as 100) other abstract memory neurons 830, a plurality (such as 40,000) of the abstract memory neurons 830 respectively form unidirectional excitatory connections with one or more (such as 1 to 10) of the information output neurons 720.

Each of the concrete information input neurons 7110 forms unidirectional excitatory connections with one or more (such as 1,000 to 10,000) of the concrete memory neurons 830.

Each of the abstract information input neurons 7120 forms unidirectional excitatory connections with one or more (such as 1,000 to 10,000) abstract memory neurons 7120.

The working process of the feature enabling sub-module 81 also comprises: neuron regeneration process and information component adjustment process.

In this embodiment, the total number of said cross memory neurons 810 of the feature enabling sub-module 81 can be made to be at least 10 times the total number of said concrete memory neurons 820.

As shown in FIG. 7, in a further improved embodiment, the concrete information input channel 711 comprises a concrete instance temporal information input channel 7111 and a concrete environment spatial information input channel 7112. The abstract information input channel 712 comprises an abstract instance temporal information input channel 7121 and an abstract environment space information input channel 7122, the information output channel 72 comprises an instance temporal information output channel 721 and an environment spatial information output channel 722.

The concrete memory sub-module 82 comprises a concrete instance time memory unit 821 and a concrete environment spatial memory unit 822.

The abstract memory sub-module 83 comprises an abstract instance time memory unit 831 and an abstract environment spatial memory unit 832.

The concrete information input neurons 7110 each comprise a concrete instance temporal information input neuron 71110 and a concrete environment spatial information input neuron 71120.

The abstract information input neurons 7120 each comprises an abstract instance temporal information input neuron 71210 and an abstract environment spatial information input neuron 71220.

The information output neuron 720 comprises an instance temporal information output neuron 7210 and an environment spatial information output neuron 7220.

The concrete memory neurons 820 each comprises a concrete instance time memory neuron 8210 and a concrete environment spatial memory neuron 8220.

The abstract memory neurons 830 each comprises an abstract instance time memory neuron 8310 and an abstract environment spatial memory neuron 8320.

The concrete instance temporal information input channel 7111 comprises a plurality (such as 25,000) of the concrete instance temporal information input neurons 71110.

The concrete environment spatial information input channel 7112 comprises a plurality (such as 25,000) of the concrete environment spatial information input neurons 71120.

The abstract instance temporal information input channel 7121 comprises a plurality (such as 25,000) of the abstract instance temporal information input neurons 71210.

The abstract environment spatial information input channel 7122 comprises a plurality (such as 25,000) of the abstract environment spatial information input neurons 71220.

The instance temporal information output channel 721 comprises a plurality (such as 50,000) of the instance temporal information output neurons 7210.

The environment spatial information output channel 722 comprises a plurality (such as 50,000) of the environment spatial information output neurons 7220.

The concrete instance time memory unit 821 comprises a plurality (such as 25,000) of the concrete instance time memory neurons 8210.

The concrete environment spatial memory unit 822 comprises a plurality (such as 25,000) of concrete environment spatial memory neurons 8220.

The abstract instance time memory unit 831 comprises a plurality (such as 25,000) of abstract instance time memory neurons 8310.

The abstract environment spatial memory unit 832 comprises a plurality (such as 25,000) of the abstract environment spatial memory neurons 8320.

A plurality (such as 200) of the time encoding neurons 610 and the instance encoding neurons 20 respectively form unidirectional excitatory connections with one or more (such as 1 to 10) of the concrete instance temporal information input neurons 71110 or (such as 1 to 10) of the abstract instance temporal information input neurons 71210.

A plurality (such as 19) of the motion and orientation encoding neurons 50, (such as 100,000) of the environment encoding neurons 30 and (such as 100,000) the spatial encoding neurons 40 respectively form unidirectional excitatory connections with one or more of the concrete environment spatial information input neurons 71120 or the abstract environment spatial information input neurons 71220.

Each of the concrete instance temporal information input neurons 71110 forms unidirectional excitatory connections with one or more (such as 100 to 1,000) concrete instance time memory neurons 8210.

Each of the concrete environment spatial information input neurons 71120 and one or more (such as 100 to 1,000) of the concrete environment spatial memory neurons 8220 form unidirectional excitatory connections.

Each of the abstract instance temporal information input neurons 71210 and one or more (such as 100 to 1,000) of the abstract instance time memory neurons 8310 form unidirectional excitatory connections.

Each of the abstract environment spatial information input neurons 71220 forms unidirectional excitatory connections with one or more (such as 100 to 1,000) of the abstract environment spatial memory neurons 8320.

A plurality (such as 1,000 to 10,000) of the instance temporal information output neurons 7210 respectively accept unidirectional excitatory connections from one or more (such as 100 to 1,000) of the abstract instance time memory neurons 8310, and can also form unidirectional excitatory connections with one or more (such as 1,000 to 10,000) of the instance encoding neurons 20.

A plurality (such as 1,000 to 10,000) of the environment spatial information output neurons 7220 respectively form unidirectional excitatory connections with one or more (such as 100 to 1,000) of the abstract environment spatial memory neurons 8320, can also form unidirectional excitatory connections with one or more (such as 1,000 to 10,000) of the environment encoding neurons 30, respectively, and can also form the unidirectional or bidirectional excitatory connections with one or more (such as 1,000 to 10,000) of the spatial encoding neurons 40.

A plurality (such as 20,000) of the concrete instance time memory neurons 8210 respectively form unidirectional excitatory connections with one or more (such as 100 to 1,000) of the abstract instance time memory neurons 8310.

A plurality (such as 20,000) of the concrete environment spatial memory neurons 8220 respectively form unidirectional excitatory connections with one or more (such as 100 to 1,000) of the abstract environment spatial memory neurons 8320.

A plurality (such as 20,000) of the abstract instance time memory neurons 8310 respectively form the unidirectional or bidirectional excitatory connections with one or more (such as 100 to 1,000) of the instance encoding neurons 20.

A plurality (such as 20,000) of the abstract environment spatial memory neurons 8320 respectively form the unidirectional or bidirectional excitatory connections with one or more (such as 100 to 1,000) of the environment encoding neurons 30 or the spatial encoding neurons 40.

A plurality (such as 5,000 to 10,000) of the concrete instance time memory neurons 8210 and a plurality (such as 5,000 to 10,000) of the concrete environment spatial memory neurons 8220 form the unidirectional or bidirectional excitatory connections with each other.

A plurality (such as 5,000 to 10,000) of the abstract instance time memory neurons 8310 and a plurality (such as 5,000 to 10,000) of the abstract environment spatial memory neurons 8320 form the unidirectional or bidirectional excitatory connections with each other.

As shown in FIG. 7, a plurality (such as 10,000) of the concrete instance temporal information input neurons 71110 form the unidirectional or bidirectional excitatory connections with one or more (such as 1,000) of the concrete environment spatial information input neurons 71120, a plurality (such as 10,000) of the concrete environment spatial information input neurons 71120 form the unidirectional or bidirectional excitatory connections with one or more (such as 1,000) of the concrete instance temporal information input neurons 71110.

A plurality (such as 10,000) of the abstract instance temporal information input neurons 71210 respectively form the unidirectional or bidirectional excitatory connections with one or more (such as 1,000) of the abstract environment spatial information input neurons 71220, a plurality (such as 10,000) of the abstract environment spatial information input neurons 71220 and one or more (such as 1,000) of the abstract instance temporal information input neurons respectively form the unidirectional or bidirectional excitatory connections 71210.

A plurality (such as 10,000) of the concrete instance temporal information input neurons 71110 or the abstract instance temporal information input neurons 71210 respectively form the unidirectional or bidirectional excitatory connections with one or more (such as 1,000) of the instance temporal information output neurons 7210, a plurality (such as 10,000) of the concrete environment spatial information input neurons 71120 or the abstract environment spatial information input neurons 71220 form the unidirectional or bidirectional excitatory connections with one or more (such as 1,000) of the environment spatial information output neurons 7220.

A plurality (such as 10,000) of the instance temporal information output neurons 7210 and the environment spatial information output neurons 7220 can also form the unidirectional or bidirectional excitatory connections with each other. Separating the information processing channels of the instance time and environment space is helpful to keep the information decoupled, and to carry out the information aggregation process and the information transcription process according to different information components.

The benefits of the above excitatory connections between the concrete instance temporal information input neuron 71110 and the concrete environment spatial information input neurons 71120, and the excitatory connections between the abstract instance temporal information input neurons 71210 and the abstract environment spatial information input neurons 71220, are that when some instance objects in sample (image or video) are observed, the corresponding information input neurons (ION) 710 are activated. Through the connections, the priming effect is achieved, making the input neurons (ION) 710 corresponding to the related (often accompanied) environment object are more likely to be activated, thus easier to automatically be observed. On the other hand, when an environment object is observed, its associated (and often accompanying) instance objects are more likely to be automatically observed. In this way, the instance object and the environment object can cooperatively enter the memory module 8, which is conducive to forming the encoding combined with the context. This is an automatic (or bottom-up) attention process.

Similarly, the connections between the instance temporal information output neuron 7210 and the concrete instance temporal information input neurons 71110 or the abstract instance temporal information input neurons 71210, as well as the connections between the concrete environment spatial information input neurons 71120 or the abstract environment spatial information input neuron 71220 and the environment spatial information output neuron 7220 also implement the priming effect, so that the specific input information promotes the specific output information, and vice versa.

As shown in FIG. 8, in a further improved embodiment, each of the cross memory neurons 810 of the feature enabling sub-module 81 is arranged in layer Q, and each of the cross memory neurons 810 in layers 1 to L respectively receives unidirectional excitatory connections from one or more of the concrete instance temporal information input neurons 71110. Each of the cross memory neurons 810 from the H layer to the last layer forms unidirectional excitatory connections with one or more of the concrete memory neurons 820. Each of the cross memory neurons 810 in any layer from L+1 to H−1 receives unidirectional excitatory connections from one or more of the concrete environment spatial information input neurons 71120. A plurality of the cross memory neurons 810 of each adjacent layer form unidirectional excitatory connections from front layer to back layer.

In particular, $1 \le L < H \le Q$, $L \le H-2$, $Q \ge 3$.

In another embodiment, the number of the cross memory neurons 810 in the first layer can be made to be at least 5 times the sum of the number of the temporal information input neurons 71110 and the spatial information input neurons 71120 for the concrete instance (e.g. 500,000).

In FIG. 8, the feature enabling sub-module 81 includes layers I, II, and III (810 with 500,000 cross memory neurons in each layer), as well as upper and lower parts. The lower part only shows layer II, which means that multiple (e.g., 50,000) concrete environment spatial information input neurons 71120 can form unidirectional excitatory connections with multiple (e.g., 10,000) cross memory neurons 810 in layer II in the upper and lower parts, respectively. It means that multiple (e.g., 50,000) concrete instance temporal information input neurons 71110 can form unidirectional excitatory connections with multiple (e.g., 10,000) cross memory neurons 810 in layer I of upper and lower parts respectively. Multiple (e.g., 500,000) cross memory neurons 810 in layer III form unidirectional excitatory connections with multiple (e.g., 30 to 200) concrete memory neurons 820 respectively, and these connections can have large weights (e.g., 0.05), which account for a large proportion (e.g., more than 50%) of the total input connections of these concrete memory neurons 820. In such case, a set of (say 1,000) cross memory neurons 810 acts as an "index" to select a set of (say 100) concrete memory neurons 820 to which it is connected, and only the former is activated when the latter can more easily be activated by the input of the concrete instance temporal information input neurons 71110 and the concrete environment spatial information input neurons 71120. In this way, multiple concrete memory neurons 820 can be grouped and managed according to the features (or the combination of multiple features), so as to specifically input and activate specific concrete memory neurons 820 groups to avoid confusion. Each cross-memory neuron 810 in layer III also receives an information components control signal input terminal.

Figure 15:
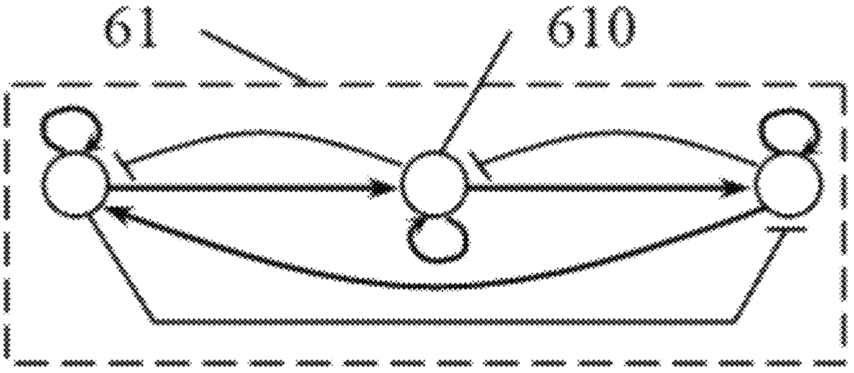
FIG. 15 is a schematic diagram of a single time encoding unit of a brain-like neural network with memory and information abstraction functions in an embodiment of the present invention.

As shown in FIG. 15, in a further improved embodiment, the time encoding module 6 comprises one or more (such as 3) time encoding units 61, and each time encoding unit 61 comprises a plurality (such as 20 to 100) of said time encoding neurons 610, each of the time encoding neurons 610 sequentially forms excitatory connections in a forward direction, and sequentially forms inhibitory connections in a reverse direction, and is connected end to end to form a closed loop. Each of the time encoding neurons 610 can also have excitatory connections connected back to itself (called self-connection) so that the time encoding neurons 610 can be continuously activated until this time encoding neuron is shut down by inhibitory input of a next time encoding neuron 610. When each of the time encoding neurons 610 activates, said each time encoding neuron 610 inhibits a previous time encoding neuron 610 to weaken or stop its activation, and promotes the next time encoding neuron 610 to gradually increase the next time encoding neuron's membrane potential until the next time encoding neuron 610 starts to activate, so that each time encoding neuron 610 forms a time-sequential switch loop.

Figure 16:
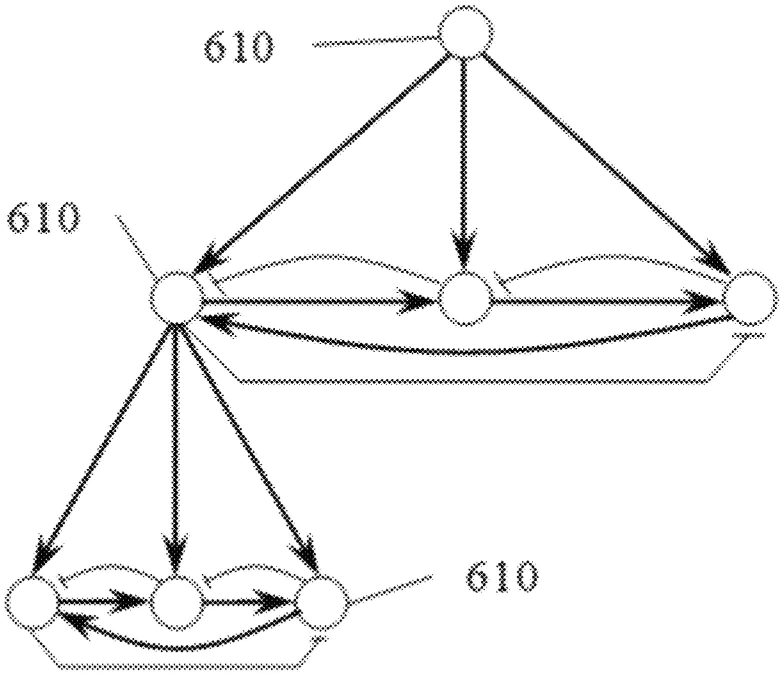
FIG. 16 is a schematic diagram of a cascade of multiple time encoding units of a brain-like neural network with memory and information abstraction functions in an embodiment of the present invention.

As shown in FIG. 16, in another embodiment, a plurality of the time encoding neurons 610 located in a certain time encoding unit 61 can respectively form unidirectional or bidirectional excitatory or inhibitory connections with a plurality of the time encoding neurons 610 located in another time encoding unit 61, in order to make the different time encoding units 61 to form a coupling, lock the time phase, ensure the synchronous activation. The self-connection of each time encoding neuron 610 in FIG. 16 has been omitted. The time encoding unit 61 on the top shows only one time encoding neuron 610, which forms unidirectional excitatory connections with each time encoding neuron 610 in the time encoding unit 61 in the middle. The latter, in turn, forms unidirectional excitatory connections to each of the time encoding neurons 610 in the time encoding unit 61 (only one is shown) on the bottom.

In this embodiment, the time encoding neurons 610 may be an integral spiking neuron or a leaky integral spiking neuron.

In this embodiment, the individual time-coded neurons 610 in the same time-coded unit 61 May adopt the same or different integration time constants.

In this embodiment, the same or different integration time constants can be employed for the individual time-encoding neurons 610 in the different time-encoding units 61, so that the different time-encoding units 61 encode different time periods.

In this embodiment, during initialization, the initial membrane potential is set for each time-coded neuron 610 in the same time-coded unit 61 such that at least one of the time-coded neurons 610 is emitted and the rest of the time-coded neurons 610 are at rest. By adjusting the Leaky time constant of each time-coded neuron 610, as well as the threshold, the time period of its switching can be adjusted.

Described, for example, using four time encoding unit 61, encoding units mentioned in the first time cycle of 61 completed a cycle can be set to 24 hours, encoding units mentioned in the second time cycle of 61 completed a cycle can be set to 1 hour, encoding units mentioned in the third time cycle of 61 completed a cycle can be set to 1 minute, The cycle of the fourth time encoding unit 61 to complete a cycle can be set to 1 second. Thus, a multilevel clock reference is formed. Any moment can be represented by these time encoding neurons 610.

In this embodiment, the time-coded neuron 610 may be an integral spiking neuron or a leaky integrate-and-fire neuron.

In this embodiment, the individual time-coded neurons 610 in the same time-coded unit 61 may adopt the same or different integration time constants.

In this embodiment, the same or different integration time constants can be employed for each time encoding neuron 610 in the different time encoding units 61, so that the different time encoding units 61 can encode different time cycles.

In this embodiment, during the initialization, initial membrane potential is set for each time encoding neuron 610 in the same time encoding unit 61 such that at least one of the time encoding neurons 610 is emitted and the rest of the time encoding neurons 610 keep rest. By adjusting the leaky time constant of each time encoding neuron 610, as well as the threshold, the time period of that is switched by the each encoding neuron can be adjusted.

In one example, the present invention uses four time encoding units 61. The period for the first said time encoding unit 61 to complete one cycle can be set to 24 hours. The period for the second said time encoding unit 61 to complete one cycle can be set to 1 hour. The period for the third said time encoding unit 61 to complete one cycle can be set to 1 minute. The period for the fourth said time encoding unit 61 to complete one cycle can be set to 1 second. Thus, a multilevel clock reference is formed, and any moment can be represented by these time encoding neurons 610.

Figure 10:
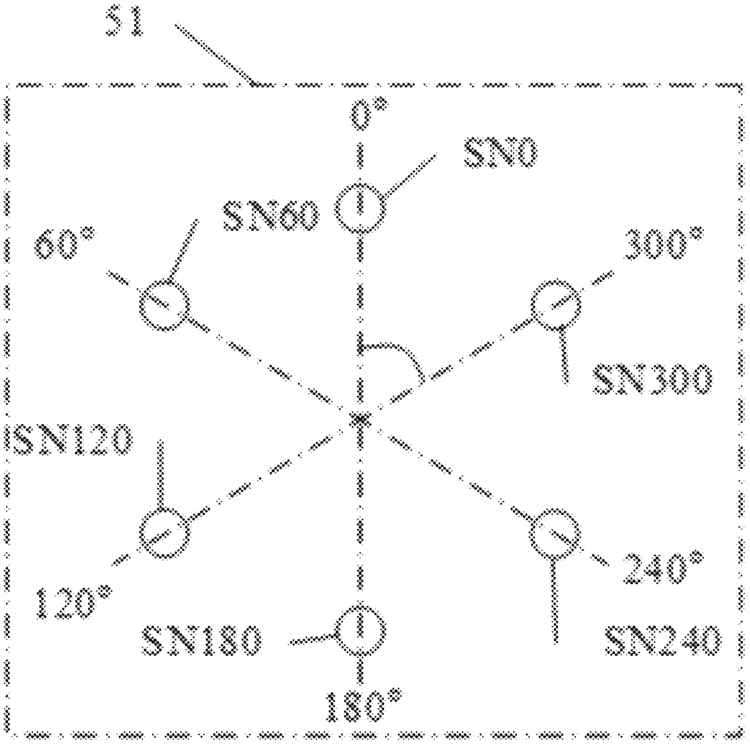
FIG. 10 is a schematic diagram of a speed encoding unit of a brain-like neural network with memory and information abstraction functions in an embodiment of the present invention.
Figure 11:
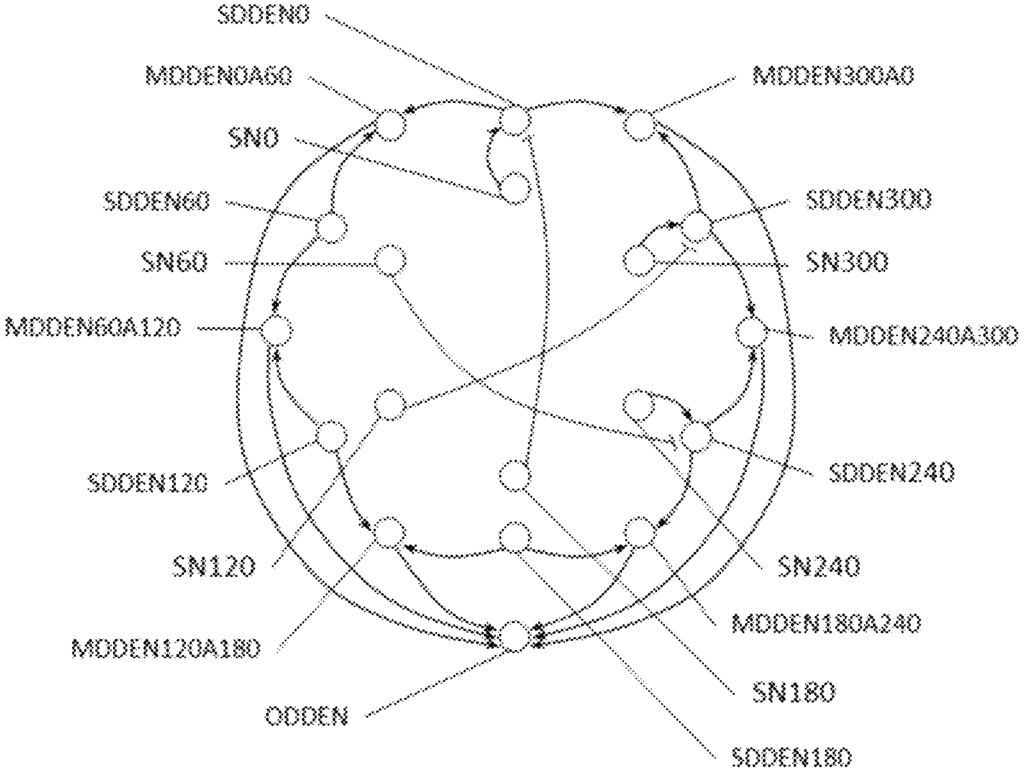
FIG. 11 is a schematic diagram of a single speed encoding unit and a single relative displacement encoding unit of a brain-like neural network with memory and information abstraction functions in an embodiment of the present invention.

As shown in FIGS. 10 and 11, in another further improved embodiment, the motion and orientation encoding module 5 comprises one or more speed encoding units 51 and one or more relative displacement encoding units.

The motion and orientation encoding neuron 50 comprises a speed encoding neuron 510, a unidirectional integral distance displacement encoding neuron, a multidirectional integral distance displacement encoding neuron, and an omnidirectional integral distance displacement encoding neuron.

The speed encoding unit 51 comprises 6 speed encoding neurons, named SN0, SN60, SN120, SN180, SN240, and SN300, respectively, and each of the speed encoding neurons 510 encodes the instantaneous speed component (non-negative value) of the intelligent agents in a direction of movement, adjacent motion directions are separated by 60°, and axis of each direction of movement divides a plane space into 6 equal parts. Each speed encoding neuron's activation rate is determined as follows:

step a1: setting reference direction of the plane space where the movement is located (fixed to the environment space where the intelligent agent is located), the reference direction is set to 0°, where the instantaneous speed components in the directions of 0°, 60°, 120°, 180°, 240° and 300° are encoded by SN0, SN60, SN120, SN180, SN240 and SN300 successively, step a2: obtaining current instantaneous motion speed V and direction of instantaneous speed of the intelligent agent, step a3: if the direction of instantaneous speed is between 0° direction and 60° direction, including a case in coincidence with the 0° direction, and an angle with the 0° direction is θ, setting the activation rate of the speed encoding neuron SN0 to Ks1*V*sin(60°−θ)/sin(120°), and setting the activation rate of the speed encoding neuron SN60 to Ks2*V*sin(θ)/sin(120°), and setting the activation rate of other speed encoding neurons to 0, if the direction of the instantaneous speed is between the 60° direction and 120° direction, including a case in coincidence with the 60° direction, and an angle with the 60° direction is θ, setting the activation rate of the speed encoding neuron SN60 as Ks3*V*sin(60°−θ)/sin(120°), setting the activation rate of the speed encoding neuron SN120 to Ks4*V*sin(θ)/sin(120°), other setting the activation rate of the other speed encoding neurons to 0, if the direction of the instantaneous speed is between the 120° direction and 180° direction, including a case in coincidence with the 120° direction, and an angle with the 120° direction is θ, setting the activation rate of the speed encoding neuron SN120 as Ks5*V*sin(60°−θ)/sin(120°), setting the activation rate of the speed encoding neuron SN180 to Ks6*V*sin(θ)/sin(120°), and setting the activation rate of the other speed encoding neurons to 0, if the direction of the instantaneous speed is between the 180° direction and 240° direction, including a case in coincidence with the 180° direction, and an angle with the 180° direction is θ, setting the activation rate of the speed encoding neuron SN180 as Ks7*V*sin(60°−θ)/sin(120°), setting the activation rate of the speed encoding neuron SN240 to Ks8*V*sin(θ)/sin(120°), and setting the activation rate of the other speed encoding neuron to 0, if the direction of the instantaneous speed is between the 240° direction and 300° direction, including a case in coincidence with the 240° direction, and an angle with the 240° direction is θ, setting the activation rate of the speed encoding neuron SN240 as Ks9*V*sin(60°−θ)/sin(120°), setting the activation rate of the speed encoding neuron SN300 to Ks10*V*sin(θ)/sin(120°), and setting the activation rate of the other speed encoding neurons to 0, if the direction of the instantaneous speed is between the 300° direction and 0° direction, including a case in coincidence with the 300° direction, and an angle with the 300° direction is θ, setting the activation rate of the speed encoding neuron SN300 as Ks11*V*sin(60°−θ)/sin(120°), setting the activation rate of the speed encoding neuron SN0 to Ks12*V*sin(θ)/sin(120°), and setting the activation rate of the other speed encoding neurons to 0, step a4: repeating step a2 and step a3 until the intelligent agent moves to a new environment, then resetting the reference direction and starting from step a1.

In particular, the Ks1, Ks2, Ks3, Ks4, Ks5, Ks6, Ks7, Ks8, Ks9, Ks10, Ks11, Ks12 are speed correction coefficients, can be set for example between 0.8 to 1.2.

The relative displacement encoding units each comprises 6 unidirectional integral distance displacement encoding neurons, 6 multidirectional integral distance displacement encoding neurons, and 1 omnidirectional integral distance displacement encoding neuron ODDEN, the 6 unidirectional integral distance displacement encoding neurons are respectively named SDDEN0, SDDEN60, SDDEN120, SDDEN180, SDDEN240, SDDEN300, and the 6 multidirectional integral distance displacement encoding neurons are respectively named MDDEN0A60, MDDEN60A120, MDDEN120A180, MDDEN180A240, MDDEN240A300, MDDEN300A0.

The unidirectional integral distance displacement encoding neurons SDDEN0, SDDEN60, SDDEN120, SDDEN180, SDDEN240, SDDEN300 encode displacements in the direction of 0°, 60°, 120°, 180°, 240°, and 300°, respectively.

The multi-directional integral distance displacement encoding neuron MDDEN0A60 encodes a displacement of 0° or 60° sub-direction, MDDEN60A120 encodes a displacement of 60° or 120° sub-direction, MDDEN120A180 encodes a displacement of 120° or 180° sub-direction, and MDDEN180A240 encodes a displacement of 180° or 240° sub-direction, MDDEN240A300 encodes a displacement of 240° or 300° sub-direction, MDDEN300A0 encodes a displacement of 300° or 0° sub-direction.

The omnidirectional integral distance displacement encoding neuron ODDEN encodes displacements of 0°, 60°, 120°, 180°, 240°, and 300° in each sub-direction.

SDDEN0 accepts excitatory connections from SN0 and inhibitory connections from SN180.

SDDEN60 accepts excitatory connections from SN60 and the inhibitory connections from SN240.

SDDEN120 accepts excitatory connections from SN120 and inhibited connections from SN300.

SDDEN180 accepts excitatory connections from SN180 and inhibitory connections from SN0.

SDDEN240 accepts activation connections from SN240 and inhibited connections from SN60.

SDDEN300 accepts the excitatory connections from SN300 and the inhibitory connections from SN120.

MDDEN0A60 accepts exciting connections from SDDEN0 and SDDEN60.

MDDEN60A120 accepts exciting connections from SDDEN60 and SDDEN120.

MDDEN120A180 accepts exciting connections from SDDEN120 and SDDEN180.

MDDEN180A240 accepts exciting connections from SDDEN180 and SDDEN240.

MDDEN240A300 accepts exciting connections from SDDEN240 and SDDEN300.

MDDEN300A0 accepts exciting connections from SDDEN300 and SDDEN0.

ODDEN accepts exciting connections from MDDEN0A60, MDDEN60A120, MDDEN120A180, MDDEN180A240, MDDEN240A300, MDDEN300A0.

In FIG. 11, only the connections between 3 unidirectional integral distance displacement encoding neurons (SDDEN0, SDDEN300, SDDEN240) and their corresponding speed encoding neurons are shown for clear drawing. The connections between the other three one-way integral distance displacement encoding neurons and their corresponding speed encoding neurons are similar to the former, which have been omitted from the figure.

Calculation process of the unidirectional integral distance displacement encoding neuron is:

step b1: adding weighted sum of all inputs to the membrane potential at the previous moment to obtain current membrane potential, step b2: when the current membrane potential is within the interval of a first pre-set potential, the activation rate of the unidirectional integral distance displacement encoding neuron is the maximum when the current membrane potential is equal to the first pre-set potential, the greater the deviation between the current membrane potential and the first pre-set potential, the lower the activation rate of the unidirectional integral distance displacement encoding neuron is until it reaches 0, step b3: when the current membrane potential is within the interval of a second pre-set potential, the activation rate of the unidirectional integral distance displacement encoding neuron is the maximum when the current membrane potential is equal to the second pre-set potential, the greater the deviation between the current membrane potential and the second pre-set potential, the lower the activation rate of the unidirectional integral distance displacement encoding neuron is until it reaches 0.

step b4: when the current membrane potential is within third pre-set interval, the activation rate of the unidirectional integral distance displacement encoding neuron is the maximum when the current membrane potential is equal to the third pre-set potential interval, the greater the deviation between the current membrane potential and the third pre-set potential interval, the lower the activation rate of the unidirectional integral distance displacement encoding neuron is until it reaches 0, step b5: when the current membrane potential is greater than or equal to the second pre-set potential, resetting the current membrane potential to the first pre-set potential, step B6: when the current membrane potential is less than or equal to the third pre-set potential interval, resetting the current membrane potential to the first pre-set potential.

For each of the multi-directional integral distance displacement encoding neurons, if and only if two of the unidirectional integral distance displacement encoding neurons connected to it are activated at the same time, the multi-directional integral distance displacement encoding neuron is activated. For example, this condition can be satisfied by making each of the weights of these connections 0.4 and making the threshold of each multidirectional integral distance displacement encoding neuron 0.6.

The omnidirectional integral distance displacement encoding neuron ODDEN is activated when at least one of the multi-directional integral distance displacement encoding neuron connected with it is activated, the omnidirectional integral displacement encoding neuron ODDEN is activated. For example, this condition can be satisfied by making each of the weights of these connections 0.4 and making the threshold value of this omnidirectional integral distance displacement encoding neuron ODDEN 0.1.

In this embodiment, the third pre-set potential interval<the first pre-set potential interval<the second pre-set potential interval. The first pre-set potential interval, the second pre-set potential interval and the third pre-set potential interval are the median values of the first pre-set potential interval, the second pre-set potential interval and the third pre-set potential interval in turn.

For example, the third pre-set interval is configured between −50 mV to −30 mV, and the third pre-set potential interval is configured as −40 mV. The second pre-set potential interval is configured between +30 mV to +50 mV, and the second pre-set potential is configured as +40 mV. The first pre-set potential interval is configured between −10 my to +10 mV, and the first pre-set potential is configured to be 0 mV.

In this embodiment, the displacement scale range encoded by the unidirectional integral distance displacement encoding neuron is adjusted by adjusting the first pre-set potential or threshold of the unidirectional integral distance displacement encoding neuron. The amount of initial displacement bias encoded by the unidirectional integral distance displacement encoding neuron is adjusted by adjusting its initial membrane potential.

In this embodiment, when multiple relative displacement encoding units are used, different initial membrane potential values are used for each unidirectional integral distance displacement encoding neuron of the same relative displacement encoding unit, so that these unidirectional integral distance displacement encoding neurons have different initial displacement bias amounts. The unidirectional integral distance displacement encoding neurons located in different relative displacement encoding units adopt different said first pre-set potentials or thresholds, so that each relative displacement encoding unit encodes different displacement scale, and then make the relative displacement encoding unit's code can cover the entire area of the intelligent agent's environment.

In this embodiment, the initial membrane potential values of a pair of the unidirectional integral distance displacement encoding neurons with opposite representation directions in the same relative displacement encoding unit are the inverse of each other.

In another embodiment, a plurality of the speed encoding units and a plurality of the relative displacement encoding units can be used to respectively represent different and intersecting plane spaces to represent a three-dimensional space. For example, one relative displacement encoding unit represents the planar space parallel to the ground, and another relative displacement encoding unit represents the planar space perpendicular to the ground.

In this embodiment, the neurons further comprise interneurons.

The perceptual module 1, the instance encoding module 2, the environment encoding module 3, the spatial encoding module 4, the information synthesis and exchange module 7, and the memory module 8 respectively comprise a plurality of the interneurons, unidirectional inhibitory connections are formed with a plurality of corresponding neurons in a corresponding module, and a corresponding number of neurons in each module forms unidirectional excitatory connections with a plurality of corresponding interneurons.

For example, the perceptual module 1 includes a number of (say, 1 million) interneurons 930. Several (e.g., 8 million) perceptual encoding neurons 110 form unidirectional excitatory connections with several (e.g., 1-10) interneurons 930. Several interneurons (e.g., 500,000) interneurons 930 form unidirectional inhibitory connections with several (e.g., 100) perceptual encoding neurons 110.

For example, the instance encoding module 2 includes a number of (say, 10,000) interneurons 930. Several (e.g., 80,000) instance encoding neurons 20 form unidirectional excitatory connections with several (e.g., 1-10) interneurons 930. Several interneurons (e.g., 5,000) interneurons 930 form unidirectional inhibitory connections with several (e.g., 10) instance encoding neurons 20.

For example, the environment encoding module 3 includes a number of (say, 10,000) interneurons 930. Several (e.g., 80,000) environment encoding neurons 30 form unidirectional excitatory connections with several (e.g., 1-10) interneurons 930. Several interneurons (e.g., 5,000) interneurons 930 form unidirectional inhibitory connections with several (e.g., 10) environment encoding neurons 30.

For example, the spatial encoding module 4 includes a number of (say, 10,000) interneurons 930. Several (e.g., 80,000) the spatial encoding neurons 40 form unidirectional excitatory connections with several (e.g., 1-10) interneurons 930. Several interneurons (e.g., 5,000) interneurons 930 form unidirectional inhibitory connections with several (e.g., 10) spatial encoding neurons 40.

For example, the information synthesis and exchange module 7 includes a number of (say, 20,000) interneurons 930. Several (e.g., 80,000) information input neurons 710 form unidirectional excitatory connections with several (e.g., 1-10) interneurons 930. Several interneurons (e.g., 50,0000) interneurons 930 form unidirectional inhibitory connections with several (e.g., 10) information input neurons 710. Several (e.g., 80,000) information output neurons 720 form unidirectional excitatory connections with several (e.g., 1-10) interneurons 930. Several interneurons (e.g., 10,000) interneurons 930 form unidirectional inhibitory connections with several (e.g., 10) information output neurons 720.

For example, the memory module 8 includes a number of (say, 10,000) interneurons 930. Several (e.g., 80,000) memory neurons 80 form unidirectional excitatory connections with several (e.g., 1-10) interneurons 930. Several interneurons (e.g., 5,000) interneurons 930 form unidirectional inhibitory connections with several (e.g., 10) memory neurons 80.

Figure 14:
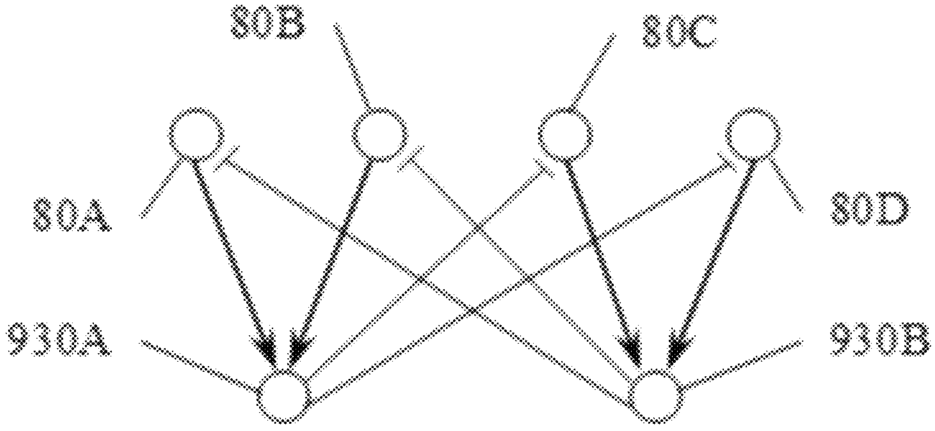
FIG. 14 is a schematic diagram of the topology of interneurons of a brain-like neural network with memory and information abstraction functions in an embodiment of the present invention.

FIG. 14 shows the topological relationship between several memory neurons 80A, 80B, 80C, 80D and several interneurons 930A and 930B, and the topological relationship between other neurons and interneurons 930 is similar to the former. As can be seen in FIG. 14, memory neurons 80A and 80B are a group, memory neurons 80C and 80D are a group, and these two groups compete with each other through interneurons 930A and 930B.

In this embodiment, the corresponding two or more groups of neurons in each of the modules form inter-group competition (lateral inhibition) through the interneurons. When input is applied, the competing groups of neurons produce different overall activation intensity (or firing rate) of the interneurons. The lateral inhibition of the interneurons makes the overall activation intensity (or firing rate) stronger for the strong and weaker for the weak, or makes the neurons (groups) that start firing earlier inhibit the neurons (groups) that fire later so as to form a time difference, ensuring that the information encoding of the neurons in each group is independent and decoupled from each other, and automatically grouped. Such design also allows that the input information in the process of memory triggering can trigger the memory information with the highest correlation, and the neurons participating in the directed information aggregation process can be automatically grouped into the Ga1, Ga2, Ga3, Ga4 according to the response (activation intensity or firing rate size, or release time sequence).

In this embodiment, the neurons further comprise differential information decoupling neurons.

As shown in FIGS. 5 and 6, a plurality of the neurons with unidirectional excitatory connections with the information input neuron 7 are selected as concrete information source neurons, and a plurality of other neurons with unidirectional excitatory connections with the information input neurons 7 are selected as abstract information source neurons, each of the concrete information source neurons has one or more (such as 1) matched differential information decoupling neurons 930, the concrete information source neurons and each matched differential information decoupling neuron 930 respectively form unidirectional excitatory connections, the information decoupling neurons respectively with input neurons form unidirectional inhibitory connections with the information source input neurons, or form unidirectional inhibitory synapse-synaptic connections with connections input from the information source neurons to the information input neurons 7, so as to make signal input from the concrete information source neurons to the information input neurons 7 to be subject to inhibitory regulation by the matched differential information decoupling neurons 930.

Each differential information decoupling neuron can have a decoupled control signal input terminal. Degree of information decoupling is adjusted by adjusting magnitude (which can be positive, negative, or 0) of the signal applied on decoupling control signal input.

Weights of unidirectional excitatory connections between the concrete information source neurons/abstract information source neurons and the matched differential information decoupling neurons is constant (such as 0.1), or is dynamically adjusted through the synaptic plasticity process.

In this embodiment, one scheme of the synapse-synaptic connection is that, the connection Sconn1 accepts the input of one or more other connections (denoted as Sconn2), and when the upstream neurons connected to Sconn1 is fired, the value passed from connection Sconn1 to downstream neurons is the weight of connection Sconn1 plus the input value of each connection Sconn2.

For example, the weight of connection Sconn1 is 5, the weight of connection Sconn2 is −1, and the former accepts the input of the latter. When the upstream neuron connected to Sconn1 is activated, and the upstream neuron connected to Sconn2 is also activated, then the value of the input of connection Sconn2 to connection Sconn1 is −1, and the value of connection Sconn1 transmitted to its downstream neurons is 5-1, i.e., 4.

Referring to FIG. 5 and FIG. 6, for example, when a novel sample (image or video stream) is input, a group of perceptual encoding neurons 110A, 110B, and 110C (that is, the concrete information source neurons) are activated, and the coded representation information is transmitted to the memory module 8 through its unidirectional excitatory connection with a group of concrete information input neurons 7110A, 7110B, 7110C and is cached as the concrete memory information. During the directional information aggregation process of the memory module 8, the concrete memory information is aggregated into abstract memory information. In the information transcription process, the abstract memory information cached in the memory module 8 is transferred to the instance encoding module 2, and are encoded as instance representation information by a set of instance encoding neurons 20A, 20B (as the abstract information source neurons). When the same sample is input again, the group of perceptual encoding neurons 110A, 110B, and 110C are activated again, and then the same sample is propagated to the instance encoding module 2, activating the same group of instance encoding neurons 20A, 20B and triggering the encoded instance representation information encoded by 20A and 20B, and then is passed to the memory module 8 through the information input neurons 7110A, 7110B, 7110C. This group of instance encoding neurons 20A, 20B activates the differential information decoupling neurons 910A, 910B 910C, inhibits the input of the group of perceptual encoding neurons 110A, 110B, 110C to the concrete information input neurons 7110A, 7110B, 7110C, so that more abstract instance representation information enters the memory module 8 in replace of the original (more concrete) visual representation information. The whole process abstracts the concrete information into abstract information gradually, saving encoding and signal transmission bandwidth.

In this embodiment, a basic working process of the brain-like neural network, its modules or sub-modules is: respectively selecting a number of, in several candidate neurons (in a certain module or sub-module), vibrating neurons, source neurons, target neurons, and making a certain number of the vibrating neurons generate a certain activation distribution and maintain activation for a certain period of time or operation cycle, so as to adjust the weights of the connections between the neurons participating in said work process through the synaptic plasticity process.

The activation distribution is as follows: a number of the neurons generate the same or different activation intensity, firing rate, and pulse phase, respectively. For example, neurons A, B, and C generate activation intensities of amplitude 2, 5, and 9, respectively, or firing rates of 0.4 Hz, 50 Hz, and 20 Hz, respectively, or spike phases of 100 ms, 300 ms, and 150 ms, respectively. The activation distribution is as follows: a number of the neurons generate the same or different activation intensity, firing rate, and pulse phase, respectively. For example, neurons A, B, and C generate activation intensities of amplitude 2, 5, and 9, respectively, or firing rates of 0.4 Hz, 50 Hz, and 20 Hz, respectively, or spike phases of 100 ms, 300 ms, and 150 ms, respectively.

The process of selecting vibrating neurons, source neurons or target neurons from a plurality of candidate neurons comprises one or more of: selecting part or all of first Kf1 neurons with smallest weights total module length of the input connections, selecting part or all of first Kf2 neurons with smallest weights total module length of the output connections, selecting part or all of first Kf3 neurons with largest weights total module length of the input connections, selecting first Kf4 neurons with the largest total weights module length of the output connections, and selecting first Kf5 with largest activation intensity or activation rate or first to be activated, selecting first Kf6 neurons with smallest activation intensity or activation rate or latest to be activated (including not activated), selecting first Kf7 neurons that have been longest since last activation, selecting first Kf8 neurons that have been closest since the last activation, selecting first Kf9 neurons that have been longest since the last time when the input connections or the last output connections perform the synaptic plasticity process, and selecting first Kf10 that have been closest since the last time when the input connections or the last output connections perform the synaptic plasticity process.

For example, Kf1, Kf2, Kf3, Kf4, Kf5, Kf6, Kf7, Kf8, Kf9, and Kf10 can be integers from 1 to 100.

In this embodiment, the method for a plurality (such as 10,000) of the neurons to generate an activation distribution and maintain a pre-set period (such as 200 ms to 2 s) of activation comprises: inputting samples (images or video streams), directly activating one or more of the neurons (such as 100,000 perceptual encoding neurons 110) in the brain-like neural network, letting one or more of the neurons (such as 1000 said memory neurons 80) in the brain-like neural network to be self-activated, and transmitting existing activation states of one or more of the neurons (such as 2 time encoding neurons 610) in the brain-like neural network, so as to activate one or more of the neurons (such as the vibrating neurons), or if the neuron are the information input neurons 710, adjusting the activation distribution and activation duration of each information input neuron 710 through the attention control signal input terminal 911.

The memory triggering process comprises: inputting the samples (images or video streams), or directly activating the brain-like neural network's one or more of the neurons, or allowing one or more of the neurons in the brain-like neural network to be self-activated, or transmitting the existing activation state of one or more of the neurons in the brain-like neural network, if one or more of neurons in the target area are activated in tenth pre-set period (such as 1 s), then representation of each activation neuron in the target area can be taken together with its activation intensity or activation rate as the result of the memory triggering process.

The target area can be the perceptual module 1, the instance encoding module 2, the environment encoding module 3, the spatial encoding module 4, and the memory module 8.

As shown in FIG. 12, in this embodiment, the brain-like neural network also includes a readout layer 92, including a plurality of readout layer neurons 920A, 920B, 920C, 920D, 920E, 920F. The memory triggering process can be reflected as the recognition process of the sample (images or video streams), that is, the information input to the target area is used as the input information, and each neuron emitted from the target area can be mapped to one or more labels through one or more readout layer neurons 920A, 920B, 920C, 920D, 920E, 920F as the recognition result. Each neuron of the target area forms a unidirectional excitatory or inhibitory connection with one or more neurons of the readout layer 920A, 920B, 920C, 920D, 920E and 920F. Each readout layer neuron 920 corresponds to a label. The higher the activation intensity or firing rate of the neuron 920, the higher the correlation between the input information and its corresponding label, and vice versa. For example, each label could be "Apple," "car,", "grassland", etc.

For example, samples (images or videos) are input to perceptive module 1 to activate multiple perceptual encoding neurons 110 and are gradually transferred to instance encoding module 2. The environment encoding module 3 comprise one or more said environment encoding neurons 30A, 30B, 30C that have existing activation states, which are also transferred to the instance encoding module 2. One or more of the instance encoding neurons 20A, 20B, 20C are activated during a certain time periods. Among them, the one with the largest activation intensity or firing rate or the one that starts firing first is mapped to the corresponding label through multiple readout layer neurons 920A, 920B, 920C, 920D, 920E, 920F as the recognition result of the instance appearing in the samples (images or videos), and the size of its activation intensity or firing rate is taken as the correlation degree.

For example, the activation of the neurons is then transmitted to the memory module 8 through the information input neurons 710. The movement of the intelligent agent activates one or more of the motion and orientation encoding neurons 50 and is also transmitted to the memory module 8 through the information input neurons 710. One or more said time encoding neurons 610's spontaneous firing state is transmitted through the information input neurons 710 to the memory module 8. Within a certain amount of time, one or more said memory neurons 80 are activated. The representation of one or more of the memory neurons 80 whose activation intensity or firing rate exceed a certain threshold is selected as the triggered memory information, and the activation intensity of each memory neuron 80 is taken as the proportion of each information component in the triggered memory information, and can be used as the correlation degree with the input information.

In this embodiment, in the memory triggering process, for input information that does not trigger a result with sufficient correlation, the neuron regeneration process and the information component adjustment process are executed in the feature enabling sub-module 81, and execute the instantaneous memory encoding process, the information component adjustment process, and the information aggregation process in the memory module 8, as well as perform the information transcription process between the memory module 8, the instance encoding module 2, the environment encoding module 3, and the spatial encoding module 4.

If the input information does not trigger a result with sufficient correlation in the memory triggering process, it means that the input information is relatively new compared to the existing memory information, and therefore should be memorized. In the feature enabling sub-module 81, a neuronal regeneration process is executed to allocate a new set of the cross memory neurons 810 and establish a connection with a set of the concrete memory neurons 820, the former being the "index" of the latter, so that the current input information can be "indexed" and then activate these representational memory neurons 820. In the feature enabling sub-module 81, a neuronal regeneration process is executed to allocate a new set of cross memory neurons 810 and establish a connection with a set of representational memory neurons 820. The former is the "index" of the latter, so that the current input information can be "indexed" and then activate these concrete memory neurons 820. The information component adjustment process is performed in the feature enabling sub-module 81, so that the encoding of the current input information of each cross memory neuron 810 is separated from the encoding of the existing similar information, so that the two are not easily confused, and the older encoding of the existing information is related to each other, so that they still have sufficiently rich and robust upstream and downstream connections to be triggered by input information without their "index" being permanently forgotten. At the same time, the group of concrete memory neurons 820 participates in the transient memory encoding process, encodes the input information into concrete memory information and temporarily stores it.

When there is enough concrete memory information stored in the memory module 8, the information aggregation process (especially the directional information aggregation process) is executed. The common information components of multiple segments of concrete memory information (each segment is encoded by a set of source neurons) can be extracted and stored in the memory module 8 as new abstract memory information (encoded by a set of target neurons). Then, through the information transcription process, the concrete memory information and the newly formed abstract memory information in the memory module 8 are transferred to the instance encoding module 2, the environment encoding module 3, and the spatial encoding module 4, and are stored as the long-term memory information.

As shown in FIG. 2, the instantaneous memory encoding process comprises:

step c1: selecting one or more of the information input neurons 710 (710A,710B, 710C, 710D) as the vibrating neurons, step c2: selecting one or more of the memory neurons 80 (80A, 80B, 80C, 80D) as the target neurons, step c3: adjust the weights of the unidirectional excitatory connections with between each activated vibrating neuron and one or more of the target neurons through the synaptic plasticity process, and step c4: allowing each activated target neuron to establish the unidirectional or bidirectional excitatory connections with one or more of the other target neurons, or establish self-circulating excitatory connections with itself, adjusting the weights of the unidirectional or bidirectional excitatory connections or the self-circulating excitatory connections through the synaptic plasticity process, For example, 10,000 of the total information input neurons 710 are selected as the vibrating neurons, and 1,000 of the total memory neurons 80 are selected as the target neurons.

When adjusting the weights of each connection between each target neuron through the synaptic plasticity process, the weights of part or all of the input/output connections can or cannot be standardized.

In this embodiment, the time sequence encoding process comprises:

step d1: selecting one or more of the information input neurons 710 (710A, 710B, 710C, 710D) as the vibrating neurons, step d2: during T1 time period, selecting one or more of the memory neurons as first group of the target neurons, adjusting the weights of the unidirectional excitatory connections between each activated vibrating neuron and one or more of the memory neurons 80 (80A, 80B, 80C, 80D) of the first group of the target neurons through the synaptic plasticity process step d3: during the T1 time period, allowing the unidirectional or bidirectional excitatory connections between the memory neurons 80 (80A, 80B, 80C, 80D) in the first group of target neurons to adjust the weights by the synaptic plasticity process, step d4: during T2 time period, selecting one or more of the memory neurons 80 (80E, 80F, 80G, 80H) as second group of the target neurons, adjusting the weights of the unidirectional excitatory connections through the synaptic plasticity process between each activated vibrating neuron and one or more of the memory neurons 80 (80E, 80F, 80G, 80H) of the second group of the target neurons, step d5: during the T2 time period, adjusting the weights of the unidirectional or bidirectional excitatory connections between the memory neurons 80 (80E, 80F, 80G, 80H) in the second group of target neurons through the synaptic plasticity process, and step d6: during T3 time period, forming the unidirectional or bidirectional excitatory connections between each memory neuron 80 (80A, 80B, 80C, 80D) in the first group of the target neurons and each memory neuron 80 (80E, 80F, 80G, 80H) in the second group of the target neurons, and adjusting the weights through the synaptic plasticity process.

When adjusting the weights of each connection of the first group of the target neurons and of the second group of the target neurons through the synaptic plasticity process, the weights of part or all of the input/output connections of each memory neuron 80 (80A, 80B, 80C, 80D, 80E, 80F, 80G, 80H) in the first group and the second group of target neurons can or cannot be standardized.

The T1 time period starts at time t1 and ends at time t2, the T2 time period starts at time t3 and ends at time t4, the T3 time period starts at time t3 and ends at time t2, t2 is later than t1, t4 is later than t3 and t2, t3 is later than t1 and not later than t2.

In this embodiment, the propagation of neuron firing in the brain-like neural network causes information to be input to the memory module 8 through the firing of a series of information input neurons 710. In this way, the information (denoted as T1 information) of the memory module 8 is encoded by the first group of target neurons. The information (denoted as T2 information) input to the memory module 8 during the T2 time period is encoded by the second group of target neurons. In the time period where the T1 time period and the T2 time period overlap (i.e., T3 time period), the time-series correlation between the T1 information and the T2 information is encoded by the unidirectional or bidirectional excitatory connections between the first group of target neurons and the second group of target neurons.

Within the continuous time range, any two adjacent time periods can be configured as T1 and T2. In this way, the information input to the memory module 8 in a continuous period of time can be encoded as a time series memory by a series of the memory neurons 80.

The firing of the neurons in the motion and orientation encoding module 5 enables the motion orientation information of the intelligent agent to be input to the memory module 8 through the firing of a series of the information input neurons 710 (such as 710A, 710B, 710C, and 710D in FIG. 2), and is encoded as spatial memory. The spatial memory is a special form of the time series memory, and the temporal association between the T1 information and the T2 information also includes spatial association.

In this embodiment, the time lengths of T1, T2, and T3 are selected by one or more of the following schemes:

1) When the intelligent agent equipped with the brain-like neural network is not in motion, let T1=T1default, T2=T2default, T3=T3default, and the T1default, T2default, and T3default are the default values of T1, T2, and T3, respectively.

2) When the intelligent agent equipped with the brain-like neural network is moving, let T1, T2, and T3 be negatively correlated with V, where V is the instantaneous movement rate of the intelligent agent.

3) Let the T1, T2, and T3 respectively have a positive correlation with the sampling frequency of the input sample.

For example, if the intelligent agent equipped with the brain-like neural network does not move in the first 4 seconds, the brain-like neural network is allowed to run continuously, the input sample is a video stream, and the sampling frequency is 30 frames/second, let the T1default=T2default=T3default=2 seconds. Input samples (the 1st to 60th frames in the video stream) in the time period of 0 to 2 seconds (as the time period of T1), if such act does not trigger the memory module 8 with sufficient correlation memory, 60 of the memory neurons 80 will be selected as the first group of target neurons to perform steps d2 and d3 of the time series memory encoding process. Input sample (the 61st to 120th frames in the video stream) in the time period of 2 to 4 seconds (as the T2 time period), if such act triggers the memory with sufficient correlation in the memory module 8, then the first 60 memory neurons 80 with the highest current activation intensity are selected as the first two groups of the target neurons to perform steps d4 and d5 of the time series memory encoding process. Perform step d6 of the time series memory encoding process within a time period of 1 second to 3 seconds (as the T3 time period). The same rules are followed for the rest of the time, and the information input to the memory module 8 is encoded as a time series memory.

In this embodiment, the neuron regeneration process of the feature enabling sub-module comprises:

- step e1: selecting one or more (such as 1,000) of the concrete information input neurons 7110 as the source neurons,
- step e2: selecting one or more (such as 1,000) of the concrete memory neurons as the target neurons 820 (such as 820A and 820B in FIG. 4),
- step e3: adding one or more (such as 100) of the cross memory neurons 810 to the feature enabling sub-module 81,
- step e4: allowing each newly added cross-memory neuron 810 and one or more (such as 100 to 1,000) existing cross-memory neurons 810 to form a topological structure of same level or cascade, or to adopt a mixed topological structure of same level and cascade, cascaded ones establish unidirectional excitatory connections between direct upstream and downstream cross memory neurons 810,
- step e5: allowing each of the source neurons to establish unidirectional excitatory connections with one or more (such as 80) of the newly added cross-memory neurons 810,
- step e6: allowing each of the source neurons to respectively establish unidirectional excitatory connections or no connections with one or more (such as 100 to 1,000) of the existing cross memory neurons 810,
- step e7: allowing one or more (such as 100) of the newly added cross memory neurons 810 to establish unidirectional excitatory connections with one or more (such as 30) of the target neurons respectively,
- step e8: allowing one or more (such as 100 to 1,000) existing cross memory neurons to establish unidirectional excitatory connections or no connections with one or more (such as 30) of the target neurons, and
- step e9: adjusting the weights of each newly established connection through the synaptic plasticity process.

When adjusting the weights of the newly established connections through the synaptic plasticity process, the weights of part or all of the input/output connections of each cross memory neuron 810 can be standardized or not.

When adjusting the weights of the newly established connections through the synaptic plasticity process, the weights of part or all of the input/output connections of each target neuron can be standardized or not.

In the present embodiment, the information transcription process comprises:

- step f1: selecting one or more of the neurons in the brain-like neural network as the vibrating neuron,
- step f2: selecting one or more direct downstream neurons or indirect downstream neurons of the vibrating neurons as the source neurons,
- step f3: selecting one or more of the direct downstream neurons or indirect downstream neurons of the vibrating neurons as the target neurons,
- step f4: making each of the activation neurons generate activation distribution and maintain activation for seventh pre-set period Tj,
- step f5: during the seventh pre-set period Tj, activating one or more of the source neurons, step f6: during the seventh predetermined period Tj, if a certain vibrating neuron is a direct upstream neuron of a certain target neuron, adjusting the weights of the unidirectional or bidirectional connections between the certain vibrating neuron and the certain target neuron through the synaptic plasticity process, if the certain vibrating neuron is an indirect upstream neuron of a certain target neuron, adjusting the weights of unidirectional or bidirectional connections between the direct upstream neuron of the target neuron and the target neuron in the connections pathway between the certain vibrating neuron and the certain target neuron through the synaptic plasticity process, step f7: during the seventh pre-set period Tj, if each of the target neurons can establish connections with several other target neurons, adjusting the weights through the synaptic plasticity process, and step f8: during the seventh pre-set cycle Tj, if there are the unidirectional or bidirectional excitatory connections between a certain source neuron and the certain target neuron, adjusting the weights through the synaptic plasticity process.

For example, select 1,000 from all the perceptual encoding neurons 110 as the vibrating neuron, select 100 from all the memory neurons 80 as the source neurons, and select 100 from all the instance encoding neurons 20 as the target neurons. Set the seventh pre-set period Tj=20 to 500 ms.

In the information transcription process, the information represented by part or all of the input connection weight of each activated source neuron is approximately coupled to part or all of the input connection weight of each target neuron, that is, the information is transcribed from the former into the latter. It is called "approximately coupled" because the transcribed information component is also coupled with the activation distribution of each of the vibrating neurons, the relationship between the vibrating neurons and the activated source neurons, as wells as the influence of the connections and firing conditions of each neuron in the connection path between the vibrating neurons and the target neurons.

Specifically, in the information transcription process, if some activated vibrating neurons are direct upstream neurons of some activated source neurons and of some target neurons, then the connection weights between these vibrating neurons and these source neurons will be added to the connection weights between these vibrating neurons and these target neurons in approximately equal proportions, eventually making the latter approaches the former. On the contrary, if some activated vibrating neurons are upstream neurons of some activated source neurons or indirect some target neurons, then the connection weights of these vibrating neurons and these target neurons will eventually include the influence of the connection pathway between the vibrating neurons and the activated source neurons, and the connection and distribution of each neuron in the connection pathway between the vibrating neurons and the target neurons.

In this embodiment, one or more of the sensory encoding neurons 110/the time encoding neurons 610/the motion and orientation encoding neurons 50/the information input neurons 710 can be selected as the vibrating neurons, and one or more of the memory neurons 80/the sensory encoding neurons 110 are selected as the source neurons, and one or more of the memory neuron 80/the instance encoding neurons 20/the environment encoding neurons 30/the spatial encoding neuron 40/the perceptual encoding neuron 110 are selected as the target neurons.

Specifically, a plurality of the perceptual encoding neurons 110 are selected as the vibrating neurons, a plurality of the memory neurons 80 are selected as the source neurons, and a plurality of the instance encoding neurons 20 are selected as the target neurons, then the information transcription process can transfer the short-term memory information encoded by the memory module 8 into the instance encoding module 2 as the long-term memory information for storage.

As shown in FIG. 2, in this embodiment, the information aggregation process of the memory module 8 comprises:

step g1: selecting one or more of the information input neurons 710 (710A, 710B, 710C, 710D) as the vibrating neurons, step g2: selecting one or more of the memory neurons 80 (80A, 80B, 80C, 80D) as the source neurons, step g3: selecting one or more of the memory neurons 80 (80E, 80F, 80G, 80H) as the target neurons, step g4: making each of the vibrating neurons generate activation distribution and maintain activation of the eighth pre-set period Tk, step g5: during the eighth pre-set period Tk, adjusting the weights of the unidirectional excitatory connections between each activated vibrating neuron and one or more of the target neurons through the synaptic plasticity process, step g6: during the eighth pre-set period Tk, adjust the weights of the unidirectional or bidirectional excitatory connections between each activated source neuron and one or more of the target neurons through the synaptic plasticity process, and step g7: performing one or more iterations, each time the step g1 to the step g6 is denoted as one iteration, One or more of the target neurons are mapped to corresponding tags as a result of the information aggregation process of the memory module.

For example, select 10,000 from all the information input neurons 710 as the vibrating neuron, select 1,000 from all the memory neurons 80 as the source neurons, and select 100 from the remaining memory neurons 80 as the target neurons. The eighth pre-set period Tk is selected from 100 ms to 2 seconds.

As shown in FIG. 2, in this embodiment, the directional information aggregation process of the memory module 8 comprises:

step h1: selecting one or more of the information input neurons 710 (710A, 710B, 710C, 710D) as the vibrating neurons, step h2: selecting one or more of the memory neurons 80 (80A, 80B, 80C, 80D) as the source neurons, step h3: selecting one or more of the memory neurons 80 (80E, 80F, 80G, 80H) as the target neurons, step h4: making each of the vibrating neurons generate activation distribution and maintaining activation of ninth pre-set period Ta, step h5: during the ninth pre-set period Ta, activating Ma1 of the source neurons and Ma2 of the target neurons, step h6: during the ninth pre-set period Ta, recording first Ka1 source neuron with the highest activation intensity or the highest activation rate or the first to be activated as Ga1, and recording remaining Ma1-Ka1 activated source neurons as Ga2, step h7: during the ninth pre-set period Ta, recording the first Ka2 target neurons with the highest activation intensity or the highest activation rate or the first to be activated as Ga3, and recording remaining Ma2-Ka2 activated target neurons as Ga4, step h8: during the ninth pre-set period Ta, allowing each source neuron in the Ga1 and the unidirectional or bidirectional excitatory connections between a plurality of the target neurons in the Ga3 to perform one or more synaptic weights enhancement processes, step h9: during the ninth pre-set period Ta, allowing the unidirectional or bidirectional excitatory connections between each source neuron in the Ga1 and a plurality of the target neurons in the Ga4 to perform one or more synaptic weights reduction processes, step h10: during the ninth pre-set period Ta, allowing each source neuron in the Ga2 and the unidirectional or bidirectional excitatory connections between a plurality of the target neurons in the Ga3 to perform or not to perform one or more of the synaptic weights reduction processes, step h1 l: during the ninth pre-set period Ta, allowing each source neuron in the Ga2 and the unidirectional or bidirectional excitatory connections between a plurality of the target neurons in the Ga4 to perform or not to perform one or more synaptic weights enhancement processes, step h12: during the ninth pre-set period Ta, allowing each activated vibrating neuron and the unidirectional excitatory connections between the target neurons in the Ga3 to perform one or more of the synaptic weights enhancement processes, step h13: during the ninth pre-set period Ta, allowing each activated vibrating neuron and the unidirectional excitatory connections between a plurality of the target neurons in the Ga4 to perform one or more of the synaptic weights reduction processes, and step h14: performing one or more iterations, each time the step hl to the step h13 is denoted as one iteration, In the process from the step h8 to the step h13, after one or more of the synaptic weights enhancement processes or the synaptic weights reduction processes are performed, the weights of the input connections or the output connections of part or all of the source neurons or of the target neurons can be standardized or not standardized.

The synaptic weights enhancement processes can adopt a unipolar upstream/downstream activation dependent synaptic enhancement process, or a unipolar spiking time dependent synaptic enhancement process.

The synaptic weights reduction processes can adopt a unipolar upstream/downstream activation dependent synaptic reduction process, or a unipolar spiking time dependent synaptic reduction process.

The synaptic weights enhancement process and the synaptic weights reduction process can also adopt the asymmetric bipolar spiking time dependent synaptic plasticity process or the symmetric bipolar spiking time dependent synaptic plasticity process.

The Ma1 and Ma2 are positive integers, Ka1 is a positive integer not exceeding Ma1, and Ka2 is a positive integer not exceeding Ma2.

For example, let Ma1=100, Ma2=10, Ka1=3, Ka2=2, the ninth pre-set period Ta=200 ms to 2 s, and select 10,000 from all the information input neurons 710 as the vibrating neurons, select 1,000 from all the memory neurons 80 as the source neurons, and select 100 from the remaining memory neurons 80 as the target neurons.

In this embodiment, in step h4 of each iteration, each of the vibrating neurons is made to generate an activation distribution that is different from the previous iterations.

The representation of each target neuron can be used as a result of the directional information aggregation process of the representation of each source neuron, and mapped to a corresponding label as an output.

Each of the target neurons represents the abstract, isotopic, or concrete representation of the representation of each of the source neurons connected to it. The connection weight of a certain source neuron to each of the target neurons represents the correlation degree between the representation of the source neuron and the representation of each target neuron. The greater the weight, the greater the correlation degree, and vice versa.

For example, when the directional information aggregation process is embodied as a directional information abstraction process, the source neuron represents concrete information (such as a subcategory or instance), and the target neuron represents abstract information (such as a parent category). Each of the target neurons represents the cluster centre of each of the source neurons connected to it (the former represents the common information component in the latter). The connection weight of a source neuron connected to each target neuron represents the correlation degree (or the distance of representation) between the source neuron and the information represented by each target neuron (that is, the cluster centre). The greater the weight, the higher the correlation (i.e., the closer the distance of the representation). The directional information abstraction process is also the clustering process, and is also the meta-learning process.

If the current target neuron is used as the new source neuron, and another group of the memory neuron 80 is selected as the new target neuron, the directional information aggregation process is executed, and such iterations can continuously form a higher level representation of the abstract information.

In this embodiment, the information component adjustment process of the brain-like neural network comprises:

step i1: selecting one or more neurons in the brain-like neural network as the vibrating neurons, step i2: selecting one or more direct downstream neurons or indirect downstream neurons of the vibrating neurons as the target neurons, step i3: making each of the vibrating neurons generate activation distribution, and maintaining activation of each vibrating neuron during first pre-set period Tb, step i4: during the first pre-set period Tb, activating Mb1 of the target neurons, first Kb1 target neurons with the highest activation intensity or the highest activation rate or the first to be activated are recorded as Gb1, and remaining Mb1-Kb1 activated target neurons are recorded as Gb2, step i5: if a certain vibrating neuron is a direct upstream neuron of a certain target neuron in the Gb1, making the unidirectional or bidirectional connections between the certain vibrating neuron and the certain target neuron to perform one or more synaptic weights enhancement processes, and if the certain vibrating neuron is an indirect upstream neuron of the certain target neuron in the Gb1, then making the unidirectional or bidirectional connections, which are between the certain target neuron and the direct upstream neuron of said certain target neuron, in the connections paths between the certain vibrating neuron and the certain target neuron to perform one or more of the synaptic weights enhancement processes, step i6: if the certain vibrating neuron is the direct upstream neuron of the certain target neuron in the Gb2, making the unidirectional or bidirectional connections between the certain vibrating neuron and the certain target neuron perform one or more of the synaptic weights reduction processes, and if the vibrating neuron is the indirect upstream neuron of the certain target neuron in the Gb2, then making the unidirectional or bidirectional connections, which are between the certain target neuron and the direct upstream neuron of said certain target, in the connections paths between the certain vibrating neuron and the certain target neuron perform one or more of the synaptic weights reduction processes, and step i7: performing one or more iterations, each time the step i1 to the step i6 is denoted as one iteration.

In the process of the step i5 and the step i6, after performing one or more of the synaptic weights enhancement processes or the synaptic weights reduction processes, the weights of part or all of the input connections of each target neuron can be standardized or not.

One or more of the target neurons can be mapped to corresponding labels as a result of the information component adjustment process of the brain-like neural network.

The synaptic weights enhancement processes can adopt a unipolar upstream/downstream activation dependent synaptic enhancement process, or a unipolar spiking time dependent synaptic enhancement process.

The synaptic weights reduction processes can adopt a unipolar upstream/downstream activation dependent synaptic reduction process, or a unipolar spiking time dependent synaptic reduction process.

The synaptic weights enhancement process and the synaptic weights reduction process can also adopt the asymmetric bipolar spiking time dependent synaptic plasticity process or the symmetric bipolar spiking time dependent synaptic plasticity process.

For example, select 10,000 from all the information input neurons 710 as the vibrating neurons, and select 1,000 as the target neurons from all the memory neurons 80. The first pre-set period Tb is selected from 100 ms to 500 ms.

When the Kb1 takes a small value (for example 1), only the target neurons with the highest activation intensity or the highest firing rate or the first firing will undergo the synaptic weight enhancement process, namely superimpose information components represented by each vibrating neuron's current firing in a certain degree, making the target neurons to consolidate its existing representation. The other target neurons all undergo the synaptic weight reduction process, that is, to a certain extent subtract (decouple) the information components represented by the current firing of each vibrating neuron. Therefore, multiple iterations are performed, and each iteration causes each of the vibrating neurons to produce a different activation distribution, which can make the representation of each target neuron be decoupled from each other. If further iterations are performed to strengthen the decoupling, the representations of each target neuron will become a set of relatively independent bases in the representation space.

In the same way, when the Kb1 takes a larger value (for example 8), multiple iterations are performed, and each iteration causes each vibrating neuron to produce a different activation distribution, which can make the information components represented by multiple target neurons be superimposed on each other to a certain extent. If further iterations are performed, the representations of multiple target neurons can be close to each other.

Therefore, adjusting the Kb1 can adjust the information component represented by each target neuron.

As shown in FIG. 2, the information component adjustment process of the memory module comprises:

step j1: selecting one or more of the information input neurons 710 (710A, 710B, 710C, 710D) as the vibrating neurons, step j2: selecting one or more of the memory neurons 80 (80A, 80B, 80C, 80D) as the target neurons, step j3: making each of the vibrating neurons generate activation distribution, and maintain activation of the vibrating neurons during second pre-set period Tc, step j4: during the second pre-set period Tc, activating Mc1 of the target neurons, recording first Kc1 target neurons with the highest activation intensity or the highest activation rate or the first to be activated as Gc1, and recording remaining Mc1-Kc1 activated target neurons as Gc2, step j5: during the second pre-set period Tc, making each activated vibrating neuron and the unidirectional excitatory connections between a plurality of the target neurons in the Gc1 perform one or more synaptic weights enhancement processes, step j6: during the second pre-set period Tc, making each activated activation neuron and the unidirectional excitatory connections between a plurality of the target neurons in the Gc2 perform one or more synaptic weights reduction processes, and step j7: performing one or more iterations, each time the step j1 to the step j6 is denoted as one iteration, In the process of the step j5 and the step j6, after performing one or more of the synaptic weights enhancement processes or the synaptic weights reduction processes, the weights of part or all of the input connections of each target neuron can be standardized or not.

One or more of the target neurons can be mapped to corresponding labels as a result of the information component adjustment process of the memory module 8.

The synaptic weights enhancement processes can adopt a unipolar upstream/downstream activation dependent synaptic enhancement process, or a unipolar spiking time dependent synaptic enhancement process.

The synaptic weights reduction processes can adopt a unipolar upstream/downstream activation dependent synaptic reduction process, or a unipolar spiking time dependent synaptic reduction process.

The synaptic weights enhancement process and the synaptic weights reduction process can also adopt the asymmetric bipolar spiking time dependent synaptic plasticity process or the symmetric bipolar spiking time dependent synaptic plasticity process.

For example, select 10,000 of the information input neurons 710 as the starting neurons, and select 1,000 of the memory neurons 80 as the target neurons. The second pre-set period Tc is 100 ms to 500 ms.

Figure 4:
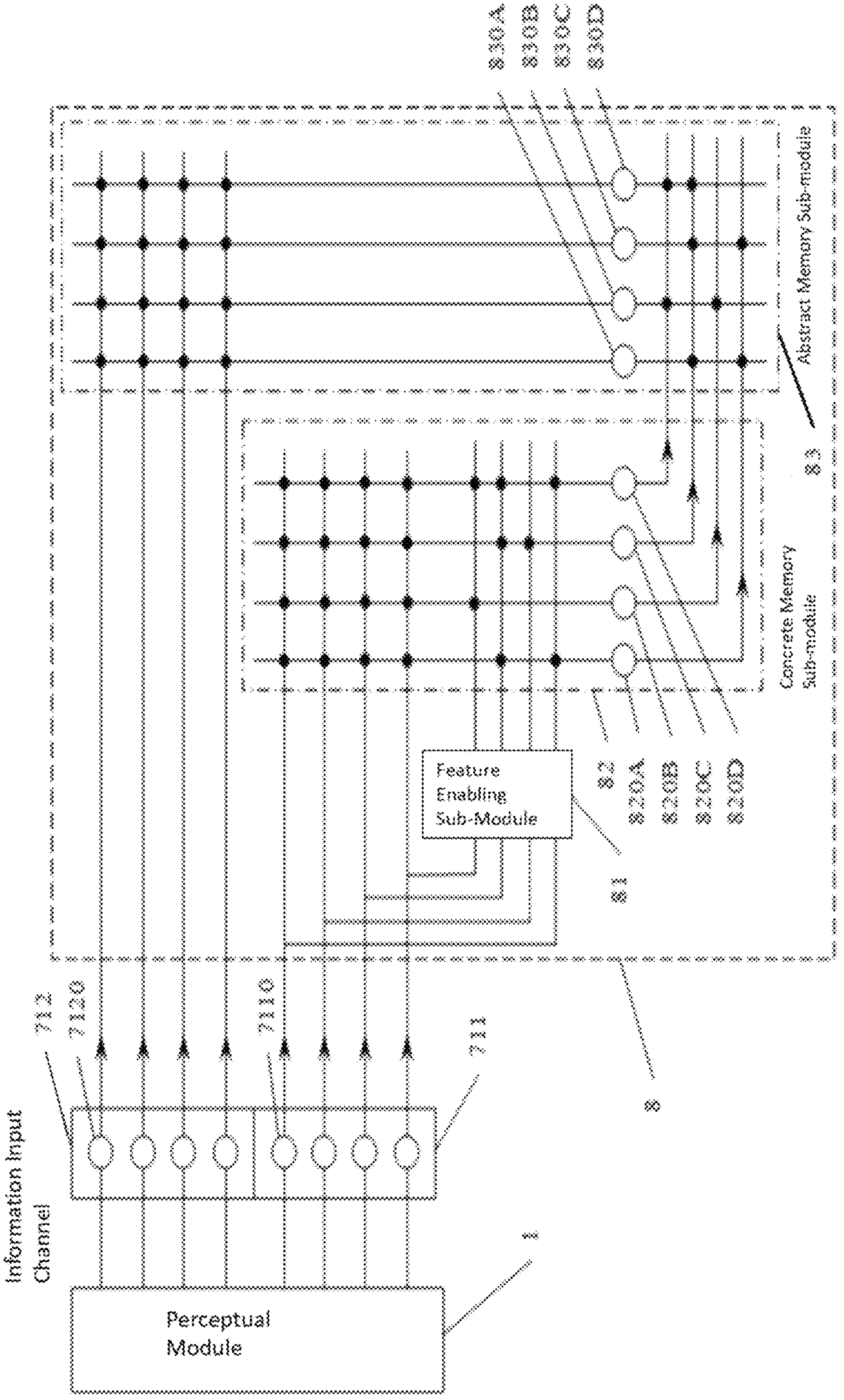
FIG. 4 is a schematic diagram of the detailed topology of the information synthesis and exchange module and the memory module of a brain-like neural network with memory and information abstraction functions in an embodiment of the present invention.

As shown in FIGS. 4 and 8, the information component adjustment process of the feature enabling sub-module 81 comprises:

step k1: selecting one or more of the cross memory neurons 810 or direct upstream neuron of the cross memory neurons as the vibrating neurons, step k2: selecting one or more of the cross memory neurons 810 or the concrete memory neurons 820 of the direct downstream neurons of the vibrating neurons as the target neurons, step k3: making each of the vibrating neurons generate activation distribution, and maintain activation of the vibrating neurons during second pre-set period Tc, step k4: during the third predetermined period Td, activating Md1 of all target direct downstream neurons of a certain said vibrating neuron, recording first Kd1 target neurons with the highest activation intensity or the highest activation rate or the first to be activated as Gd1, and recording remaining Md1-Kd1 activated target neurons as Gd2, step k5: making each activated activation neuron and the unidirectional excitatory connections between a plurality of the target neurons in the Gd1 perform one or more synaptic weights enhancement processes, step k6: making each activated activation neuron and the unidirectional excitatory connections between a plurality of the target neurons in the Gd2 perform one or more synaptic weights reduction processes, and step k7: performing one or more iterations, each time the step j1 to the step j6 is denoted as one iteration.

In the process of the step k5 and the step k6, after performing one or more of the synaptic weights enhancement processes or the synaptic weights reduction processes, the weights of part or all of the input connections of each target neuron can be standardized or not.

One or more of the target neurons can be mapped to corresponding labels as a result of the information component adjustment process of the feature enabling sub-module 81.

The synaptic weights enhancement processes can adopt a unipolar upstream/downstream activation dependent synaptic enhancement process, or a unipolar spiking time dependent synaptic enhancement process.

The synaptic weights reduction processes can adopt a unipolar upstream/downstream activation dependent synaptic reduction process, or a unipolar spiking time dependent synaptic reduction process.

The synaptic weights enhancement process and the synaptic weights reduction process can also adopt the asymmetric bipolar spiking time dependent synaptic plasticity process or the symmetric bipolar spiking time dependent synaptic plasticity process.

Referring to FIG. 8, for example, select 1000 of the cross-memory neurons 810 in the first layer of the feature enabling submodule 81 as vibrating neurons, and select 10000 of the cross memory neurons 810 in layer II of the feature enabling sub-module 81 as the target neurons. The third pre-set period Td is 200 ms to 2 s.

The memory forgetting process comprises an upstream distribution dependent memory forgetting process, a downstream distribution dependent memory forgetting process, and an upstream and downstream distribution dependent memory forgetting process.

The upstream distribution dependent memory forgetting process comprises: for a certain connection, if its upstream neuron continues to not distribute within fourth pre-set period (e.g., 20 minutes to 24 hours), absolute value of the weights is reduced, and the reduced amount is denoted as DwDecay1.

The downstream distribution dependent memory forgetting process comprises: for the certain connection, if its downstream neuron continues to not distribute within fifth pre-set period (e.g., 20 minutes to 24 hours), the absolute value of the weights is reduced, and the reduced amount is denoted as DwDecay2.

The upstream and downstream distribution dependent memory forgetting process comprises: for the certain connection, if its upstream and downstream neurons do not perform synchronous distribution during sixth pre-set period (e.g., 20 minutes to 24 hours), the absolute value of the weights is reduced, and the reduced amount is denoted as DwDecay3.

The synchronous distribution comprises: when the downstream neuron involved in the connections activates, and time interval from current or past most recent upstream neuron activation does not exceed fourth pre-set time interval Te1, or when the upstream neuron involved in the connections activates, and the time interval from the current or past most recent downstream neuron activation does not exceed the fifth pre-set time interval Te2. For example, let the fourth pre-set time interval Te1=30 ms and the fifth pre-set time interval Te2=20 ms.

In the memory forgetting process, if the certain connection has a specified lower limit of the absolute value of the weights, the absolute value of the weights will no longer decrease when the absolute value of the weights reaches the lower limit, or the connections will be cut off.

In this embodiment, the DwDecay1, the DwDecay2, and the DwDecay3 are respectively proportional to the weights of the connections involved.

For example, DwDecay1=Kdecay1*weight, DwDecay2=Kdecay2*weight, DwDecay1=Kdecay3*weight. Let Kdecay1=Kdecay2=Kdecay3=0.01, and weight is the connection weight.

In this application, the memory self-consolidation process comprises: when a certain neuron is self-activated, the weights of part or all of the certain neuron is adjusted through a unipolar downstream activation dependent synaptic enhancement process and a unipolar downstream spiking dependent synaptic enhancement process, the weights of part or all of output connections of the certain neuron are adjusted through a unipolar upstream activation dependent synaptic enhancement process and a unipolar upstream spiking dependent synaptic enhancement process.

The memory self-consolidation process helps to maintain the codes of some neurons with approximate fidelity and avoid forgetting.

The working process of the brain-like neural network also comprises an imagination process and an association process, the imagination process and the association processes are alternate or integrated among the active attention process, the automatic attention process, the memory triggering process, the neuron regeneration process, instantaneous memory encoding process, the time series memory encoding process, the information aggregation process, the information component adjustment process, and the information transcription process, the memory forgetting process and the memory self-consolidation process, the representation information formed by a plurality of the neurons involved in those processes is the result of the imagination process or the association processes.

For example, input a sample (a picture of a red apple with a background) to the perceptual module 1, and input the visual representation information of the red apple to the memory module 8 through the active attention process, and adjust the proportions of the two representation information components of “red apple” and “circle” in all the information input to the memory module 8. Keep the proportion of the representation information component of “circle” roughly unchanged, so that the component of the “red” representation information is reduced. One can even enter the component of the “green” representation information, and the most relevant memory information is triggered through the memory triggering process (the green apple is represented because the shape is similar to the red apple, but the colour is different). This is so called the association process. The representation information of the green apple is the result of the association process.

In another example, several groups of the neurons of the instance encoding module 2 are self-activated one after another, and their encodings are the representation information of "tower shape", "white", and "windmill", which are sequentially transmitted to the memory module 8, and is stored as multiple pieces of the instantaneous memory information through the instantaneous memory encoding process. These pieces of memory information are further superimposed to form new representation information "White Mill" through the information aggregation process. This is so called the imagination process. The representation information of said "White Mill" is the result of the imagination process.

In this embodiment, the unipolar upstream activation dependent synaptic plasticity process comprises a unipolar upstream activation dependent synaptic enhancement process and a unipolar upstream activation dependent synaptic reduction process.

The unipolar upstream activation dependent synaptic enhancement process comprises: when the activation intensity or activation rate of the upstream neurons involved in the connections is not zero, and if the involved connections have not yet been formed, the connections will be established and the weights will be initialized to 0 or a minimum value. If the connections involved have been formed, the absolute value of weights of the connections will be increased, and the increment is denoted as DwLTP1u. If an upper limit of the absolute value of the weights is specified, the absolute value of the weights will no longer grow when it reaches the upper limit.

The unipolar upstream activation dependent synaptic reduction process comprises: when the activation intensity or activation rate of the upstream neurons involved in the connections is not zero, and if the involved connections has not yet been formed, the unipolar upstream activation dependent synaptic reduction process will be skipped. If the connections involved have been formed, the absolute value of the weights of the connections will be reduced, the reduction is denoted as DwLTD1u. If a lower limit of the absolute value of the weights is specified, the absolute value of the weights will no longer decrease when it reaches the lower limit, or the connections will be cut off.

DwLTP1u and DwLTD1u are non-negative values.

The values of DwLTP1u and DwLTD1u in the unipolar upstream activation dependent synaptic plasticity process comprises one or more of:

- DwLTP1u and DwLTD1u are non-negative and are respectively proportional to the activation intensity or activation rate of the upstream neurons in the involved connections, or
- DwLTP1u and DwLTD1u are non-negative values and are respectively proportional to the activation intensity or activation rate of the upstream neurons involved in the connections and the weights of the involved connections.

For example, let DwLTP1u=0.01*Fru1, DwLTD1u=0.01*Fru1, and Fru1 is the firing rate of the upstream neurons.

In this application, the unipolar downstream activation dependent synaptic plasticity process comprises a unipolar downstream activation dependent synaptic enhancement process and a unipolar downstream activation dependent synaptic reduction process.

The unipolar downstream activation dependent synaptic enhancement process comprises: when the activation intensity or activation rate of the downstream neurons involved in the connections is not zero, and if the involved connections have not yet been formed, the connections will be established and the weights will be initialized to 0 or a minimum value. If the connections involved have been formed, the absolute value of weights of the connections is increased, and the increment is denoted as DwLTP1d. If an upper limit of the absolute value of the weights is specified, the absolute value of the weights will no longer grow when it reaches the upper limit.

The unipolar downstream activation dependent synaptic reduction process comprises: when the activation intensity or activation rate of the downstream neurons involved in the connections is not zero, and if the involved connections has not yet been formed, the unipolar downstream activation dependent synaptic reduction process will be skipped. If the connections involved have been formed, the absolute value of the weights of the connections will be reduced, the reduction is denoted as DwLTD1d. If a lower limit of the absolute value of the weights is specified, the absolute value of the weights will no longer decrease when it reaches the lower limit, or the connections will be cut off.

DwLTP1d and DwLTD1d are non-negative values.

In this embodiment, the values of DwLTP1d and DwLTD1d in the unipolar downstream activation dependent synaptic plasticity process comprises one or more of:

- DwLTP1d and DwLTD1d are non-negative and are respectively proportional to the activation intensity or activation rate of the downstream neurons in the involved connections, or
- DwLTP1u and DwLTD1u are non-negative and are respectively proportional to the activation intensity or activation rate of the downstream neurons involved in the connections and the weights of the involved connections.

For example, let DwLTP1d=0.01*Frd1, DwLTD1d=0.01*Frd1, and Frd1 is the firing rate of downstream neurons.

In this application, the unipolar upstream and downstream activation dependent synaptic plasticity process comprises a unipolar upstream and downstream activation dependent synaptic enhancement process and a unipolar upstream and downstream activation dependent synaptic reduction process.

The unipolar upstream and downstream activation dependent synaptic enhancement process comprises: when the activation intensity or activation rate of the upstream and downstream neurons involved in the connections is not zero, and if the involved connections have not yet been formed, the connections will be established and the weights will be initialized to 0 or a minimum value. If the connections involved have been formed, the absolute value of weights of the connections will be increased, and the increment is denoted as DwLTP2. If an upper limit of the absolute value of the weights is specified, the absolute value of the weights will no longer grow when it reaches the upper limit.

The unipolar upstream and downstream activation dependent synaptic reduction process comprises: when the activation intensity or activation rate of the upstream and downstream neurons involved in the connections is not zero, and if the involved connections has not yet been formed, the unipolar upstream and downstream activation dependent synaptic reduction process will be skipped. If the connections involved have been formed, the absolute value of the weights of the connections will be reduced, the reduction is denoted as DwLTD2. If a lower limit of the absolute value of the weights is specified, the absolute value of the weights will no longer decrease when it reaches the lower limit, or the connections will be cut off.

DwLTP2 and DwLTD2 are non-negative values.

In this embodiment, the values of DwLTP2 and DwLTD2 in the unipolar upstream and downstream activation dependent synaptic plasticity comprises one or more of:

DwLTP2 and DwLTD2 are non-negative, are respectively proportional to the activation intensity or activation rate of the upstream neurons and the activation intensity or activation rate of the upstream neurons, or DwLTP2 and DwLTD2 are non-negative, are respectively proportional to the activation intensity or activation rate of the downstream neurons involved in the connections, the activation intensity or activation rate of the upstream neurons in the involved connections, and the weights of the involved connections.

For example, let DwLTP2=0.01*Fru2*Frd2, DwLTD2=0.01*Fru2*Frd2, and Fru2 and Frd2 are the firing rates of upstream and downstream neurons, respectively.

In this embodiment, the unipolar upstream spiking dependent synaptic plasticity process comprises a unipolar upstream spiking dependent synaptic enhancement process and a unipolar upstream spiking dependent synaptic reduction process.

The unipolar upstream spiking dependent synaptic enhancement process comprises: when the upstream neurons involved in the connections are activated, and if the involved connections have not yet been formed, the connections will be established and the weights will be initialized to 0 or a minimum value. If the connections involved have been formed, the absolute value of weights of the connections will be increased, and the increment is denoted as DwLTP3u. If an upper limit of the absolute value of the weights is specified, the absolute value of the weights will no longer grow when it reaches the upper limit.

The unipolar upstream spiking dependent synaptic reduction process comprises: when the upstream neurons involved in the connections are activated, and if the involved connections have not yet been formed, the unipolar upstream spiking dependent synaptic reduction process will be skipped. If the connections involved have been formed, the absolute value of the weights of the connections will be reduced, the reduction is denoted as DwLTD3u. If a lower limit of the absolute value of the weights is specified, the absolute value of the weights will no longer decrease when it reaches the lower limit, or the connections will be cut off.

DwLTP3u and DwLTD3u are non-negative values.

The values of DwLTP3u and DwLTD3u in the unipolar upstream spiking dependent synaptic plasticity process comprises one or more of:

DwLTP3u and DwLTD3u are non-negative constants, or

DwLTP3u and DwLTD3u are non-negative, are respectively proportional to the weights of the involved connections.

For example, let DwLTP3u=0.01*weight, DwLTD3u=0.01*weight, and weight is the connection weight.

In this embodiment, the unipolar downstream spiking dependent synaptic plasticity process comprises a unipolar downstream spiking dependent synaptic enhancement process and a unipolar downstream spiking dependent synaptic reduction process.

The unipolar upstream spiking dependent synaptic enhancement process comprises: when the upstream neurons involved in the connections are activated, and if the involved connections have not yet been formed, the connections will be established and the weights will be initialized to 0 or a minimum value. If the connections involved have been formed, the absolute value of weights of the connections will be increased, and the increment is denoted as DwLTP3d. If an upper limit of the absolute value of the weights is specified, the absolute value of the weights will no longer grow when it reaches the upper limit.

The unipolar upstream spiking dependent synaptic reduction process comprises: when the upstream neurons involved in the connections are activated, and if the involved connections have not yet been formed, the unipolar upstream spiking dependent synaptic reduction process will be skipped. If the connections involved have been formed, the absolute value of the weights of the connections will be reduced, the reduction is denoted as DwLTD3d. If a lower limit of the absolute value of the weights is specified, the absolute value of the weights will no longer decrease when it reaches the lower limit, or the connections will be cut off, and DwLTP3d and DwLTD3d are non-negative values.

In this embodiment, the values of DwLTP3d and DwLTD3d in the unipolar downstream spiking dependent synaptic plasticity process s comprises one or more of:

DwLTP3d and DwLTD3d are non-negative constants, or

DwLTP3d and DwLTD3d are non-negative, and are respectively proportional to the weights of the involved connections.

For example, let DwLTP3d=0.01*weight, DwLTD3d=0.01*weight, and weight is the connection weight.

In this embodiment, the unipolar spiking time dependent synaptic plasticity process comprises a unipolar spiking time dependent synaptic enhancement process and unipolar spiking time dependent synaptic reduction process, The unipolar spiking time dependent synaptic enhancement process comprises: when the upstream neurons involved in the connections are activated, and the time interval from the current or past most recent upstream neurons firing is no more than Tg1, or when the downstream neurons involved in the connections are activated, the time interval from the current or past most recent downstream neuron firing is no more than Tg2, performing:

if the involved connections have not yet been formed, the connections will be established and the weights will be initialized to 0 or a minimum value. If the connections involved have been formed, the absolute value of weights of the connections will be increased, and the increment is denoted as DwLTP4. If an upper limit of the absolute value of the weights is specified, the absolute value of the weights will no longer grow when it reaches the upper limit.

The unipolar spiking time dependent synaptic reduction process comprises: when the downstream neurons involved in the connections are activated, and the time interval from the current or past most recent downstream neurons firing is no more than Tg3, or when the downstream neurons involved in the connections are activated, the time interval from the current or past most recent downstream neuron firing is no more than Tg4, performing:

when the downstream neurons involved in the connections are activated, and if the involved connections have not yet been formed, the unipolar spiking time dependent synaptic reduction process will be skipped. If the connections involved have been formed, the absolute value of the weights of the connections will be reduced, the reduction is denoted as DwLTD4. If a lower limit of the absolute value of the weights is specified, the absolute value of the weights will no longer decrease when it reaches the lower limit, or the connections will be cut off.

DwLTP4 and DwLTD4 are non-negative values, and the Tg1, Tg2, Tg3, and Tg4 are all non-negative values. For example, set Tg1, Tg2, Tg3, and Tg4 to 200 ms.

In this embodiment, the values of DwLTP4 and DwLTD4 in the unipolar spiking time dependent synaptic plasticity process comprises one or more of:

DwLTP4 and DwLTD4 are non-negative constants, or

DwLTP4 and DwLTD4 are non-negative, and are respectively proportional to the weights of the involved connections.

For example, let DwLTP4=KLTP4*weight+C1, DwLTD4=KLTD4*weight+C2, where KLTP4=0.01 is the proportional coefficient of the synaptic enhancement process, KLTD4=0.01, is the proportional coefficient of the synaptic weakening process, C1 and C2 are Constant, and set to 0.001.

In this embodiment, the asymmetric bipolar spiking time dependent synaptic plasticity process comprises:

when the downstream neurons involved in the connections are activated, if the time interval from the current or past most recent downstream neurons firing is no more than Th1, then performing an asymmetric bipolar spiking time dependent synaptic enhancement process. If the time interval from the current or past most recent downstream neurons firing is more than Th1 but is no more than Th2, then performing an asymmetric bipolar spiking time dependent synaptic reduction process, or when the upstream neurons involved in the connections are activated, if the time interval from the current or past most recent upstream neurons firing is no more than Th3, then performing an asymmetric bipolar spiking time dependent synaptic enhancement process. If the time interval from the current or past most recent downstream neurons firing is more than Th3 but is no more than Th4, then performing an asymmetric bipolar spiking time dependent synaptic reduction process, Th1 and Th3 are non-negative, Th2 is a value greater than Th1, and Th4 is a value greater than Th3. For example, let Th1=Th3=150 ms, Th2=Th4=200 ms.

The asymmetric bipolar spiking time dependent synaptic enhancement process comprises: if the involved connections have not been formed, then establishing the connections, and initializing the weights to 0 or a minimum value. If the involved connections have been formed, the absolute value of the weights will be increased, and the increment is denoted as DwLTP5, if an upper limit of the absolute value of the weights is specified, the absolute value of the weights will not increase after reaching the upper limit.

The asymmetric bipolar spiking time dependent synaptic reduction process comprises: if the involved connections have not yet been formed, the asymmetric bipolar spiking time dependent synaptic reduction process will be skipped. If the connections involved have been formed, the absolute value of the weights of the connections will be reduced, the reduction is denoted as DwLTD5. If a lower limit of the absolute value of the weights is specified, the absolute value of the weights will no longer decrease when it reaches the lower limit, or the connections will be cut off.

DwLTP5 and DwLTD5 are non-negative values.

In this embodiment, the values of DwLTP5 and DwLTD5 in the asymmetric bipolar spiking time dependent synaptic plasticity process comprises one or more of:

DwLTP5 and DwLTD5 are non-negative constants, or

DwLTP5 and DwLTD5 are non-negative, and are respectively proportional to the weights of the involved connections, for example, let DwLTP5=KLTP5*weight, DwLTD5=KLTD5*weight, such as let KLTP5=0.01 and KLTD5=0.01, or DwLTP5 and DwLTD5 are non-negative, DwLTP5 is negatively correlated with the time interval between downstream neurons and the upstream neurons, specifically, when the time interval is 0, DwLTP5 reaches specified maximum value DwLTPmax5, and when the time interval is Th1, DwLTP5 is 0; DwLTD5 is negatively correlated with the time interval between the downstream neurons and the upstream neurons, when the time interval is Th1, DwLTD5 reaches specified maximum value DwLTDmax5, and when the time interval is Th2, DwLTD5 is 0. For example, let DwLTPmax5=0.1, DwLTDmax5=0.1, Let DwLTP5=−DwLTPmax5/Th1*DeltaT1+DwLTPmax5, let DwLTD5=−DwLTDmax5/(Th2−Th1)*DeltaT1+DwLTDmax5*Th2/(Th2−Th1), DeltaT1 is the time interval between downstream neuron and upstream neuron firing (That is, the time when the downstream neuron fires minus the time when the upstream neuron fires).

In this embodiment, the symmetric bipolar spiking time dependent synaptic plasticity process comprises:

when the downstream neurons involved in the connections are activated, if the time interval from the current or past most recent downstream neurons firing is no more than Th1, then performing a symmetric bipolar spiking time dependent synaptic enhancement process, if the time interval from the current or past most recent downstream neurons firing is more than Th1 but is no more than Th2, then performing an asymmetric bipolar spiking time dependent synaptic reduction process, Th1 and Th2 are non-negative. For example, let Ti1=200 ms and Ti2=200 ms.

In this embodiment, the symmetric bipolar spiking time dependent synaptic enhancement process comprises: if the involved connections have not been formed, then establishing the connections, and initializing the weights to 0 or a minimum value. If the involved connections have been formed, the absolute value of the weights will be increased, and the increment is denoted as DwLTP6, if an upper limit of the absolute value of the weights is specified, the absolute value of the weights will not increase after reaching the upper limit.

The symmetric bipolar spiking time dependent synaptic reduction process comprises: if the involved connections have not yet been formed, the symmetric bipolar spiking time dependent synaptic reduction process will be skipped. If the connections involved have been formed, the absolute value of the weights of the connections will be reduced, the reduction is denoted as DwLTD5. If a lower limit of the absolute value of the weights is specified, the absolute value of the weights will no longer decrease when it reaches the lower limit, or the connections will be cut off.

DwLTP6 and DwLTD6 are non-negative values.

In this embodiment, the values of DwLTP6 and DwLTD6 in the symmetric bipolar spiking time dependent synaptic plasticity process comprises one or more of:

DwLTP6 and DwLTD6 are non-negative constants, or

DwLTP6 and DwLTD6 are non-negative, and are respectively proportional to the weights of the involved connections, for example, let DwLTP6=KLTP6*weight, DwLTD6=KLTD6*weight, such as KLTP6=0.01, KLTD6=0.01, and weight as the connection weight, or DwLTP6 and DwLTD6 are non-negative, DwLTP6 is negatively correlated with the time interval between downstream neurons and the upstream neurons, specifically, when the time interval is 0, DwLTP6 reaches specified maximum value DwLTPmax6, and when the time interval is Ti1, DwLTP6 is 0. DwLTD6 is negatively correlated with the time interval between the downstream neurons and the upstream neurons, when the time interval is Ti1, DwLTD6 reaches specified maximum value DwLTDmax6, and when the time interval is Ti2, DwLTD6 is 0, for example, let DwLTPmax6=0.1, DwLTDmax6=0.1, let DwLTP6=−DwLTPmax6/DeltaT2+DwLTPmax6, DwLTD6=−DwLTDmax6/DeltaT3+DwLTDmax6, DeltaT2 is the time interval between downstream and upstream neurons, and DeltaT3 is the time between upstream and downstream neurons.

In the present embodiment, the working process of the brain-like neural network also comprises a reinforcement learning process.

The reinforcement learning process comprises: when one or more of the connections receive a reinforcement signal, in the second pre-set potential, the weights of the connections change, or the weights reduction of connections changes, or the weights increase/reduction of the connections in the synaptic plasticity process changes, or when one or more of the neurons receive the reinforcement signal, in the third pre-set potential (within 30 seconds from receiving the enhanced signal), the neurons receive positive or negative input, or the weights of part or all of the input connections or output connections of these neurons change, or the weights reduction of the connections in the memory forgetting process changes, or the weights increase/reduction of the connections in the synaptic plasticity process changes.

For example, at a certain moment, bidirectional excitatory connections between a number of the memory neurons 80 receive the reinforcement signal (+10), and in the second pre-set time interval (within 30 seconds from receiving the reinforcement signal). If these connections undergo the symmetric bipolar spiking time dependent synaptic plasticity process, the DwLTP6 is increased by 10 on the basis of its original value.

Said standardization comprises: selecting the weights of part or all of the input or output connections of any neuron, and calculating its L−2 modulus length, which is the non-negative square root of the sum of squared weights of all selected connections. The weight of each selected connection is divided by the L−2 modulus length and multiplied by the coefficient N, and the original weight is replaced by the obtained result In this embodiment, the naming and affiliation of each neuron in the brain-like neural network are:

The concrete instance temporal information input neurons 71110 and the concrete environment spatial information input neurons 71120 are collectively referred to as the concrete information input neurons 7110.

The abstract instance temporal information input neurons 71210 and the abstract environment spatial information input neurons 71220 are collectively referred to as the abstract information input neurons 7120.

The concrete information input neurons 7110 and the abstract information input neurons 7120 are collectively referred to as the information input neurons 710.

The instance temporal information output neurons 7210 and the environment spatial information output neurons 7220 are collectively referred to as the information output neurons 720.

The concrete instance time memory neurons 8210 and the concrete environment spatial memory neurons 8220 are collectively referred to as the concrete memory neuron 820.

The abstract instance time memory neurons 8310 and abstract environment spatial memory neurons 8320 are collectively referred to as the abstract memory neurons 830.

The cross memory neurons 810, the concrete memory neurons 820, and the abstract memory neurons 830 are collectively referred to as the memory neurons 80.

The speed encoding neurons (SN0, SN60, SN120, SN180, SN240, SN300), unidirectional integral displacement encoding neurons (SDDEN0, SDDEN60, SDDEN120, SDDEN180, SDDEN240, SDDEN300), multidirectional integral displacement encoding neurons (MDDEN0A60, MDDEN60A120, MDDEN120A180, MDDEN180A240, MDDEN240A300, MDDEN300A0), omnidirectional displacement encoding neurons (ODDEN) are collectively referred to as the motion and orientation encoding neurons 50.

The perceptual encoding neurons 110, the instance encoding neurons 20, the environment encoding neurons 30, the spatial encoding neurons 40, the motion and orientation encoding neurons 50, the time encoding neurons 610, the information input neurons 710, and the information output neurons 720, the memory neurons 80, the differential information decoupling neurons 930, the readout layer neuron 920, and the interneurons are collectively referred to as neurons.

In the figures, unless otherwise specified, the connections of the arrow terminal are excitatory connections, and the connections of the horizontal line terminal are inhibitory connections. The symbol "+/−" next to the connection indicates that the connection can conduct an excitatory or inhibitory type or empty (0) signal.

The embodiments of this application propose a brain-like neural network with memory and information abstraction functions. The neural network uses the biological brain neural circuits in the hippocampus and the surrounding multiple regions of the structure, combining with the information processing and mathematical optimization process, including the ability to form memory module of episodic memory, such that the agent can efficiently identify objects (people, items, environment and space), space navigation, reasoning and independent decision making. The memory module can quickly remember that each object characteristics, and according to the common features between the multiple object abstraction, with the characteristic of the different dimensions to find the clustering centre (i.e. meta-learning), and use the clustering centre to further recognize unfamiliar but similar objects, to extrapolate and greatly reduce the amount of labelled data needed for training, and improve the generalization ability of the recognition, thus can achieve lifelong learning. The brain-like neural network adopts modular organization structure and white box design, which has good interpretability and is easy to analyse and debug. The proposed brain-like neural network uses the synaptic plasticity process as the way to adjust the weights, avoids partial differential operations, and has lower computational overhead than traditional deep learning methods. This kind of brain neural network is easy to be implemented in software, firmware (such as FPGA) or hardware (such as ASIC), which provides the basis for the design and application of brain-like neural network chips.

Part of the invention content of the present invention has been verified by software simulation, and its source code has been registered and obtained the software copyright. Said software includes "Neural Network Simulation Core Operation Software for Brain-like Computing" and "Neural Network Simulation Development Module Software for Brain-like Computing".

The various embodiments in this specification are described in a progressive manner. Each embodiment focuses on the differences from other embodiments, and the same or similar parts between the various embodiments can be referred to each other. For the device disclosed in the embodiment, since it corresponds to the method disclosed in the embodiment, the description is relatively simple, and the relevant part can be referred to the description of the method part.

The foregoing description of the disclosed embodiments enables those skilled in the art to implement or use the present invention. Various modifications to these embodiments will be obvious to those skilled in the art, and the general principles defined herein can be implemented in other embodiments without departing from the spirit or scope of the present invention. Therefore, the present invention will not be limited to the embodiments shown in this document, but should conform to the widest scope consistent with the principles and novel features disclosed in this application.

What is claimed is:

1. A neural network with memory and information abstraction functions, the neural network implemented in a non-transitory computer-readable medium comprising at least one of firmware or hardware, the neural network comprising: a perceptual module; an instance encoding module; an environment encoding module; spatial encoding module; a time encoding module; a motion and orientation encoding module; an information synthesis and exchange module; and a memory module, wherein each module comprises a plurality of neurons, wherein the neurons comprise a plurality of perceptual encoding neurons, instance encoding neurons, environment encoding neurons, time encoding neurons, spatial encoding neurons, motion and orientation encoding neurons, information input neurons, information output neurons, and memory neurons, wherein the perceptual module comprises a plurality of said perceptual encoding neurons encoding visual representation information of observed objects, wherein the instance encoding module comprises a plurality of said instance encoding neurons encoding instance representation information, wherein the environment encoding module comprises a plurality of the environment encoding neurons encoding environment representation information, wherein the spatial encoding module comprises a plurality of the spatial encoding neurons encoding spatial representation information, wherein the time encoding module comprises a plurality of the time encoding neurons encoding temporal information, wherein the motion and orientation encoding module comprises a plurality of the motion and orientation encoding neurons encoding instantaneous speed information or relative displacement information of intelligent agents, wherein the information synthesis and exchange module comprise an information input channel and an information output channel, the information input channel comprises a plurality of the information input neurons, and the information output channel comprises a plurality of the information output neurons, wherein the memory module comprises a plurality of the memory neurons encoding memory information, wherein the neural network caches and encodes information through activation of the neurons, and encodes, stores, and transmits information through the connections between the neurons;

wherein the information synthesis and exchange module controls the information entering and exiting the memory module, adjusts the size and proportion of each information component, is an executive mechanism of attention mechanism, and the information synthesis and exchange module's working process comprises an active attention process and an automatic attention process, wherein the information input neurons and the information output neurons respectively have an attention control signal input terminal, wherein the active attention process is:

adjusting activation intensity or activation rate or spiking activation phase of each information input neuron or each information output neuron through adjusting intensity of the attention control signal applied at the attention control signal input terminal of the information input neurons/the information output neurons, so as to control information entering/existing the memory module, and adjust size and proportion of each information component, wherein the automatic attention process is:

through the unidirectional or bidirectional excitatory connections between the information input neurons, when a plurality of the information input neurons are activated, making it easier for other information input neurons connected with said information input neurons to be activated, such that relevant information components are also easy to enter the memory module, through the unidirectional or bidirectional excitatory connections between the information input neurons and the information output neurons, when the information input neurons/the information output neurons are activated, making it easier for the connected information output neurons/the information input neurons to be activated, such that output/input information components related to input/output information are easier to output/input the memory module.

2. A neural network with memory and information abstraction functions according to claim 1, wherein the connections between the neurons includes at least one of following connections:

wherein a plurality of the perceptual encoding neurons respectively form unidirectional or bidirectional excitatory or inhibitory connections with one or more other perceptual encoding neurons, and said one or more perceptual encoding neurons form unidirectional or bidirectional excitatory or inhibitory connections with one or more of the instance encoding neurons/the environment encoding neuron/the spatial encoding neurons/the information input neuron, wherein a plurality of the instance encoding neurons respectively form unidirectional excitatory connections with one or more of the information input neurons, can also respectively form the unidirectional or bidirectional excitatory connections with a plurality of the memory neurons, can also respectively form unidirectional or bidirectional activation connections with one or more other instance encoding neurons, and can also respectively form the unidirectional or bidirectional excitatory connections with one or more of the perceptual encoding neurons, wherein a plurality of the environment encoding neurons respectively form unidirectional excitatory connections with one or more of the information input neurons, can also respectively form the unidirectional or bidirectional excitatory connections with a plurality of the memory neurons, can also respectively form the unidirectional or bidirectional excitatory connections with one or more other environment encoding neurons, and can also respectively form the unidirectional or bidirectional excitatory connections with one or more of the perceptual encoding neurons, wherein a plurality of the spatial encoding neurons respectively form unidirectional excitatory connections with one or more of the information input neurons, can also respectively form the unidirectional or bidirectional excitatory connections with a plurality of the memory neurons, can also respectively form the unidirectional or bidirectional excitatory connections with one or more other spatial encoding neurons, and can also respectively form the unidirectional or bidirectional excitatory connections with one or more of the perceptual encoding neurons, wherein a plurality of the instance encoding neurons, a plurality of the environment encoding neurons, and a plurality of the spatial encoding neurons form the unidirectional or bidirectional excitatory connections between each other, wherein a plurality of the time encoding neurons respectively form unidirectional excitatory connections with one or more of the information input neurons, wherein a plurality of the motion and orientation encoding neurons respectively form unidirectional excitatory connections with one or more of the information input neurons, and can form the unidirectional or bidirectional excitatory connections with one or more of the spatial encoding neurons, wherein a plurality of the information input neurons can also form the unidirectional or bidirectional excitatory connections with one or more other information input neurons, a plurality of the information output neurons can also respectively form the unidirectional or bidirectional excitatory connections with one or more other information output neurons, wherein a plurality of the information input neurons can also respectively form the unidirectional or bidirectional excitatory connections with a plurality of the information output neurons, wherein each information input neuron forms unidirectional excitatory connections with one or more of the memory neurons, wherein a plurality of the memory neurons respectively form unidirectional excitatory connections with one or more of the information output neurons, a plurality of the memory neurons respectively form the unidirectional or bidirectional excitatory connections with one or more other memory neurons, wherein one or more of the information output neurons can respectively form unidirectional excitatory connections with one or more of the instance encoding neurons/the environment encoding neurons/the spatial encoding neurons/the perceptual encoding neurons/the time encoding neurons/the motion and orientation encoding neurons, respectively.

3. A neural network with memory and information abstraction functions according to claim 1, wherein picture or video stream are input such that one or more pixel values of multiple pixels of each frame picture are respectively weighted into a plurality of the perceptual encoding neurons so as to activate the plurality of the perceptual encoding neurons, wherein current instantaneous speed of the intelligent agents is obtained and input to the motion and orientation encoding module, and the relative displacement information is obtained by integrating the instantaneous speed against time by a plurality of the motion and orientation encoding neurons, wherein for one or more of the neurons, membrane potential is calculated to determine whether to activate the neurons, and if the neurons are determined to be activated, each downstream neuron is made to accumulate the membrane potential so as to determine whether to activate the neurons, such that the activation of the neurons will propagate in the neural network, wherein weights of connections between upstream neurons and the downstream neurons is a constant value or dynamically adjusted through a synaptic plasticity process, wherein one or more of the neurons are mapped to corresponding labels as output.

4. A neural network with memory and information abstraction functions according to claim 3, wherein working process of the neural network comprises: memory triggering process, information transcription process, memory forgetting process, memory self-consolidation process, and information component adjustment process.

5. A neural network with memory and information abstraction functions according to claim 3, wherein working process of the memory module comprises: an instantaneous memory encoding process, a time series memory encoding process, an information aggregation process, a directional information aggregation process, and an information component adjustment process, wherein the synaptic plasticity process comprises a unipolar upstream activation dependent synaptic plasticity process, a unipolar downstream activation dependent synaptic plasticity process, a unipolar upstream and downstream activation dependent synaptic plasticity process, and a unipolar upstream spiking dependent synaptic plasticity process, a unipolar downstream spiking dependent synaptic plasticity process, a unipolar spiking time dependent synaptic plasticity process, an asymmetric bipolar spiking time dependent synaptic plasticity process, a symmetric bipolar spiking time dependent synaptic plasticity process.

6. A neural network with memory and information abstraction functions according to claim 1, wherein the plurality of the neurons of the brain like-neural network are spontaneous firing neurons, wherein the spontaneous firing neurons comprise conditionally spontaneous firing neurons and unconditionally spontaneous firing neurons, wherein if the conditionally spontaneous firing neurons are not activated by external input in a first pre-set time interval, the conditionally spontaneous firing neurons are self-activated according to probability P, wherein the unconditionally spontaneous firing neurons automatically gradually accumulate the membrane potential without external input, when the membrane potential reaches the threshold, the unconditionally spontaneous firing neurons activate, and restore the membrane potential to resting potential to restart accumulation process.

7. A neural network with memory and information abstraction functions according to claim 6, wherein if the conditionally spontaneous firing neurons are not activated by external input in the first pre-set time interval, the conditionally spontaneous firing neurons will self-activate based on the probability P, wherein the conditionally spontaneous firing neurons record one or more of:

1) time interval since last activation,
2) most recent average issuance rate,
3) duration of most recent activation,
4) total activation times,
5) total number of executions of the synaptic plasticity processes in each input connections recently,
6) total number of executions of the synaptic plasticity processes in each output connections recently,
7) total change in weights of each input connections recently, and
8) total change in weights of each output connections recently, wherein calculation rules for the probability P comprises one or more of:
1) P is positively correlated with the time interval since the last activation,
2) P is positively correlated with the most recent average issuance rate,
3) P is positively correlated with the duration of the most recent activation,
4) P is positively correlated with the total activation times,
5) P is positively correlated with the total number of executions of the synaptic plasticity processes in each input connections recently,
6) P is positively correlated with the total number of executions of the synaptic plasticity processes in each output connections recently,
7) P is positively correlated with the total change in weights of each input connections recently,
8) P is positively correlated with the total change in weights of each output connections recently,
9) P is positively correlated with average weights of all input connections,
10) P is positively correlated with total modulus of the weights of all input connections,
11) P is positively correlated with total number of all input connections, and
12) P is positively correlated with the total number of all output connections, wherein calculation rules for activation intensity or activation rate Fs of the conditionally spontaneous firing neurons during spontaneous firing comprise one or more of 1) Fs=Fsd, Fsd is default activation frequency,
2) Fs is negatively correlated with the time interval since the last activation,
3) Fs is positively correlated with the most recent average issuance rate,
4) Fs is positively correlated with the duration of the most recent activation,
5) Fs is positively correlated with the total number of activations,
6) Fs is positively correlated with the total number of executions of the synaptic plasticity processes of each input connections recently,
7) Fs is positively correlated with the total number of executions of the synaptic plasticity processes of each output connections recently,
8) Fs is positively correlated with the total weights change of each input connections recently,
9) Fs is positively correlated with the total weights change of each output connections recently,
10) Fs is positively correlated with the average weights of all input connections,
11) Fs is positively correlated with the total modulus of the weights of all input connections,
12) Fs is positively correlated with the total number of all input connections, and
13) Fs is positively correlated with the total number of all output connections, wherein if the conditionally spontaneous firing neuron is a spiking neuron, P is the probability of a series of spiking currently being activated, if the conditionally spontaneous firing neuron is activated, the activation rate is Fs, and if the conditionally spontaneous firing neuron is not activated, the activation rate is 0, and wherein if the conditionally spontaneous firing neuron is a non-spiking neuron, P is the probability of current activation, if the conditionally spontaneous firing neuron is activated, the activation intensity is Fs, and if the conditionally spontaneous firing neuron is not activated, the activation intensity is 0.

8. A neural network with memory and information abstraction functions according to claim 1, wherein the perceptual module comprises one or more perceptual encoding layers, and each perceptual encoding layer comprises one or more perceptual encoding neurons, wherein a plurality of the perceptual encoding neurons located in one of the perceptual encoding layers and a plurality of other perceptual encoding neurons located in said one of the perceptual encoding layers respectively form unidirectional or bidirectional excitatory or inhibitory connections, wherein a plurality of the perceptual encoding neurons located in said one of the perceptual encoding layers and a plurality of other perceptual encoding neurons located in a first perceptual encoding layer adjacent to said one of the perceptual encoding layers form unidirectional or bidirectional excitatory or inhibitory connections, and wherein a plurality of the perceptual encoding neurons located in said one of the perceptual encoding layers and a plurality of the perceptual encoding neurons located in a second perceptual encoding layer not adjacent to said one of the perceptual encoding layers respectively form unidirectional or bidirectional excitatory or inhibitory connections.

9. A neural network with memory and information abstraction functions according to claim 8, wherein the one or more perceptual encoding layers of the perceptual module can also be convolutional layers.

10. A neural network with memory and information abstraction functions according to claim 1, wherein the memory module comprises: a feature enabling sub-module, a concrete memory sub-module, and one or more abstract memory sub-modules, wherein the information input channel of the information synthesis and exchange module comprises: a concrete information input channel and an abstract information input channel, wherein the memory neurons comprise cross memory neurons, concrete memory neurons, and abstract memory neurons, wherein the information input neurons comprise concrete information input neurons and abstract information input neurons, wherein the feature enabling sub-module comprises a plurality of the cross memory neurons, wherein the concrete memory sub-module comprises a plurality of the concrete memory neurons, wherein the abstract memory sub-modules each comprises a plurality of the abstract memory neurons, wherein the concrete information input channel comprises a plurality of the concrete information input neurons, wherein the abstract information input channel comprises a plurality of the abstract information input neurons, wherein a plurality of said cross memory neurons respectively form unidirectional excitatory connections with a plurality of other cross memory neurons, wherein one or more of said cross memory neurons respectively receive unidirectional excitatory connections from one or more of said concrete information input neurons, wherein one or more of the cross memory neurons respectively form unidirectional excitatory connections with one or more of the concrete memory neurons, wherein each of one or more of the cross memory neurons can also receive one or more information components control signal input terminals, wherein a plurality of the concrete memory neurons respectively form unidirectional excitatory connections with one or more of other concrete memory neurons, wherein a plurality of the concrete memory neurons respectively form unidirectional excitatory connections with one or more of the information output neurons, wherein one or more of the concrete memory neurons form unidirectional excitatory connections with one or more of the abstract memory neurons, wherein a plurality of the abstract memory neurons respectively form the unidirectional or bidirectional excitatory connections with one or more other abstract memory neurons, wherein a plurality of the abstract memory neurons respectively form unidirectional excitatory connections with one or more of the information output neurons, wherein each of the concrete information input neurons forms unidirectional excitatory connections with one or more of the concrete memory neurons, wherein each of the abstract information input neurons forms unidirectional excitatory connections with one or more abstract memory neurons, and wherein the working process of the feature enabling sub-module also comprises:

neuron regeneration process and information component adjustment process.

11. A neural network with memory and information abstraction functions according to claim 10, wherein the concrete information input channel comprises a concrete instance temporal information input channel and a concrete environment spatial information input channel, wherein the abstract information input channel comprises an abstract instance temporal information input channel and an abstract environment space information input channel, wherein the information output channel comprises an instance temporal information output channel and an environment spatial information output channel, wherein the concrete memory sub-module comprises a concrete instance time memory unit and a concrete environment spatial memory unit, wherein the abstract memory sub-module comprises an abstract instance time memory unit and an abstract environment spatial memory unit, wherein the concrete information input neurons each comprise a concrete instance temporal information input neuron and a concrete environment spatial information input neuron, wherein the abstract information input neurons each comprises an abstract instance temporal information input neuron and an abstract environment spatial information input neuron, wherein the information output neuron comprises an instance temporal information output neuron and an environment spatial information output neuron, wherein the concrete memory neurons each comprises a concrete instance time memory neuron and a concrete environment spatial memory neuron, wherein the abstract memory neurons each comprises an abstract instance time memory neuron and an abstract environment spatial memory neuron, wherein the concrete instance temporal information input channel comprises a plurality of the concrete instance temporal information input neurons, wherein the concrete environment spatial information input channel comprises a plurality of the concrete environment spatial information input neurons, wherein the abstract instance temporal information input channel comprises a plurality of the abstract instance temporal information input neurons, wherein the abstract environment spatial information input channel comprises a plurality of the abstract environment spatial information input neurons, wherein the instance temporal information output channel comprises a plurality of the instance temporal information output neurons, wherein the environment spatial information output channel comprises a plurality of the environment spatial information output neurons, wherein the concrete instance time memory unit comprises a plurality of the concrete instance time memory neurons, wherein the concrete environment spatial memory unit comprises a plurality of concrete environment spatial memory neurons, wherein the abstract instance time memory unit comprises a plurality of abstract instance time memory neurons, wherein the abstract environment spatial memory unit comprises a plurality of the abstract environment spatial memory neurons, wherein the connections between the neurons comprise at least one of the following connections:

wherein a plurality of the time encoding neurons and the instance encoding neurons respectively form unidirectional excitatory connections with one or more of the concrete instance temporal information input neurons or the abstract instance temporal information input neurons, wherein a plurality of the motion and orientation encoding neurons, the environment encoding neurons and the spatial encoding neurons respectively form unidirectional excitatory connections with one or more of the concrete environment spatial information input neurons or the abstract environment spatial information input neurons, wherein each of the concrete instance temporal information input neurons forms unidirectional excitatory connections with one or more concrete instance time memory neurons, wherein each of the concrete environment spatial information input neurons and one or more of the concrete environment spatial memory neurons form unidirectional excitatory connections, wherein each of the abstract instance temporal information input neurons and one or more of the abstract instance time memory neurons form unidirectional excitatory connections, wherein each of the abstract environment spatial information input neurons forms unidirectional excitatory connections with one or more of the abstract environment spatial memory neurons, wherein a plurality of the instance temporal information output neurons respectively accept unidirectional excitatory connections from one or more of the abstract instance time memory neurons, and can also form unidirectional excitatory connections with one or more of the instance encoding neurons, wherein a plurality of the environment spatial information output neurons respectively form unidirectional excitatory connections with one or more of the abstract environment spatial memory neurons, can also form unidirectional excitatory connections with one or more of the environment encoding neurons, respectively, and can also form the unidirectional or bidirectional excitatory connections with one or more of the spatial encoding neurons, wherein a plurality of the concrete instance time memory neurons respectively form unidirectional excitatory connections with one or more of the abstract instance time memory neurons, wherein a plurality of the concrete environment spatial memory neurons respectively form unidirectional excitatory connections with one or more of the abstract environment spatial memory neurons, wherein a plurality of the abstract instance time memory neurons respectively form the unidirectional or bidirectional excitatory connections with one or more of the instance encoding neurons, wherein a plurality of the abstract environment spatial memory neurons respectively form the unidirectional or bidirectional excitatory connections with one or more of the environment encoding neurons or the spatial encoding neurons, wherein a plurality of the concrete instance time memory neurons and a plurality of the concrete environment spatial memory neurons form the unidirectional or bidirectional excitatory connections with each other, wherein a plurality of the abstract instance time memory neurons and a plurality of the abstract environment spatial memory neurons form the unidirectional or bidirectional excitatory connections with each other, wherein a plurality of the concrete instance temporal information input neurons form the unidirectional or bidirectional excitatory connections with one or more of the concrete environment spatial information input neurons, wherein a plurality of the concrete environment spatial information input neurons form the unidirectional or bidirectional excitatory connections with one or more of the concrete instance temporal information input neurons, wherein a plurality of the abstract instance temporal information input neurons respectively form the unidirectional or bidirectional excitatory connections with one or more of the abstract environment spatial information input neurons, wherein a plurality of the abstract environment spatial information input neurons and one or more of the abstract instance temporal information input neurons respectively form the unidirectional or bidirectional excitatory connections, wherein a plurality of the concrete instance temporal information input neurons or the abstract instance temporal information input neurons respectively form the unidirectional or bidirectional excitatory connections with one or more of the instance temporal information output neurons, wherein a plurality of the concrete environment spatial information input neurons or the abstract environment spatial information input neurons form the unidirectional or bidirectional excitatory connections with one or more of the environment spatial information output neurons, and wherein a plurality of the instance temporal information output neurons and the environment spatial information output neurons can also form the unidirectional or bidirectional excitatory connections with each other.

12. A neural network with memory and information abstraction functions according to claim 10, wherein each of the cross memory neurons of the feature enabling sub-module is arranged in layer Q, and each of the cross memory neurons in layers 1 to L respectively receives unidirectional excitatory connections from one or more of the concrete instance temporal information input neurons, wherein each of the cross memory neurons from the H layer to the last layer forms unidirectional excitatory connections with one or more of the concrete memory neurons, wherein each of the cross memory neurons in any layer from L+1 to H−1 receives unidirectional excitatory connections from one or more of the concrete environment spatial information input neurons, wherein a plurality of the cross memory neurons of each adjacent layer form unidirectional excitatory connections from front layer to back layer, wherein $1 <= L < H <= Q$, $L <= H-2$, $Q >= 3$.

13. A neural network with memory and information abstraction functions according to claim 1, wherein the time encoding module comprises one or more time encoding units, and each time encoding unit comprises a plurality of said time encoding neurons, each of the time encoding neurons sequentially forms excitatory connections in a forward direction, and sequentially forms inhibitory connections in a reverse direction, and is connected end to end to form a closed loop, wherein each of the time encoding neurons can also have excitatory connections connected back to itself so that said each time encoding neuron can be continuously activated until said each time encoding neuron is shut down by inhibitory input of a next time encoding neuron, wherein when one of the time encoding neurons activates, each of the time encoding neuron inhibits a previous time encoding neuron to weaken or stop its activation, and promotes a next time encoding neuron to gradually increase said next time encoding neuron's membrane potential until the next time encoding neuron starts to activate, so that each time encoding neuron forms a time-sequential switch loop, and wherein a plurality of the time encoding neurons located in a certain time encoding unit can respectively form unidirectional or bidirectional excitatory or inhibitory connections with a plurality of the time encoding neurons located in another time encoding unit.

14. A neural network with memory and information abstraction functions according to claim 1, wherein the motion and orientation encoding module comprises one or more speed encoding units and one or more relative displacement encoding units, wherein the motion and orientation encoding neuron comprises a speed encoding neuron, a unidirectional integral distance displacement encoding neuron, a multidirectional integral distance displacement encoding neuron, and an omnidirectional integral distance displacement encoding neuron.

15. A neural network with memory and information abstraction functions according to claim 14, wherein the speed encoding unit comprises 6 speed encoding neurons, named SN0, SN60, SN120, SN180, SN240, and SN300, respectively, and each of the speed encoding neurons encodes the instantaneous speed component (non-negative value) of the intelligent agents in a direction of movement, wherein adjacent motion directions are separated by 60°, and axis of each direction of movement divides a plane space into 6 equal parts, wherein each speed encoding neuron's activation rate is determined as follows:

step a1: setting reference direction of the plane space where the movement is located (fixed to the environment space where the intelligent agent is located), wherein the reference direction is set to 0°, where the instantaneous speed components in the directions of 0°, 60°, 120°, 180°, 240° and 300° are encoded by SN0, SN60, SN120, SN180, SN240 and SN300 successively, step a2: obtaining current instantaneous motion speed V and direction of instantaneous speed of the intelligent agent, step a3: if the direction of instantaneous speed is between 0° direction and 60° direction, including a case in coincidence with the 0° direction, and an angle with the 0° direction is θ, setting the activation rate of the speed encoding neuron SN0 to Ks1*V*sin(60°−θ)/sin(120°, and setting the activation rate of the speed encoding neuron SN60 to Ks2*V*sin(θ)/sin(120°, and setting the activation rate of other speed encoding neurons to 0, if the direction of the instantaneous speed is between the 60° direction and 120° direction, including a case in coincidence with the 60° direction, and an angle with the 60° direction is θ, setting the activation rate of the speed encoding neuron SN60 as) Ks3*V*sin(60°−θ)/sin(120°, setting the activation rate of the speed encoding neuron SN120 to Ks4*V*sin(θ)/sin(120°, other setting the activation rate of the other speed encoding neurons to 0, if the direction of the instantaneous speed is between the 120° direction and 180° direction, including a case in coincidence with the 120° direction, and an angle with the 120° direction is θ, setting the activation rate of the speed encoding neuron SN120 as Ks5*V*sin(60°−θ)/sin(120°, setting the activation rate of the speed encoding neuron SN180 to Ks6*V*sin(θ)/sin(120°, and setting the activation rate of the other speed encoding neurons to 0, if the direction of the instantaneous speed is between the 180° direction and 240° direction, including a case in coincidence with the 180° direction, and an angle with the 180° direction is 0, setting the activation rate of the speed encoding neuron SN180 as Ks7*V*sin(60°−θ)/sin(120°, setting the activation rate of the speed encoding neuron SN240 to Ks8*V*sin(θ)/sin(120°, and setting the activation rate of the other speed encoding neuron to 0, if the direction of the instantaneous speed is between the 240° direction and 300° direction, including a case in coincidence with the 240° direction, and an angle with the 240° direction is θ, setting the activation rate of the speed encoding neuron SN240 as Ks9*V*sin(60°−θ)/sin(120°, setting the activation rate of the speed encoding neuron SN300 to Ks10*V*sin(θ)/sin(120°, and setting the activation rate of the other speed encoding neurons to 0, if the direction of the instantaneous speed is between the 300° direction and 0° direction, including a case in coincidence with the 300° direction, and an angle with the 300° direction is 0, setting the activation rate of the speed encoding neuron SN300 as Ks11*V*sin(60°−θ)/sin(120°, setting the activation rate of the speed encoding neuron SN0 to Ks12*V*sin(θ)/sin(120°, and setting the activation rate of the other speed encoding neurons to 0, step a4: repeating step a2 and step a3 until the intelligent agent moves to a new environment, then resetting the reference direction and starting from step a1, wherein the Ks1, Ks2, Ks3, Ks4, Ks5, Ks6, Ks7, Ks8, Ks9, Ks10, Ks11, Ks12 are speed correction coefficients.

16. A neural network with memory and information abstraction functions according to claim 14, wherein the relative displacement encoding units each comprises 6 unidirectional integral distance displacement encoding neurons, 6 multidirectional integral distance displacement encoding neurons, and 1 omnidirectional integral distance displacement encoding neuron ODDEN, wherein the 6 unidirectional integral distance displacement encoding neurons are respectively named SDDEN0, SDDEN60, SDDEN120, SDDEN180, SDDEN240, SDDEN300, and the 6 multidirectional integral distance displacement encoding neurons are respectively named MDDEN0A60, MDDEN60A120, MIDDEN120A180, MDDEN180A240, MDDEN240A300, MDDEN300A0, wherein the unidirectional integral distance displacement encoding neurons SDDEN0, SDDEN60, SDDEN120, SDDEN180, SDDEN240, SDDEN300 encode displacements in the direction of 0°, 60°, 120°, 180°, 240°, and 300°, respectively, wherein the multi-directional integral distance displacement encoding neuron MDDEN0A60 encodes a displacement of 0° or 60° sub-direction, MDDEN60A120 encodes a displacement of 60° or 120° sub-direction, MDDEN120A180 encodes a displacement of 120° or 180° sub-direction, and MDDEN180A240 encodes a displacement of 180° or 240° sub-direction, MDDEN240A300 encodes a displacement of 240° or 300° sub-direction, MDDEN300A0 encodes a displacement of 300° or 0° sub-direction, wherein the omnidirectional integral distance displacement encoding neuron ODDEN encodes displacements of 0°, 60°, 120°, 180°, 240°, and 300° in each sub-direction, wherein SDDEN0 accepts excitatory connections from SN0 and inhibitory connections from SN180, wherein SDDEN60 accepts excitatory connections from SN60 and the inhibitory connections from SN240, wherein SDDEN120 accepts excitatory connections from SN120 and inhibited connections from SN300, wherein SDDEN180 accepts excitatory connections from SN180 and inhibitory connections from SN0, wherein SDDEN240 accepts activation connections from SN240 and inhibited connections from SN60, wherein SDDEN300 accepts the excitatory connections from SN300 and the inhibitory connections from SN120, wherein MDDEN0A60 accepts exciting connections from SDDEN0 and SDDEN60, wherein MDDEN60A120 accepts exciting connections from SDDEN60 and SDDEN120, wherein MDDEN120A180 accepts exciting connections from SDDEN120 and SDDEN180, wherein MDDEN180A240 accepts exciting connections from SDDEN180 and SDDEN240, wherein MDDEN240A300 accepts exciting connections from SDDEN240 and SDDEN300, wherein MIDDEN300A0 accepts exciting connections from SDDEN300 and SDDEN0, wherein ODDEN accepts exciting connections from MDDEN0A60, MDDEN60A120, MDDEN120A180, MDDEN180A240, MDDEN240A300, MDDEN300A0, wherein calculation process of the unidirectional integral distance displacement encoding neuron is:

step b1: adding weighted sum of all inputs to the membrane potential at the previous moment to obtain current membrane potential, step b2: when the current membrane potential is within the interval of a first pre-set potential, the activation rate of the unidirectional integral distance displacement encoding neuron is the maximum when the current membrane potential is equal to the first pre-set potential, the greater the deviation between the current membrane potential and the first pre-set potential, the lower the activation rate of the unidirectional integral distance displacement encoding neuron is until it reaches 0, step b3: when the current membrane potential is within the interval of a second pre-set potential, the activation rate of the unidirectional integral distance displacement encoding neuron is the maximum when the current membrane potential is equal to the second pre-set potential, the greater the deviation between the current membrane potential and the second pre-set potential, the lower the activation rate of the unidirectional integral distance displacement encoding neuron is until it reaches 0, step b4: when the current membrane potential is within third pre-set interval, the activation rate of the unidirectional integral distance displacement encoding neuron is the maximum when the current membrane potential is equal to the third pre-set potential interval, the greater the deviation between the current membrane potential and the third pre-set potential interval, the lower the activation rate of the unidirectional integral distance displacement encoding neuron is until it reaches 0, step b5: when the current membrane potential is greater than or equal to the second pre-set potential, resetting the current membrane potential to the first pre-set potential, step B6: when the current membrane potential is less than or equal to the third pre-set potential interval, resetting the current membrane potential to the first pre-set potential, wherein for each of the multi-directional integral distance displacement encoding neurons, if and only if two of the unidirectional integral distance displacement encoding neurons connected to it are activated at the same time, the multi-directional integral distance displacement encoding neuron is activated, wherein the omnidirectional integral distance displacement encoding neuron ODDEN is activated when at least one of the multi-directional integral distance displacement encoding neuron connected with it is activated, the omnidirectional integral displacement encoding neuron ODDEN is activated, and wherein a plurality of the speed encoding units and a plurality of the relative displacement encoding units can be used to respectively represent different and intersecting plane spaces to represent a three-dimensional space.

17. A neural network with memory and information abstraction functions according to claim 1, wherein the neurons further comprise interneurons, wherein the perceptual module, the instance encoding module, the environment encoding module, the spatial encoding module, the information synthesis and exchange module, and the memory module respectively comprise a plurality of the interneurons, wherein unidirectional inhibitory connections are formed with a plurality of corresponding neurons in a corresponding module, and a corresponding number of neurons in each module forms unidirectional excitatory connections with a plurality of corresponding interneurons.

18. A neural network with memory and information abstraction functions according to claim 1, wherein the neurons further comprise differential information decoupling neurons, wherein a plurality of the neurons with unidirectional excitatory connections with the information input neuron are selected as concrete information source neurons, and a plurality of other neurons with unidirectional excitatory connections with the information input neurons are selected as abstract information source neurons, wherein each of the concrete information source neurons has one or more matched differential information decoupling neurons, wherein the concrete information source neurons and each matched differential information decoupling neuron respectively form unidirectional excitatory connections, wherein the information decoupling neurons respectively with input neurons form unidirectional inhibitory connections with the information source input neurons, or form unidirectional inhibitory synapse-synaptic connections with connections input from the information source neurons to the information input neurons, so as to make signal input from the concrete information source neurons to the information input neurons to be subject to inhibitory regulation by the matched differential information decoupling neurons, wherein the abstract information source neurons and the differential information decoupling neurons form unidirectional excitatory connections, wherein each differential information decoupling neuron can have a decoupled control signal input terminal, wherein degree of information decoupling is adjusted by adjusting magnitude of the signal applied on decoupling control signal input, wherein weights of unidirectional excitatory connections between the concrete information source neurons/abstract information source neurons and the matched differential information decoupling neurons are constant, or are dynamically adjusted through the synaptic plasticity process.

19. A neural network with memory and information abstraction functions according to claim 3, wherein process of selecting vibrating neurons, source neurons or target neurons from a plurality of candidate neurons comprises one or more of: selecting part or all of first Kf1 neurons with smallest weights total module length of the input connections, selecting part or all of first Kf2 neurons with smallest weights total module length of the output connections, selecting part or all of first Kf3 neurons with largest weights total module length of the input connections, selecting first Kf4 neurons with the largest total weights module length of the output connections, and selecting first Kf5 with largest activation intensity or activation rate or first to be activated, selecting first Kf6 neurons with smallest activation intensity or activation rate or latest to be activated (including not activated), selecting first Kf7 neurons that have been longest since last activation, selecting first Kf8 neurons that have been closest since the last activation, selecting first Kf9 neurons that have been longest since the last time when the input connections or the last output connections perform the synaptic plasticity process, and selecting first Kf10 that have been closest since the last time when the input connections or the last output connections perform the synaptic plasticity process.

20. A neural network with memory and information abstraction functions according to claim 19, a method for a plurality of the neurons to generate an activation distribution and maintain a pre-set period of activation comprises: inputting samples, directly activating one or more of the neurons in the neural network, letting one or more of the neurons in the neural network to be self-activated, and transmitting existing activation states of one or more of the neurons in the neural network, so as to activate one or more of the neurons, if the neuron are the information input neurons, adjusting the activation distribution and activation duration of each information input neuron through the attention control signal input terminal.

21. A neural network with memory and information abstraction functions according to claim 4, wherein memory triggering process comprises: inputting the samples, or directly activating the neural network's one or more of the neurons, or allowing one or more of the neurons in the neural network to be self-activated, or transmitting the existing activation state of one or more of the neurons in the neural network, wherein if one or more of neurons in the target area are activated in tenth pre-set period, then representation of each activation neuron in the target area can be taken together with its activation intensity or activation rate as the result of the memory triggering process, wherein the target area can be the perceptual module, the instance encoding module, the environment encoding module, the spatial encoding module, and the memory module.

22. A neural network with memory and information abstraction functions according to claim 4, wherein the instantaneous memory encoding process comprises:

step c1: selecting one or more of the information input neurons as the vibrating neurons, step c2: selecting one or more of the memory neurons as the target neurons, step c3: adjust the weights of the unidirectional excitatory connections between each activated vibrating neuron and one or more of the target neurons through the synaptic plasticity process, and step c4: allowing each activated target neuron to establish the unidirectional or bidirectional excitatory connections with one or more of the other target neurons, or establish self-circulating excitatory connections with itself, adjusting the weights of the unidirectional or bidirectional excitatory connections or the self-circulating excitatory connections through the synaptic plasticity process, wherein when adjusting the weights of each connections between each target neuron through the synaptic plasticity process, the weights of part or all of the input/output connections can or cannot be standardized.

23. A neural network with memory and information abstraction functions according to claim 4, wherein the time sequence encoding process comprises:

step d1: selecting one or more of the information input neurons as the vibrating neurons, step d2: during T1 time period, selecting one or more of the memory neurons as first group of the target neurons, adjusting the weights of the unidirectional excitatory connections between each activated vibrating neuron and one or more of the memory neurons of the first group of the target neurons through the synaptic plasticity process, step d3: during the T1 time period, allowing the unidirectional or bidirectional excitatory connections between the memory neurons in the first group of target neurons to adjust the weights by the synaptic plasticity process, step d4: during T2 time period, selecting one or more of the memory neurons as second group of the target neurons, adjusting the weights of the unidirectional excitatory connections through the synaptic plasticity process between each activated vibrating neuron and one or more of the memory neurons of the second group of the target neurons, step d5: during the T2 time period, adjusting the weights of the unidirectional or bidirectional excitatory connections between the memory neurons in the second group of target neurons through the synaptic plasticity process, and step d6: during T3 time period, forming the unidirectional or bidirectional excitatory connections between each memory neuron in the first group of the target neurons and each memory neuron in the second group of the target neurons, and adjusting the weights through the synaptic plasticity process, wherein when adjusting the weights of each connections of the first group of the target neurons and of the second group of the target neurons through the synaptic plasticity process, the weights of part or all of the input/output connections of each memory neuron in the first group and the second group of target neurons can or cannot be standardized, wherein the T1 time period starts at time t1 and ends at time t2, the T2 time period starts at time t3 and ends at time t4, the T3 time period starts at time t3 and ends at time t2, t2 is later than t1, t4 is later than t3 and t2, t3 is later than t1 and not later than t2.

24. A neural network with memory and information abstraction functions according to claim 4, wherein the memory module comprises a feature enabling sub-module, wherein the neuron regeneration process of the feature enabling sub-module comprises:

step e1: selecting one or more of the concrete information input neurons as the source neurons, step e2: selecting one or more of the concrete memory neurons as the target neurons, step e3: adding one or more of the cross memory neurons to the feature enabling sub-module, step e4: allowing each newly added cross-memory neuron and one or more existing cross-memory neurons to form a topological structure of same level or cascade, or to adopt a mixed topological structure of same level and cascade, wherein cascaded ones establish unidirectional excitatory connections between direct upstream and downstream cross memory neurons, step e5: allowing each of the source neurons to establish unidirectional excitatory connections with one or more of the newly added cross-memory neurons, step e6: allowing each of the source neurons to respectively establish unidirectional excitatory connections or no connections with one or more of the existing cross memory neurons, step e7: allowing one or more of the newly added cross memory neurons to establish unidirectional excitatory connections with one or more of the target neurons respectively, step e8: allowing one or more existing cross memory neurons to establish unidirectional excitatory connections or no connections with one or more of the target neurons, and step e9: adjusting the weights of each newly established connection through the synaptic plasticity process, wherein when adjusting the weights of the newly established connections through the synaptic plasticity process, the weights of part or all of the input/output connections of each cross memory neuron can be standardized or not, wherein when adjusting the weights of the newly established connections through the synaptic plasticity process, the weights of part or all of the input/output connections of each target neuron can be standardized or not.

25. A neural network with memory and information abstraction functions according to claim 4, wherein the information transcription process comprises:

step f1: selecting one or more of the neurons in the brain like-neural network as the vibrating neuron, step f2: selecting one or more direct downstream neurons or indirect downstream neurons of the vibrating neurons as the source neurons, step f3: selecting one or more of the direct downstream neurons or indirect downstream neurons of the vibrating neurons as the target neurons, step f4: making each of the activation neurons generate activation distribution and maintain activation for seventh pre-set period Tj, step f5: during the seventh pre-set period Tj, activating one or more of the source neurons, step f6: during the seventh predetermined period Tj, if a certain vibrating neuron is a direct upstream neuron of a certain target neuron, adjusting the weights of the unidirectional or bidirectional connections between the certain vibrating neuron and the certain target neuron through the synaptic plasticity process, if the certain vibrating neuron is an indirect upstream neuron of a certain target neuron, adjusting the weights of unidirectional or bidirectional connections between the direct upstream neuron of the target neuron and the target neuron in the connections pathway between the certain vibrating neuron and the certain target neuron through the synaptic plasticity process, step f7: during the seventh pre-set period Tj, if each of the target neurons can establish connections with several other target neurons, adjusting the weights through the synaptic plasticity process, and step f8: during the seventh pre-set cycle Tj, if there are the unidirectional or bidirectional excitatory connections between a certain source neuron and the certain target neuron, adjusting the weights through the synaptic plasticity process.

26. A neural network with memory and information abstraction functions according to claim 4, wherein the information aggregation process of the memory module comprises:

step g1: selecting one or more of the information input neurons as the vibrating neurons, step g2: selecting one or more of the memory neurons as source neurons, step g3: selecting one or more of the memory neurons as the target neurons, step g4: making each of the vibrating neurons generate activation distribution and maintain activation of the eighth pre-set period Tk, step g5: during the eighth pre-set period Tk, adjusting the weights of the unidirectional excitatory connections between each activated vibrating neuron and one or more of the target neurons through the synaptic plasticity process, step g6: during the eighth pre-set period Tk, adjusting the weights of the unidirectional or bidirectional excitatory connections between each activated source neuron and one or more of the target neurons through the synaptic plasticity process, and step g7: performing one or more iterations, wherein each time the step g1 to the step g6 is denoted as one iteration, wherein one or more of the target neurons are mapped to corresponding tags as a result of the information aggregation process of the memory module.

27. A neural network with memory and information abstraction functions according to claim 4, wherein the directional information aggregation process of the memory module comprises:

step h1: selecting one or more of the information input neurons as the vibrating neurons, step h2: selecting one or more of the memory neurons as the source neurons, step h3: selecting one or more of the memory neurons as the target neurons, step h4: making each of the vibrating neurons generate activation distribution and maintaining activation of ninth pre-set period Ta, step h5: during the ninth pre-set period Ta, activating Ma1 of the source neurons and Ma2 of the target neurons, step h6: during the ninth pre-set period Ta, recording first Ka1 source neuron with the highest activation intensity or the highest activation rate or the first to be activated as Ga1, and recording remaining Ma1-Ka1 activated source neurons as Ga2, step h7: during the ninth pre-set period Ta, recording the first Ka2 target neurons with the highest activation intensity or the highest activation rate or the first to be activated as Ga3, and recording remaining Ma2-Ka2 activated target neurons as Ga4, step h8: during the ninth pre-set period Ta, allowing each source neuron in the Ga1 and the unidirectional or bidirectional excitatory connections between a plurality of the target neurons in the Ga3 to perform one or more synaptic weights enhancement processes, step h9: during the ninth pre-set period Ta, allowing the unidirectional or bidirectional excitatory connections between each source neuron in the Ga1 and a plurality of the target neurons in the Ga4 to perform one or more synaptic weights reduction processes, step h10: during the ninth pre-set period Ta, allowing each source neuron in the Ga2 and the unidirectional or bidirectional excitatory connections between a plurality of the target neurons in the Ga3 to perform or not to perform one or more of the synaptic weights reduction processes, step h11: during the ninth pre-set period Ta, allowing each source neuron in the Ga2 and the unidirectional or bidirectional excitatory connections between a plurality of the target neurons in the Ga4 to perform or not to perform one or more synaptic weights enhancement processes, step h12: during the ninth pre-set period Ta, allowing each activated vibrating neuron and the unidirectional excitatory connections between the target neurons in the Ga3 to perform one or more of the synaptic weights enhancement processes, step h13: during the ninth pre-set period Ta, allowing each activated vibrating neuron and the unidirectional excitatory connections between a plurality of the target neurons in the Ga4 to perform one or more of the synaptic weights reduction processes, and step h14: performing one or more iterations, wherein each time the step h1 to the step h13 is denoted as one iteration, wherein in the process from the step h8 to the step h13, after one or more of the synaptic weights enhancement processes or the synaptic weights reduction processes are performed, the weights of the input connections or the output connections of part or all of the source neurons or of the target neurons can be standardized or not standardized, wherein the synaptic weights enhancement processes can adopt a unipolar upstream/downstream activation dependent synaptic enhancement process, or a unipolar spiking time dependent synaptic enhancement process, wherein the synaptic weights reduction processes can adopt a unipolar upstream/downstream activation dependent synaptic reduction process, or a unipolar spiking time dependent synaptic reduction process, wherein the synaptic weights enhancement process and the synaptic weights reduction process can also adopt the asymmetric bipolar spiking time dependent synaptic plasticity process or the symmetric bipolar spiking time dependent synaptic plasticity process, wherein the Mal and Ma2 are positive integers, Ka1 is a positive integer not exceeding Ma1, and Ka2 is a positive integer not exceeding Ma2.

28. A neural network with memory and information abstraction functions according to claim 4, wherein the information component adjustment process of the brain like-neural network comprises:

step i1: selecting one or more neurons in the brain like-neural network as the vibrating neurons, step i2: selecting one or more direct downstream neurons or indirect downstream neurons of the vibrating neurons as the target neurons, step i3: making each of the vibrating neurons generate activation distribution, and maintaining activation of each vibrating neuron during first pre-set period Tb, step i4: during the first pre-set period Tb, activating Mb1 of the target neurons, wherein first Kb1 target neurons with the highest activation intensity or the highest activation rate or the first to be activated are recorded as Gb1, and remaining Mb1-Kb1 activated target neurons are recorded as Gb2, step i5: if a certain vibrating neuron is a direct upstream neuron of a certain target neuron in the Gb1, making the unidirectional or bidirectional connections between the certain vibrating neuron and the certain target neuron to perform one or more synaptic weights enhancement processes, and if the certain vibrating neuron is an indirect upstream neuron of the certain target neuron in the Gb1, then making the unidirectional or bidirectional connections, which are between the certain target neuron and the direct upstream neuron of said certain target neuron, in the connections paths between the certain vibrating neuron and the certain target neuron to perform one or more of the synaptic weights enhancement processes, step i6: if the certain vibrating neuron is the direct upstream neuron of the certain target neuron in the Gb2, making the unidirectional or bidirectional connections between the certain vibrating neuron and the certain target neuron perform one or more of the synaptic weights reduction processes, and if the vibrating neuron is the indirect upstream neuron of the certain target neuron in the Gb2, then making the unidirectional or bidirectional connections, which are between the certain target neuron and the direct upstream neuron of said certain target, in the connections paths between the certain vibrating neuron and the certain target neuron perform one or more of the synaptic weights reduction processes, and step i7: performing one or more iterations, wherein each time the step i1 to the step i6 is denoted as one iteration, wherein in the process of the step i5 and the step i6, after performing one or more of the synaptic weights enhancement processes or the synaptic weights reduction processes, the weights of part or all of the input connections of each target neuron can be standardized or not, wherein one or more of the target neurons can be mapped to corresponding labels as a result of the information component adjustment process of the neural network, wherein the synaptic weights enhancement processes can adopt a unipolar upstream/downstream activation dependent synaptic enhancement process, or a unipolar spiking time dependent synaptic enhancement process, wherein the synaptic weights reduction processes can adopt a unipolar upstream/downstream activation dependent synaptic reduction process, or a unipolar spiking time dependent synaptic reduction process, wherein the synaptic weights enhancement process and the synaptic weights reduction process can also adopt the asymmetric bipolar spiking time dependent synaptic plasticity process or the symmetric bipolar spiking time dependent synaptic plasticity process.

29. A neural network with memory and information abstraction functions according to claim 4, wherein the information component adjustment process of the memory module comprises:

step j1: selecting one or more of the information input neurons as the vibrating neurons, step j2: selecting one or more of the memory neurons as the target neurons, step j3: making each of the vibrating neurons generate activation distribution, and maintain activation of the vibrating neurons during second pre-set period Tc, step j4: during the second pre-set period Tc, activating Mc1 of the target neurons, recording first Kc1 target neurons with the highest activation intensity or the highest activation rate or the first to be activated as Gc1, and recording remaining Mc1-Kc1 activated target neurons as Gc2, step j5: during the second pre-set period Tc, making each activated vibrating neuron and the unidirectional excitatory connections between a plurality of the target neurons in the Gel perform one or more synaptic weights enhancement processes, step j6: during the second pre-set period Tc, making each activated activation neuron and the unidirectional excitatory connections between a plurality of the target neurons in the Gc2 perform one or more synaptic weights reduction processes, and step j7: performing one or more iterations, wherein each time the step j1 to the step j6 is denoted as one iteration, wherein in the process of the step j5 and the step j6, after performing one or more of the synaptic weights enhancement processes or the synaptic weights reduction processes, the weights of part or all of the input connections of each target neuron can be standardized or not, wherein one or more of the target neurons can be mapped to corresponding labels as a result of the information component adjustment process of the memory module, wherein the synaptic weights enhancement processes can adopt a unipolar upstream/downstream activation dependent synaptic enhancement process, or a unipolar spiking time dependent synaptic enhancement process, wherein the synaptic weights reduction processes can adopt a unipolar upstream/downstream activation dependent synaptic reduction process, or a unipolar spiking time dependent synaptic reduction process, wherein the synaptic weights enhancement process and the synaptic weights reduction process can also adopt the asymmetric bipolar spiking time dependent synaptic plasticity process or the symmetric bipolar spiking time dependent synaptic plasticity process.

30. A neural network with memory and information abstraction functions according to claim 4, wherein the memory module comprises the feature enabling sub-module, wherein the information component adjustment process of the feature enabling sub-module comprises:

step k1: selecting one or more of the cross memory neurons or direct upstream neuron of the cross memory neurons as the vibrating neurons, step k2: selecting one or more of the cross memory neurons or the concrete memory neurons of the direct downstream neurons of the vibrating neurons as the target neurons, step k3: making each of the vibrating neurons generate activation distribution, and maintain activation of the vibrating neurons during second pre-set period Tc, step k4: during the third predetermined period Td, activating Md1 of all target direct downstream neurons of a certain said vibrating neuron, recording first Kd1 target neurons with the highest activation intensity or the highest activation rate or the first to be activated as Gd1, and recording remaining Md1-Kd1 activated target neurons as Gd2, step k5: making each activated activation neuron and the unidirectional excitatory connections between a plurality of the target neurons in the Gd1 perform one or more synaptic weights enhancement processes, step k6: making each activated activation neuron and the unidirectional excitatory connections between a plurality of the target neurons in the Gd2 perform one or more synaptic weights reduction processes, and step k7: performing one or more iterations, wherein each time the step j1 to the step j6 is denoted as one iteration, wherein in the process of the step k5 and the step k6, after performing one or more of the synaptic weights enhancement processes or the synaptic weights reduction processes, the weights of part or all of the input connections of each target neuron can be standardized or not, wherein one or more of the target neurons can be mapped to corresponding labels as a result of the information component adjustment process of the feature enabling sub-module, wherein the synaptic weights enhancement processes can adopt a unipolar upstream/downstream activation dependent synaptic enhancement process, or a unipolar spiking time dependent synaptic enhancement process, wherein the synaptic weights reduction processes can adopt a unipolar upstream/downstream activation dependent synaptic reduction process, or a unipolar spiking time dependent synaptic reduction process, wherein the synaptic weights enhancement process and the synaptic weights reduction process can also adopt the asymmetric bipolar spiking time dependent synaptic plasticity process or the symmetric bipolar spiking time dependent synaptic plasticity process.

31. A neural network with memory and information abstraction functions according to claim 4, wherein the memory forgetting process comprises an upstream distribution dependent memory forgetting process, a downstream distribution dependent memory forgetting process, and an upstream and downstream distribution dependent memory forgetting process, wherein the upstream distribution dependent memory forgetting process comprises: for a certain connection, if its upstream neuron continues to not distribute within fourth pre-set period, absolute value of the weights is reduced, and the reduced amount is denoted as DwDecay1, wherein the downstream distribution dependent memory forgetting process comprises: for the certain connection, if its downstream neuron continues to not distribute within fifth pre-set period, the absolute value of the weights is reduced, and the reduced amount is denoted as DwDecay2, wherein the upstream and downstream distribution dependent memory forgetting process comprises: for the certain connection, if its upstream and downstream neurons do not perform synchronous distribution during sixth pre-set period, the absolute value of the weights is reduced, and the reduced amount is denoted as DwDecay3, wherein the synchronous distribution comprises: when the downstream neuron involved in the connections activates, and time interval from current or past most recent upstream neuron activation does not exceed fourth pre-set time interval Te1, or when the upstream neuron involved in the connections activates, and the time interval from the current or past most recent downstream neuron activation does not exceed the fifth pre-set time interval Te2, wherein in the memory forgetting process, if the certain connection has a specified lower limit of the absolute value of the weights, the absolute value of the weights will no longer decrease when the absolute value of the weights reaches the lower limit, or the connections will be cut off.

32. A neural network with memory and information abstraction functions according to claim 31, wherein the DwDecay1, the DwDecay2, and the DwDecay3 are respectively proportional to the weights of the connections involved.

33. A neural network with memory and information abstraction functions according to claim 4, wherein the memory self-consolidation process comprises: when a certain neuron is self-activated, the weights of part or all of the certain neuron is adjusted through a unipolar downstream activation dependent synaptic enhancement process and a unipolar downstream spiking dependent synaptic enhancement process, wherein the weights of part or all of output connections of the certain neuron are adjusted through a unipolar upstream activation dependent synaptic enhancement process and a unipolar upstream spiking dependent synaptic enhancement process.

34. A neural network with memory and information abstraction functions according to claim 4, wherein the working process of the neural network also comprises an imagination process and an association process, wherein the imagination process and the associated processes are alternate or integrated among the active attention process, the automatic attention process, the memory triggering process, the neuron regeneration process, instantaneous memory encoding process, the time series memory encoding process, the information aggregation process, the information component adjustment process, and the information transcription process, the memory forgetting process and the memory self-consolidation process, wherein the representation information formed by a plurality of the neurons involved in those processes is the result of the imagination process or the associated processes.

35. A neural network with memory and information abstraction functions according to claim 5, wherein the unipolar upstream activation dependent synaptic plasticity process comprises a unipolar upstream activation dependent synaptic enhancement process and a unipolar upstream activation dependent synaptic reduction process, wherein the unipolar upstream activation dependent synaptic enhancement process comprises: when the activation intensity or activation rate of the upstream neurons involved in the connections is not zero, and if the involved connections have not yet been formed, the connections will be established and the weights will be initialized to 0 or a minimum value, if the connections involved have been formed, the absolute value of weights of the connections will be increased, and the increment is denoted as DwLTP1u, if an upper limit of the absolute value of the weights is specified, the absolute value of the weights will no longer grow when it reaches the upper limit, wherein the unipolar upstream activation dependent synaptic reduction process comprises: when the activation intensity or activation rate of the upstream neurons involved in the connections is not zero, and if the involved connections has not yet been formed, the unipolar upstream activation dependent synaptic reduction process will be skipped, if the connections involved have been formed, the absolute value of the weights of the connections will be reduced, the reduction is denoted as DwLTD1u, if a lower limit of the absolute value of the weights is specified, the absolute value of the weights will no longer decrease when it reaches the lower limit, or the connections will be cut off, and wherein DwLTP1u and DwLTD1u are non-negative values.

36. A neural network with memory and information abstraction functions according to claim 35, wherein the values of DwLTP1u and DwLTD1u in the unipolar upstream activation dependent synaptic plasticity process comprises one or more of:

DwLTP1u and DwLTD1u are non-negative and are respectively proportional to the activation intensity or activation rate of the upstream neurons in the involved connections, or DwLTP1u and DwLTD1u are non-negative values and are respectively proportional to the activation intensity or activation rate of the upstream neurons involved in the connections and the weights of the involved connections.

37. A neural network with memory and information abstraction functions according to claim 5, wherein the unipolar downstream activation dependent synaptic plasticity process comprises a unipolar downstream activation dependent synaptic enhancement process and a unipolar downstream activation dependent synaptic reduction process, wherein the unipolar downstream activation dependent synaptic enhancement process comprises: when the activation intensity or activation rate of the downstream neurons involved in the connections is not zero, and if the involved connections have not yet been formed, the connections will be established and the weights will be initialized to 0 or a minimum value, if the connections involved have been formed, the absolute value of weights of the connections is increased, and the increment is denoted as DwLTP1d, if an upper limit of the absolute value of the weights is specified, the absolute value of the weights will no longer grow when it reaches the upper limit, wherein the unipolar downstream activation dependent synaptic reduction process comprises: when the activation intensity or activation rate of the downstream neurons involved in the connections is not zero, and if the involved connections has not yet been formed, the unipolar downstream activation dependent synaptic reduction process will be skipped, if the connections involved have been formed, the absolute value of the weights of the connections will be reduced, the reduction is denoted as DwLTD1d, if a lower limit of the absolute value of the weights is specified, the absolute value of the weights will no longer decrease when it reaches the lower limit, or the connections will be cut off, and wherein DwLTP1d and DwLTD1d are non-negative values.

38. A neural network with memory and information abstraction functions according to claim 37, wherein the values of DwLTP1d and DwLTD1d in the unipolar downstream activation dependent synaptic plasticity process comprises one or more of:

DwLTP1d and DwLTD1d are non-negative and are respectively proportional to the activation intensity or activation rate of the downstream neurons in the involved connections, or DwLTP1u and DwLTD1u are non-negative and are respectively proportional to the activation intensity or activation rate of the downstream neurons involved in the connections and the weights of the involved connections.

39. A neural network with memory and information abstraction functions according to claim 5, wherein the unipolar upstream and downstream activation dependent synaptic plasticity process comprises a unipolar upstream and downstream activation dependent synaptic enhancement process and a unipolar upstream and downstream activation dependent synaptic reduction process, wherein the unipolar upstream and downstream activation dependent synaptic enhancement process comprises: when the activation intensity or activation rate of the upstream and downstream neurons involved in the connections is not zero, and if the involved connections have not yet been formed, the connections will be established and the weights will be initialized to 0 or a minimum value, if the connections involved have been formed, the absolute value of weights of the connections will be increased, and the increment is denoted as DwLTP2, if an upper limit of the absolute value of the weights is specified, the absolute value of the weights will no longer grow when it reaches the upper limit, wherein the unipolar upstream and downstream activation dependent synaptic reduction process comprises: when the activation intensity or activation rate of the upstream and downstream neurons involved in the connections is not zero, and if the involved connections has not yet been formed, the unipolar upstream and downstream activation dependent synaptic reduction process will be skipped, if the connections involved have been formed, the absolute value of the weights of the connections will be reduced, the reduction is denoted as DwLTD2, if a lower limit of the absolute value of the weights is specified, the absolute value of the weights will no longer decrease when it reaches the lower limit, or the connections will be cut off, and wherein DwLTP2 and DwLTD2 are non-negative values.

40. A neural network with memory and information abstraction functions according to claim 39, wherein the values of DwLTP2 and DwLTD2 in the unipolar upstream and downstream activation dependent synaptic plasticity comprises one or more of:

DwLTP2 and DwLTD2 are non-negative, are respectively proportional to the activation intensity or activation rate of the upstream neurons and the activation intensity or activation rate of the upstream neurons, or DwLTP2 and DwLTD2 are non-negative, are respectively proportional to the activation intensity or activation rate of the downstream neurons involved in the connections, the activation intensity or activation rate of the upstream neurons in the involved connections, and the weights of the involved connections.

41. A neural network with memory and information abstraction functions according to claim 5, wherein the unipolar upstream spiking dependent synaptic plasticity process comprises a unipolar upstream spiking dependent synaptic enhancement process and a unipolar upstream spiking dependent synaptic reduction process, wherein the unipolar upstream spiking dependent synaptic enhancement process comprises: when the upstream neurons involved in the connections are activated, and if the involved connections have not yet been formed, the connections will be established and the weights will be initialized to 0 or a minimum value, if the connections involved have been formed, the absolute value of weights of the connections will be increased, and the increment is denoted as DwLTP3u, if an upper limit of the absolute value of the weights is specified, the absolute value of the weights will no longer grow when it reaches the upper limit, wherein the unipolar upstream spiking dependent synaptic reduction process comprises: when the upstream neurons involved in the connections are activated, and if the involved connections have not yet been formed, the unipolar upstream spiking dependent synaptic reduction process will be skipped, if the connections involved have been formed, the absolute value of the weights of the connections will be reduced, the reduction is denoted as DwLTD3u, if a lower limit of the absolute value of the weights is specified, the absolute value of the weights will no longer decrease when it reaches the lower limit, or the connections will be cut off, and wherein DwLTP3u and DwLTD3u are non-negative values.

42. A neural network with memory and information abstraction functions according to claim 41, wherein the values of DwLTP3u and DwLTD3u in the unipolar upstream spiking dependent synaptic plasticity process comprises one or more of:

DwLTP3u and DwLTD3u are non-negative constants, or

DwLTP3u and DwLTD3u are non-negative, are respectively proportional to the weights of the involved connections.

43. A neural network with memory and information abstraction functions according to claim 5, wherein the unipolar downstream spiking dependent synaptic plasticity process comprises a unipolar downstream spiking dependent synaptic enhancement process and a unipolar downstream spiking dependent synaptic reduction process, wherein the unipolar upstream spiking dependent synaptic enhancement process comprises: when the upstream neurons involved in the connections are activated, and if the involved connections have not yet been formed, the connections will be established and the weights will be initialized to 0 or a minimum value, if the connections involved have been formed, the absolute value of weights of the connections will be increased, and the increment is denoted as DwLTP3d, if an upper limit of the absolute value of the weights is specified, the absolute value of the weights will no longer grow when it reaches the upper limit, wherein the unipolar upstream spiking dependent synaptic reduction process comprises: when the upstream neurons involved in the connections are activated, and if the involved connections have not yet been formed, the unipolar upstream spiking dependent synaptic reduction process will be skipped, if the connections involved have been formed, the absolute value of the weights of the connections will be reduced, the reduction is denoted as DwLTD3d, if a lower limit of the absolute value of the weights is specified, the absolute value of the weights will no longer decrease when it reaches the lower limit, or the connections will be cut off, and wherein DwLTP3d and DwLTD3d are non-negative values.

44. A neural network with memory and information abstraction functions according to claim 43, wherein the values of DwLTP3d and DwLTD3d in the unipolar downstream spiking dependent synaptic plasticity process s comprises one or more of:

DwLTP3d and DwLTD3d are non-negative constants, or

DwLTP3d and DwLTD3d are non-negative, and are respectively proportional to the weights of the involved connections.

45. A neural network with memory and information abstraction functions according to claim 5, wherein the unipolar spiking time dependent synaptic plasticity process comprises a unipolar spiking time dependent synaptic enhancement process and unipolar spiking time dependent synaptic reduction process, wherein the unipolar spiking time dependent synaptic enhancement process comprises: when the upstream neurons involved in the connections are activated, and the time interval from the current or past most recent upstream neurons firing is no more than Tg1, or when the downstream neurons involved in the connections are activated, the time interval from the current or past most recent downstream neuron firing is no more than Tg2, performing:

if the involved connections have not yet been formed, the connections will be established and the weights will be initialized to 0 or a minimum value, if the connections involved have been formed, the absolute value of weights of the connections will be increased, and the increment is denoted as DwLTP4, if an upper limit of the absolute value of the weights is specified, the absolute value of the weights will no longer grow when it reaches the upper limit, wherein the unipolar spiking time dependent synaptic reduction process comprises: when the downstream neurons involved in the connections are activated, and the time interval from the current or past most recent downstream neurons firing is no more than Tg3, or when the downstream neurons involved in the connections are activated, the time interval from the current or past most recent downstream neuron firing is no more than Tg4, performing:

when the downstream neurons involved in the connections are activated, and if the involved connections have not yet been formed, the unipolar spiking time dependent synaptic reduction process will be skipped, if the connections involved have been formed, the absolute value of the weights of the connections will be reduced, the reduction is denoted as DwLTD4, if a lower limit of the absolute value of the weights is specified, the absolute value of the weights will no longer decrease when it reaches the lower limit, or the connections will be cut off, and wherein DwLTP4 and DwLTD4 are non-negative values.

46. A neural network with memory and information abstraction functions according to claim 45, wherein the values of DwLTP4 and DwLTD4 in the unipolar spiking time dependent synaptic plasticity process comprises one or more of:

DwLTP4 and DwLTD4 are non-negative constants, or

DwLTP4 and DwLTD4 are non-negative, and are respectively proportional to the weights of the involved connections.

47. A neural network with memory and information abstraction functions according to claim 5, wherein the asymmetric bipolar spiking time dependent synaptic plasticity process comprises:

when the downstream neurons involved in the connections are activated, if the time interval from the current or past most recent downstream neurons firing is no more than Th1, then performing an asymmetric bipolar spiking time dependent synaptic enhancement process, if the time interval from the current or past most recent downstream neurons firing is more than Th1 but is no more than Th2, then performing an asymmetric bipolar spiking time dependent synaptic reduction process, or when the upstream neurons involved in the connections are activated, if the time interval from the current or past most recent upstream neurons firing is no more than Th3, then performing an asymmetric bipolar spiking time dependent synaptic enhancement process, if the time interval from the current or past most recent downstream neurons firing is more than Th3 but is no more than Th4, then performing an asymmetric bipolar spiking time dependent synaptic reduction process, wherein Th1 and Th3 are non-negative, Th2 is a value greater than Th1, and Th4 is a value greater than Th3, wherein the asymmetric bipolar spiking time dependent synaptic enhancement process comprises: if the involved connections have not been formed, then establishing the connections, and initializing the weights to 0 or a minimum value, if the involved connections have been formed, the absolute value of the weights will be increased, and the increment is denoted as DwLTP5, if an upper limit of the absolute value of the weights is specified, the absolute value of the weights will not increase after reaching the upper limit, wherein the asymmetric bipolar spiking time dependent synaptic reduction process comprises: if the involved connections have not yet been formed, the asymmetric bipolar spiking time dependent synaptic reduction process will be skipped, if the connections involved have been formed, the absolute value of the weights of the connections will be reduced, the reduction is denoted as DwLTD5, if a lower limit of the absolute value of the weights is specified, the absolute value of the weights will no longer decrease when it reaches the lower limit, or the connections will be cut off, and wherein DwLTP5 and DwLTD5 are non-negative values.

48. A neural network with memory and information abstraction functions according to claim 47, wherein the values of DwLTP5 and DwLTD5 in the asymmetric bipolar spiking time dependent synaptic plasticity process comprises one or more of:

DwLTP5 and DwLTD5 are non-negative constants, or

DwLTP5 and DwLTD5 are non-negative, and are respectively proportional to the weights of the involved connections, or DwLTP5 and DwLTD5 are non-negative, DwLTP5 is negatively correlated with the time interval between downstream neurons and the upstream neurons, specifically, when the time interval is 0, DwLTP5 reaches specified maximum value DwLTPmax5, and when the time interval is Th1, DwLTP5 is 0, DwLTD5 is negatively correlated with the time interval between the downstream neurons and the upstream neurons, when the time interval is Th1, DwLTD5 reaches specified maximum value DwLTDmax5, and when the time interval is Th2, DwLTD5 is 0.

49. A neural network with memory and information abstraction functions according to claim 5, wherein the symmetric bipolar spiking time dependent synaptic plasticity process comprises:

when the downstream neurons involved in the connections are activated, if the time interval from the current or past most recent downstream neurons firing is no more than Th1, then performing a symmetric bipolar spiking time dependent synaptic enhancement process, if the time interval from the current or past most recent downstream neurons firing is more than Th1 but is no more than Th2, then performing an asymmetric bipolar spiking time dependent synaptic reduction process, or wherein Th1 and Th2 are non-negative, wherein the symmetric bipolar spiking time dependent synaptic enhancement process comprises: if the involved connections have not been formed, then establishing the connections, and initializing the weights to 0 or a minimum value, if the involved connections have been formed, the absolute value of the weights will be increased, and the increment is denoted as DwLTP6, if an upper limit of the absolute value of the weights is specified, the absolute value of the weights will not increase after reaching the upper limit, wherein the symmetric bipolar spiking time dependent synaptic reduction process comprises: if the involved connections have not yet been formed, the symmetric bipolar spiking time dependent synaptic reduction process will be skipped, if the connections involved have been formed, the absolute value of the weights of the connections will be reduced, the reduction is denoted as DwLTD5, if a lower limit of the absolute value of the weights is specified, the absolute value of the weights will no longer decrease when it reaches the lower limit, or the connections will be cut off, and wherein DwLTP6 and DwLTD6 are non-negative values.

50. A neural network with memory and information abstraction functions according to claim 49, wherein the values of DwLTP6 and DwLTD6 in the symmetric bipolar spiking time dependent synaptic plasticity process comprises one or more of:

DwLTP6 and DwLTD6 are non-negative constants, or

DwLTP6 and DwLTD6 are non-negative, and are respectively proportional to the weights of the involved connections, or DwLTP6 and DwLTD6 are non-negative, DwLTP6 is negatively correlated with the time interval between downstream neurons and the upstream neurons, specifically, when the time interval is 0, DwLTP6 reaches specified maximum value DwLTPmax6, and when the time interval is Ti1, DwLTP6 is 0, DwLTD6 is negatively correlated with the time interval between the downstream neurons and the upstream neurons, when the time interval is Ti1, DwLTD6 reaches specified maximum value DwLTDmax6, and when the time interval is Ti2, DwLTD6 is 0.

51. A neural network with memory and information abstraction functions according to claim 3, wherein the perceptual module can also accept audio input or other modal information input, wherein the neural network can also use two or more perceptual modules to process perception information of different modalities, respectively.

52. A neural network with memory and information abstraction functions according to claim 4, wherein the working process of the brain like neural network also comprises a reinforcement learning process, wherein the reinforcement learning process comprises: when one or more of the connections receive a reinforcement signal, in the second pre-set potential, the weights of the connections change, or the weights reduction of connections changes, or the weights increase/reduction of the connections in the synaptic plasticity process changes, or when one or more of the neurons receive the reinforcement signal, in the third pre-set potential, the neurons receive positive or negative input, or the weights of part or all of the input connections or output connections of these neurons change, or the weights reduction of the connections in the memory forgetting process changes, or the weights increase/reduction of the connections in the synaptic plasticity process changes.

* * * * *